(12) United States Patent
Turner

(10) Patent No.: US 8,425,712 B2
(45) Date of Patent: Apr. 23, 2013

(54) METHOD OF MANUFACTURING CUSHIONING ELEMENTS FOR APPAREL AND OTHER PRODUCTS

(75) Inventor: David Turner, Portland, OR (US)

(73) Assignee: Nike, Inc., Beaverton, OR (US)

( * ) Notice: Subject to any disclaimer, the term of this patent is extended or adjusted under 35 U.S.C. 154(b) by 288 days.

(21) Appl. No.: 12/755,579

(22) Filed: Apr. 7, 2010

(65) Prior Publication Data
US 2011/0247744 A1 Oct. 13, 2011

(51) Int. Cl.
*B32B 37/00* (2006.01)

(52) U.S. Cl.
USPC ............ 156/265; 156/256; 156/261; 156/264

(58) Field of Classification Search ................ 156/256, 156/261, 264, 265
See application file for complete search history.

(56) References Cited

U.S. PATENT DOCUMENTS

| | | | |
|---|---|---|---|
| 3,119,904 A | 1/1964 | Anson | |
| 3,371,584 A * | 3/1968 | Zernov | 493/373 |
| 3,647,505 A | 3/1972 | Bjorn-Larsen | |
| 3,877,353 A * | 4/1975 | Smith et al. | 493/373 |
| 4,305,716 A * | 12/1981 | Nickum | 493/342 |
| 4,982,447 A | 1/1991 | Henson | |
| 5,423,087 A | 6/1995 | Krent et al. | |
| 5,689,836 A | 11/1997 | Fee et al. | |
| 5,940,888 A | 8/1999 | Sher | |
| 6,654,960 B2 | 12/2003 | Cho | |
| 6,743,325 B1 * | 6/2004 | Taylor | 156/265 |
| 7,114,189 B1 | 10/2006 | Kleinert | |
| 2007/0000005 A1 | 1/2007 | Wang | |
| 2008/0264557 A1 | 10/2008 | Kim | |
| 2008/0290556 A1 | 11/2008 | Kim | |
| 2009/0070911 A1 | 3/2009 | Chang | |
| 2010/0129573 A1 | 5/2010 | Kim | |
| 2010/0193117 A1 | 8/2010 | Kim | |
| 2010/0205716 A1 | 8/2010 | Kim | |
| 2010/0205722 A1 | 8/2010 | Kim | |
| 2010/0206472 A1 | 8/2010 | Kim | |

FOREIGN PATENT DOCUMENTS

| | | |
|---|---|---|
| EP | 1175840 | 1/2002 |
| FR | 2903579 | 1/2008 |
| JP | 2000136414 | 5/2000 |

(Continued)

OTHER PUBLICATIONS

Memorandum Opinion and Order Construing Disputed Claim Terms, signed by Chief Judge James F. Holderman and dated Sep. 17, 2009 in the United States Court for the Northern District of Illinois Eastern Division for Case No. 1:08-cv-06584.

(Continued)

*Primary Examiner* — Jeff Aftergut
(74) *Attorney, Agent, or Firm* — Plumsea Law Group, LLC

(57) ABSTRACT

A method for manufacturing the cushioning elements may include utilizing a die with a plurality of die elements positioned in a particular arrangement. A polymer material, which may be a polymer foam material, is located between the die and an extractor. The polymer material is compressed between the die and the extractor, and the die elements cut the polymer material to form a plurality of pad components, which are arranged like the die elements. The die and the extractor are separated, and the pad components are secured to the extractor in the arrangement of the die elements. Additionally, the pad components are bonded to at least one material layer such that the pad components remain in the arrangement of the die elements.

18 Claims, 57 Drawing Sheets

| FOREIGN PATENT DOCUMENTS | | |
| --- | --- | --- |
| WO | WO9205717 | 4/1992 |
| WO | WO-2006/036072 A1 * | 4/2006 |
| WO | WO2009035888 | 3/2009 |
| WO | WO2010104868 A2 | 9/2010 |

OTHER PUBLICATIONS

International Search Report and Written Opinion in PCT application No. PCT/US2012/026442, mailed on Aug. 21, 2012.

* cited by examiner

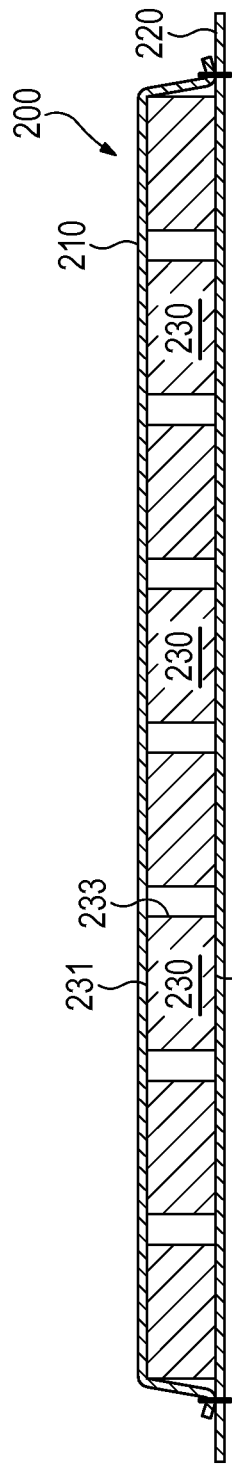
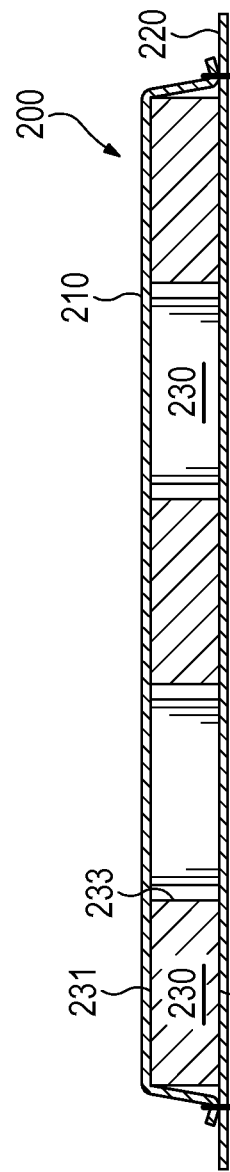
Figure 9A
Figure 9B

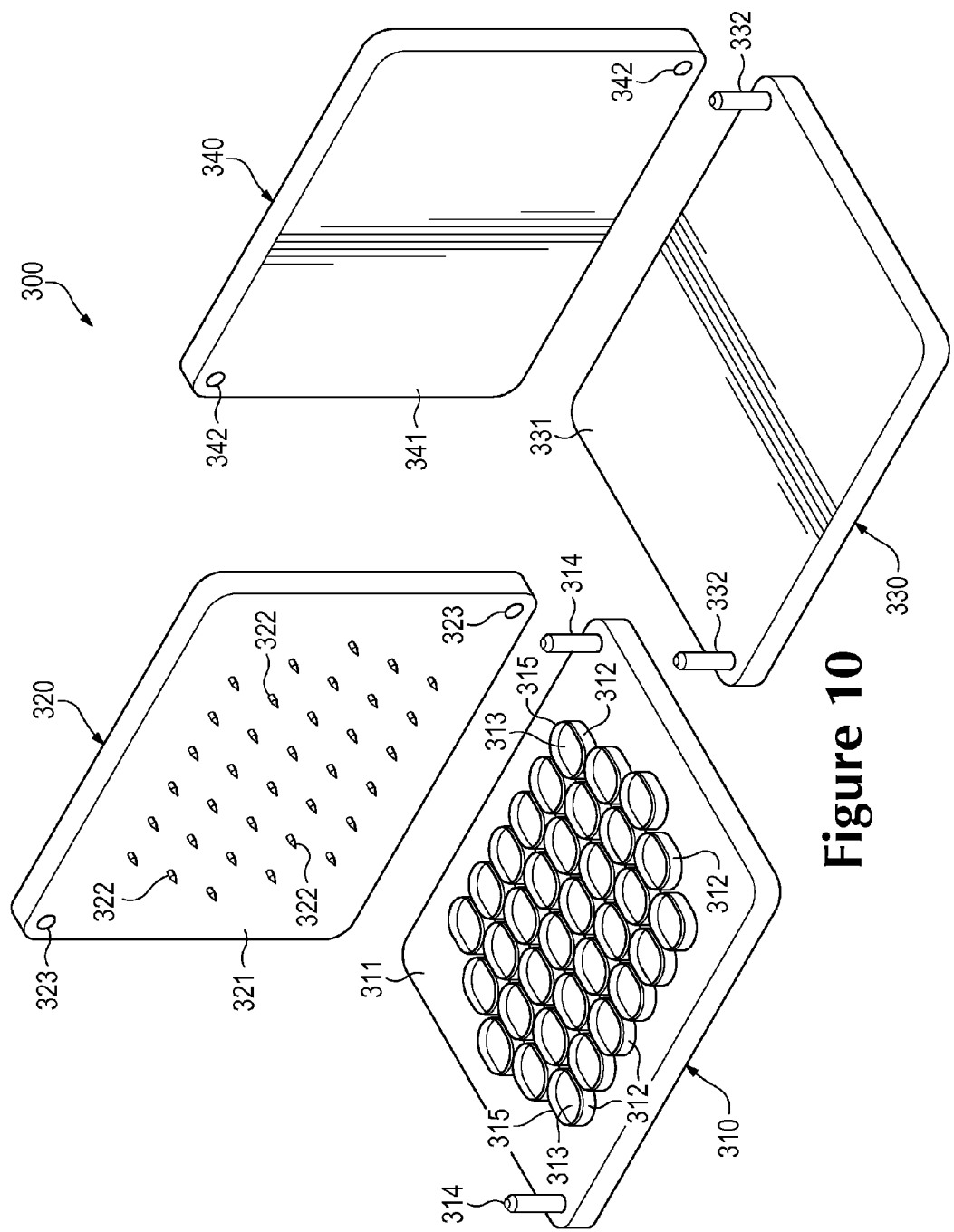

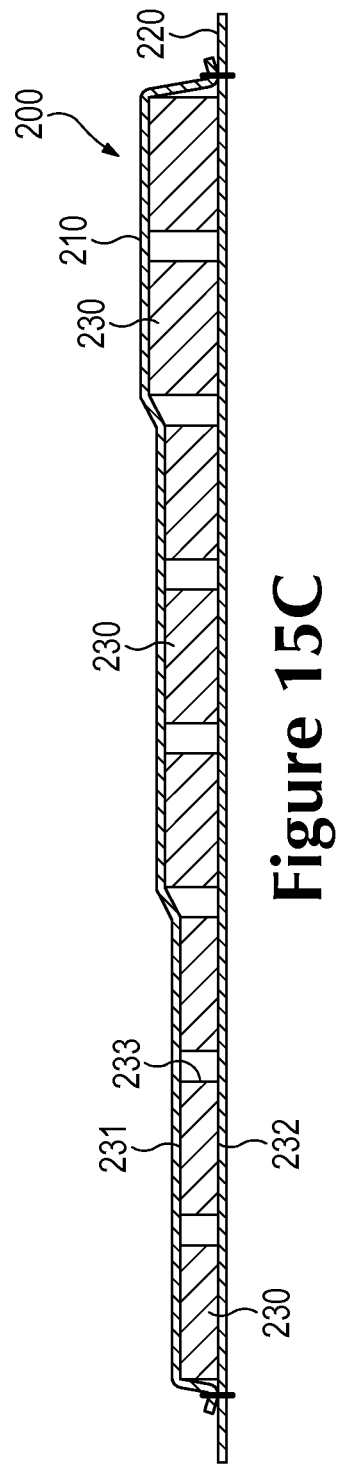
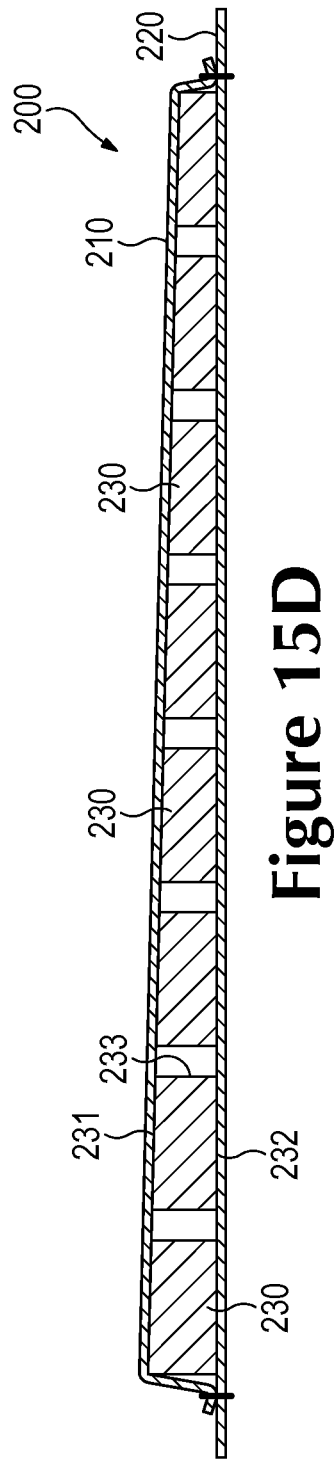
Figure 15C
Figure 15D under other articles of apparel, apparel 100 may be worn
METHOD OF MANUFACTURING CUSHIONING ELEMENTS FOR APPAREL AND OTHER PRODUCTS

BACKGROUND

Materials or elements that impart padding, cushioning, or otherwise attenuate impact forces are commonly incorporated into a variety of products. Athletic apparel, for example, often incorporates cushioning elements that protect the wearer from contact with other athletes, equipment, or the ground. More specifically, pads used in American football and hockey incorporate cushioning elements that provide impact protection to various parts of a wearer. Helmets utilized during American football, hockey, bicycling, skiing, snowboarding, and skateboarding incorporate cushioning elements that provide head protection during falls or crashes. Similarly, gloves utilized in soccer (e.g., by goalies) and hockey incorporate cushioning elements that provide protection to the hands of a wearer. In addition to apparel, mats (e.g., for yoga or camping), chair cushions, and backpacks, for example, all incorporate cushioning elements to enhance comfort.

SUMMARY

Various cushioning elements that may be utilized in apparel and a variety of other products are disclosed below. In general, the cushioning elements include a first material layer, a second material layer, and a plurality of pad components located between and secured to the first material layer and the second material layer.

Methods for manufacturing the cushioning elements are also disclosed below. The methods may include utilizing a die with a plurality of die elements positioned in a particular arrangement. A polymer material, which may be a polymer foam material, is located between the die and an extractor. The polymer material is compressed between the die and the extractor, and the die elements cut the polymer material to form a plurality of pad components, which are arranged like the die elements. The die and the extractor are separated, and the pad components are secured to the extractor in the arrangement of the die elements. Additionally, the pad components are bonded to at least one material layer such that the pad components remain in the arrangement of the die elements.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 9A and 9B are cross-sectional views of the cushioning element, as defined by section lines 9A and 9B in FIG. 8.

FIG. 10 is a perspective view of portions of a manufacturing apparatus utilized in a manufacturing process for the cushioning element.

FIGS. 15A-15D are cross-sectional views corresponding with FIG. 9A and depicting further configurations of the cushioning element.

DETAILED DESCRIPTION

The following discussion and accompanying figures disclose various cushioning elements that may be incorporated into a variety of products, including articles of apparel (e.g., shorts, pants, shirts, wraps, gloves, helmets, and footwear), mats, seat cushions, and backpacks, for example. Additionally, the following discussion and accompanying figures disclose various processes associated with manufacturing the cushioning elements.

Apparel Configuration

Figure 1:
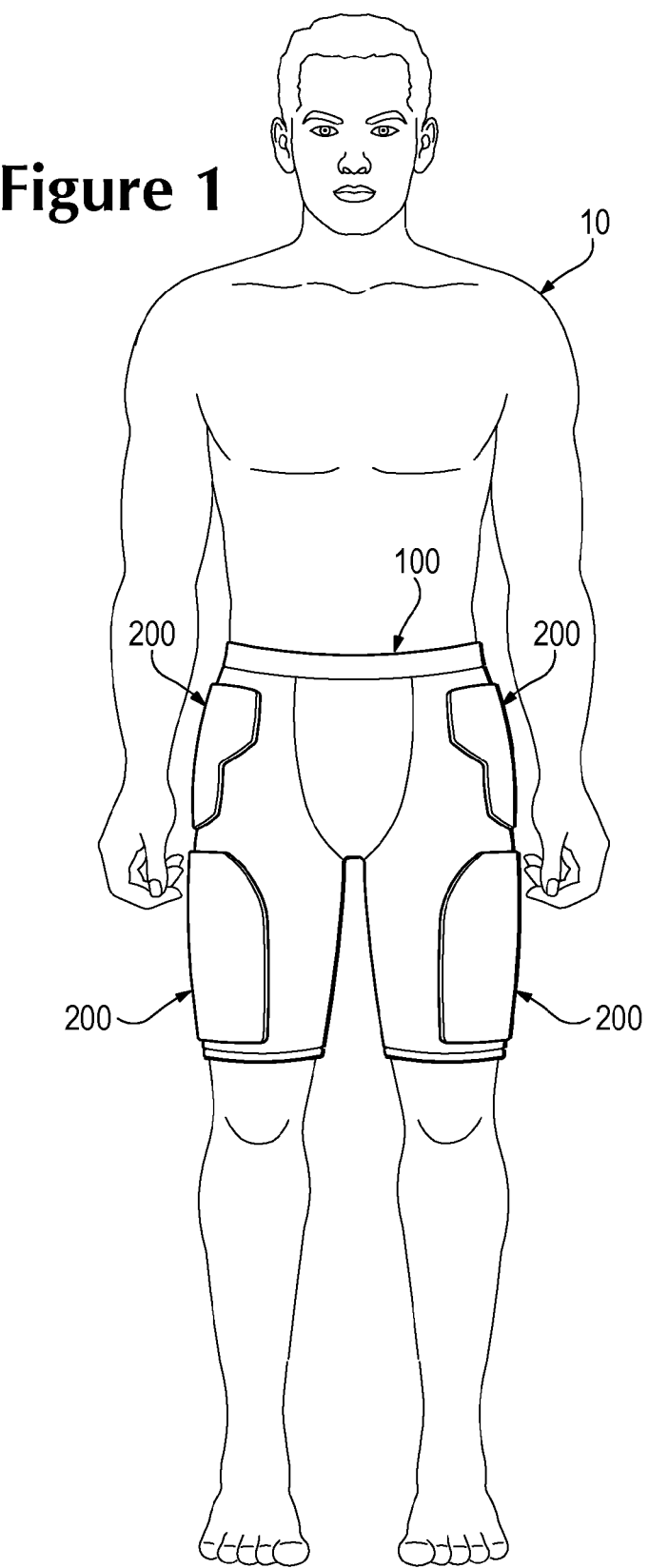
FIG. 1 is a front elevational view of an individual wearing an article of apparel.
Figure 2:
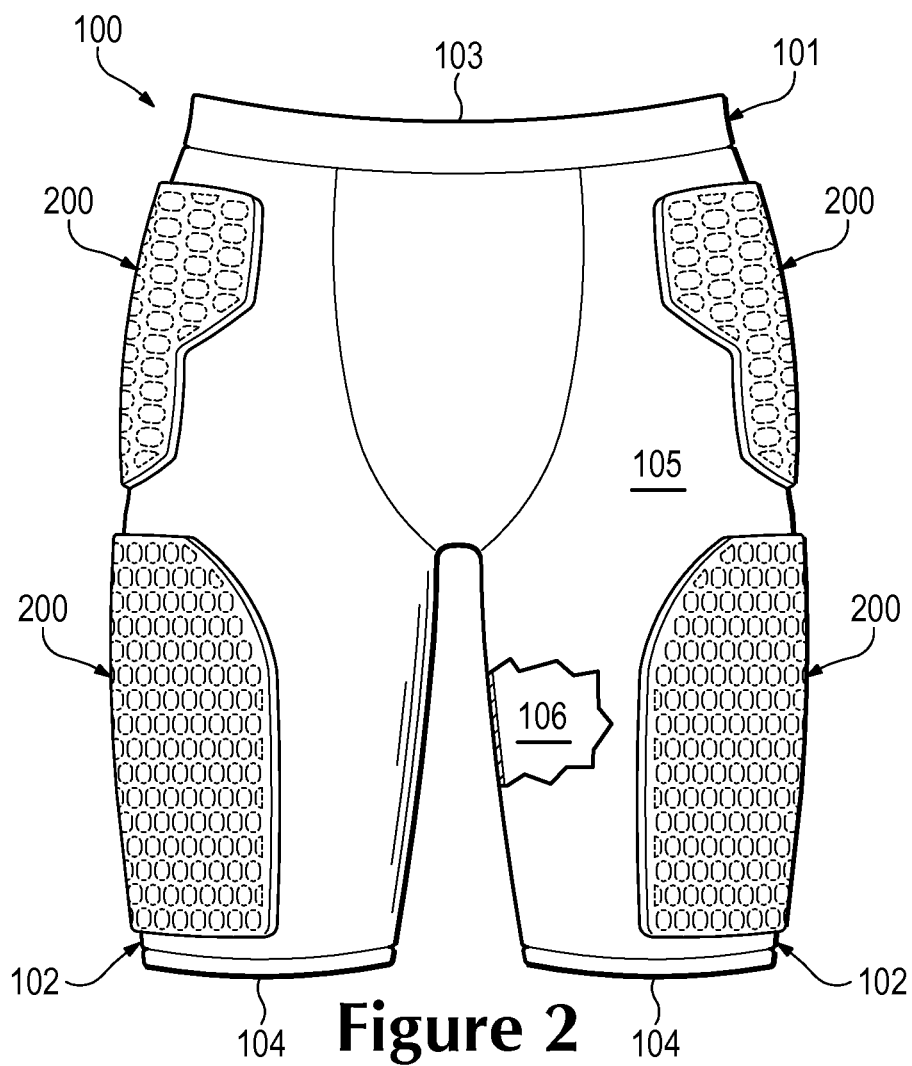
FIG. 2 is a front elevational view of the article of apparel.
Figure 3:
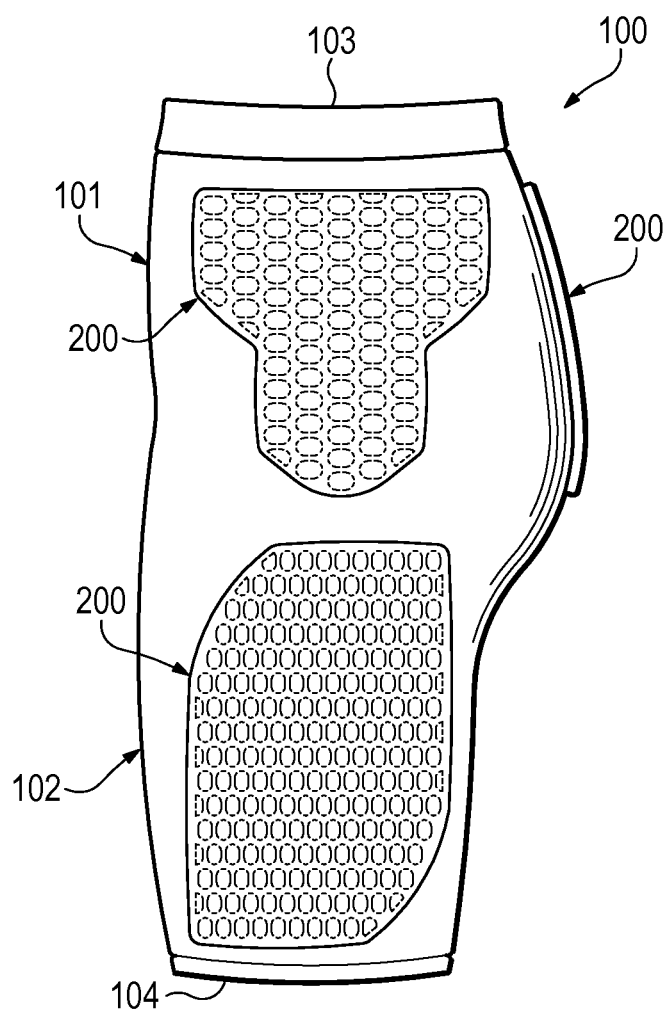
FIGS. 3 and 4 are side elevational views of the article of apparel.
Figure 4:
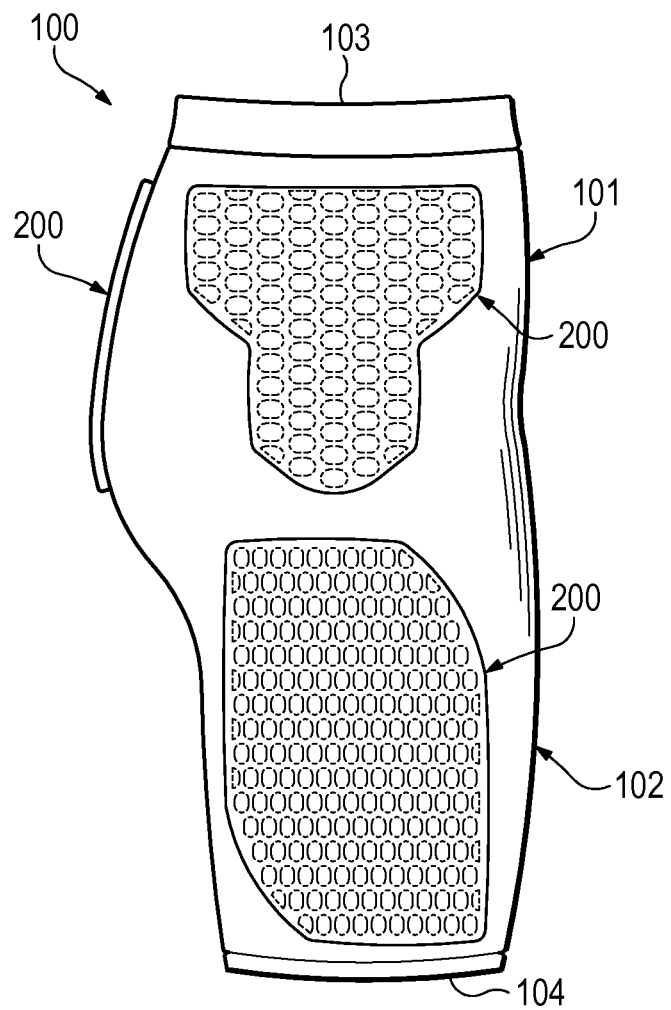
Figure 5:
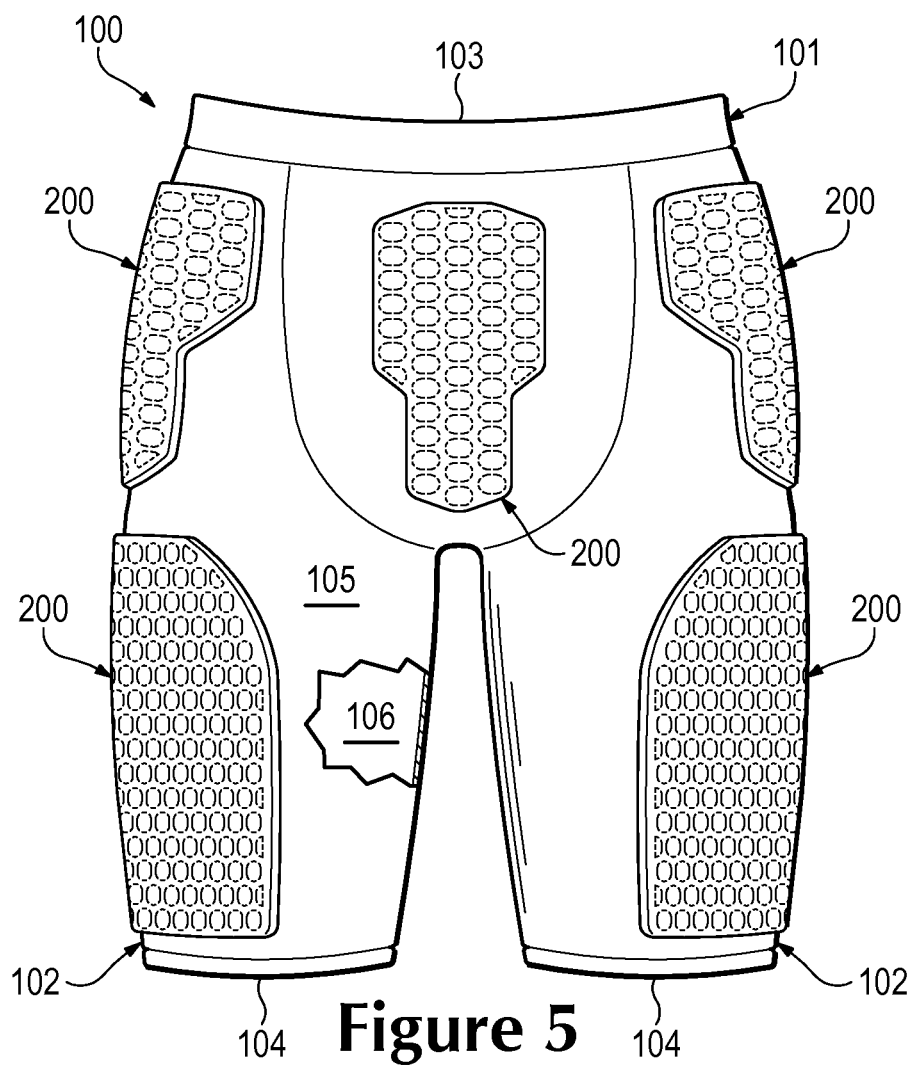
FIG. 5 is a rear elevational view of the article of apparel.
Figure 6:
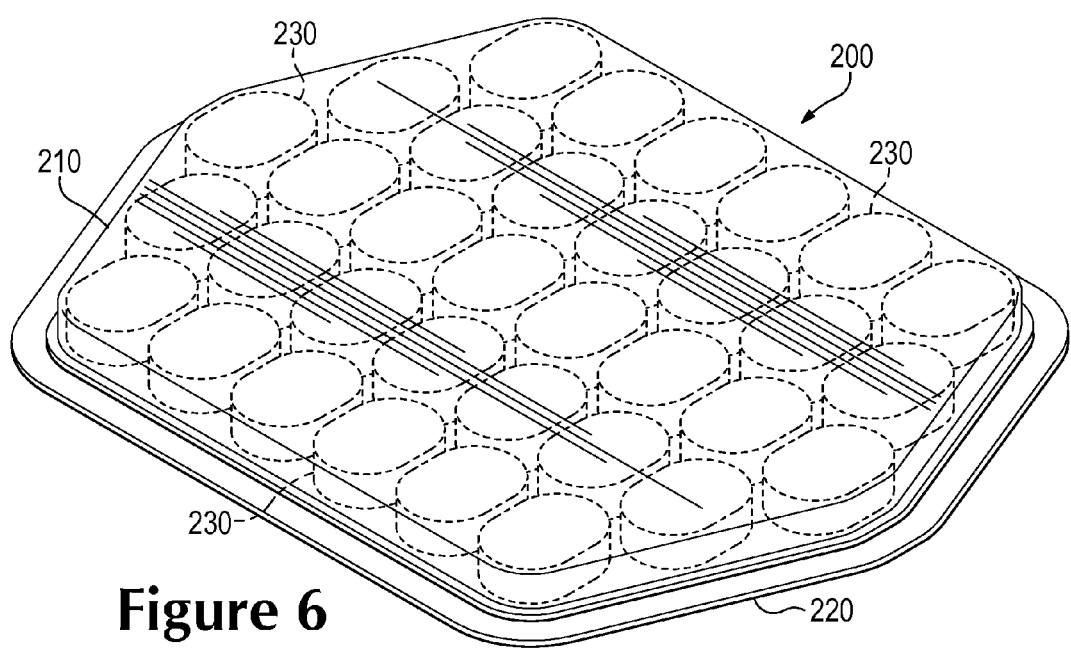
FIG. 6 is a perspective view of a cushioning element.
Figure 7:
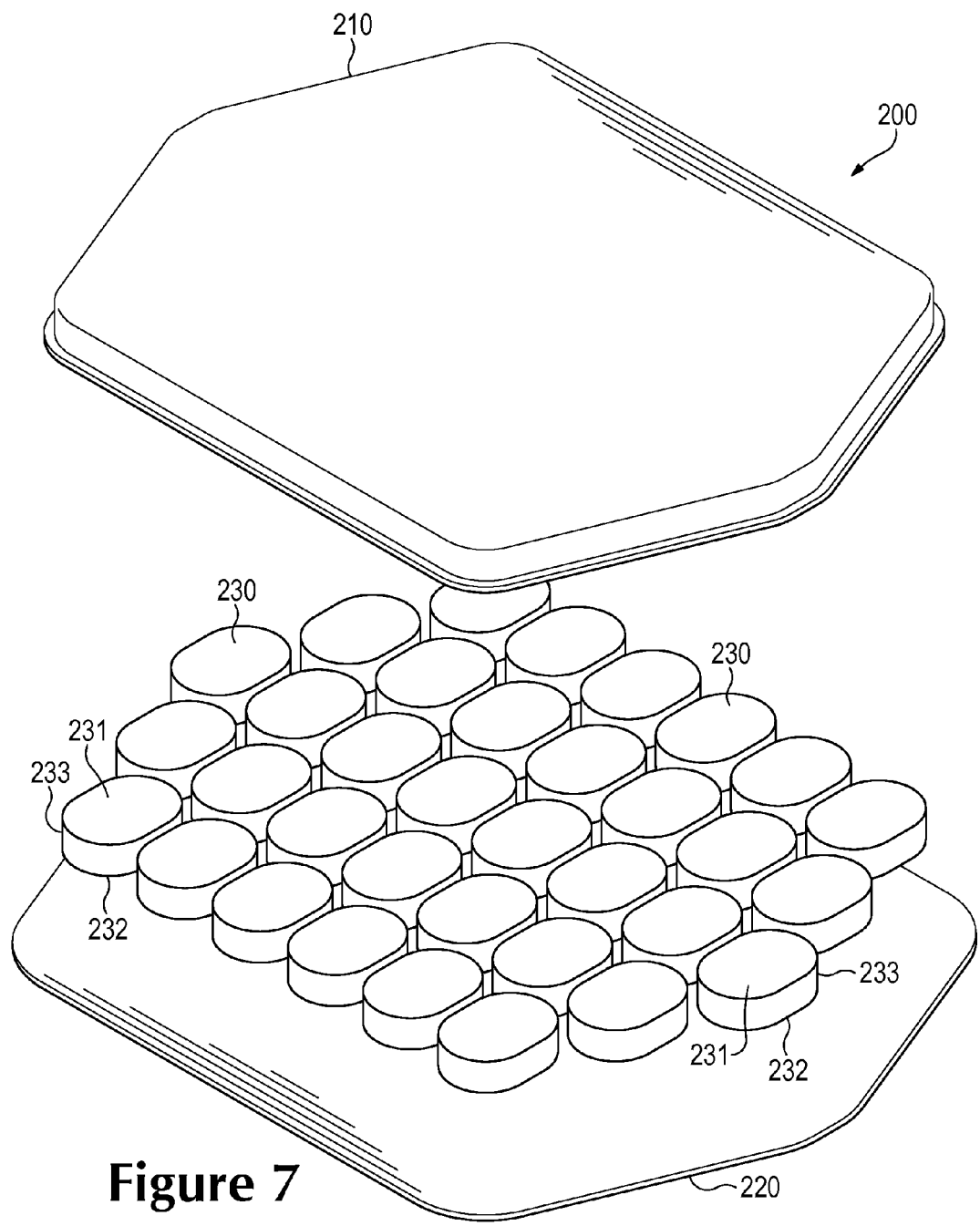
FIG. 7 is an exploded perspective view of the cushioning element.
Figure 8:
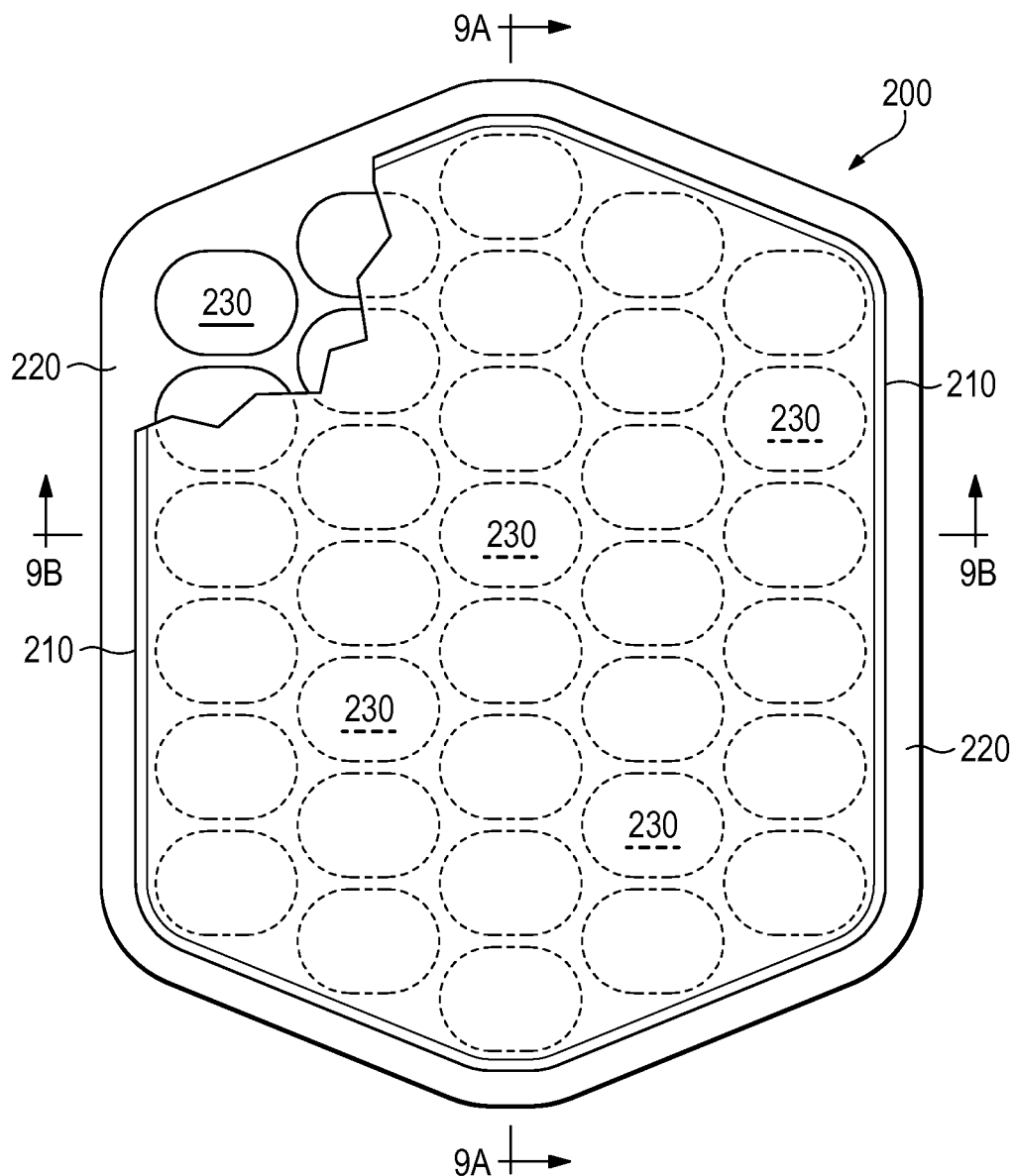
FIG. 8 is a top plan view of the cushioning element.

With reference to FIG. 1, an individual 10 is depicted as wearing an article of apparel 100 with the general configuration of a shorts-type garment. Although apparel 100 may be worn under other articles of apparel, apparel 100 may be worn alone, may be exposed, or may be worn over other articles of apparel. Apparel 100 may also be worn in combination with other pieces of equipment (e.g., athletic or protective equipment). Accordingly, the configuration of apparel 100 and the manner in which apparel 100 is worn by individual 10 may vary significantly.

Apparel 100 is depicted individually in FIGS. 2-5 as including a pelvic region 101 and a pair of leg regions 102 that extend outward from pelvic region 101. Pelvic region 101 corresponds with a pelvic area of individual 10 and covers at least a portion of the pelvic area when worn. An upper area of pelvic region 101 defines a waist opening 103 that extends around a waist of individual 10 when apparel 100 is worn. Leg regions 102 correspond with a right leg and a left leg of individual 10 and cover at least a portion of the right leg and the left leg when worn. Lower areas of leg regions 102 each define a thigh opening 104 that extends around a thigh of individual 10 when apparel 100 is worn. Additionally, apparel 100 includes an exterior surface 105 that faces away from individual 10 when apparel 100 is worn, and apparel 100 includes an opposite interior surface 106 that faces toward individual 10 and may contact individual 10 when apparel 100 is worn.

A plurality of cushioning elements 200 are incorporated into various areas of apparel 100 to impart padding, cushioning, or otherwise attenuate impact forces. When apparel 100 is worn during athletic activities, for example, cushioning elements 200 may protect individual 10 from contact with other athletes, equipment, or the ground. With regard to apparel 100, cushioning elements 200 are located in both of pelvic region 101 and leg regions 102 and are positioned, more specifically, to protect the hips, thighs, and tailbone of individual 10. As described in greater detail below, cushioning elements 200 may be incorporated into a variety of different articles of apparel, and cushioning elements 200 may be positioned in various areas of the articles of apparel to protect specific portions (e.g., muscles, bones, joints, impact areas) of individual 10. Additionally, the shapes, sizes, and other properties of cushioning elements 200, as well as the materials and components utilized in cushioning elements 200, may vary significantly to provide a particular level of protection to the specific portions of individual 10.

Cushioning Element Configuration

An example configuration for cushioning element 200 is depicted in FIGS. 6-9B as including a first material layer 210, a second material layer 220, and a plurality of pad components 230. First material layer 210 and second material layer 220 cooperatively form an outer surface or covering for cushioning element 200. That is, first material layer 210 and second material layer 220 cooperatively form a pocket or void, in which pad components 230 are located. Whereas second material layer 220 is depicted as having a generally planar configuration, first material layer 210 extends over pad components 230 and also along sides of pad components 230 to join with second material layer 220 (e.g., through stitching, an adhesive, or thermalbonding). Although cushioning element 200 may be incorporated into apparel 100 in a variety of ways, first material layer 210 may be positioned exterior of second material element 220, such that cushioning element 200 protrudes outward from apparel 100. That is, first material layer 210 may form a portion of exterior surface 105, whereas second material layer 220 may form a portion of both exterior surface 105 and interior surface 106. Alternately, second material layer 220 may be positioned exterior of first material element 210, such that cushioning element 200 protrudes inwardly.

A variety of materials may be utilized for first material layer 210 and second material layer 220, including various textiles, polymer sheets, leather, or synthetic leather, for example. Combinations of these materials (e.g., a polymer sheet bonded to a textile) may also be utilized for material layers 210 and 220. Although material layers 210 and 220 may be formed from the same material, each of material layers 210 and 220 may also be formed from different materials. With regard to textiles, material layers 210 and 220 may be formed from knitted, woven, non-woven, spacer, or mesh textile components that include rayon, nylon, polyester, polyacrylic, elastane, cotton, wool, or silk, for example. Moreover, the textiles may be non-stretch, may exhibit one-directional stretch, or may exhibit multi-directional stretch. Accordingly, a variety of materials are suitable for first material layer 210 and second material layer 220.

Pad components 230 are located between and secured to each of material layers 210 and 220. Each of pad components 230 has a first surface 231 secured to first material layer 210, an opposite second surface 232 secured to second material layer 220, and a side surface 233 that extends between surfaces 231 and 232. Although the shapes of pad components 230 may vary significantly, each of surfaces 231 and 232 are depicted as having an elliptical or generally elongate shape with rounded end areas, and side surface 233 extends in a generally straight fashion between surfaces 231 and 232. Pad components 230 are also depicted as being spaced evenly from each other and arranged in rows, particularly offset rows, but may be spaced or located in a variety of arrangements. An advantage of arranging pad components 230 in offset rows is that the area between pad components 230 is effectively minimized, while retaining a regular spacing between adjacent pad components 230.

A variety of materials may be utilized for pad components 230, including various polymer foam materials that return to an original shape after being compressed. Examples of suitable polymer foam materials for pad components 230 include polyurethane, ethylvinylacetate, polyester, polypropylene, and polyethylene foams. Moreover, both thermoplastic and thermoset polymer foam materials may be utilized. In some configurations of cushioning element 200, pad components 230 may be formed from a polymer foam material with a varying density, or solid polymer or rubber materials may be utilized. Fluid-filled chambers may also be utilized as pad components 230. Also, different pad components 230 may be formed from different materials, or may be formed from similar materials with different densities. As discussed in greater detail below, the polymer foam materials forming pad components 230 attenuate impact forces to provide cushioning or protection. By selecting thicknesses, materials, and densities for each of the various pad components 230, the degree of impact force attenuation may be varied throughout cushioning element 200 to impart a desired degree of cushioning or protection.

The compressible polymer foam materials forming pad components 230 attenuate impact forces that compress or otherwise contact cushioning element 200. When incorporated into apparel 100 or another article of apparel, for example, the polymer foam materials of pad components 230 may compress to protect a wearer from contact with other athletes, equipment, or the ground. Accordingly, cushioning element 200 may be utilized to provide cushioning or protection to areas of individual 10 or other wearers that are covered by cushioning element 200.

In addition to attenuating impact forces, cushioning element 200 has an advantage of simultaneously providing one or more of breathability, flexibility, a relatively low overall mass, and launderability. When incorporated into an article of apparel, such as apparel 100, a wearer may perspire and generate excess heat. By utilizing a permeable textile for material layers 210 and 220 and also forming gaps between adjacent pad components 230, areas for air to enter apparel 100 and for moisture to exit apparel 100 are formed through cushioning element 200. More particularly, air and moisture may pass through material layers 210 and 220 and between pad components 230 to impart breathability to areas of apparel 100 having cushioning element 200. Moreover, the materials and structure discussed above for cushioning element 200 impart flexibility and a low overall mass to cushioning element 200. Furthermore, the materials and structure discussed above for cushioning element 200 permits cushioning element 200 to be laundered without significant shrinkage or warping, even when temperatures associated with commercial laundering processes are utilized. Accordingly, cushioning element 200 may simultaneously provide impact force attenuation, breathability, flexibility, a relatively low overall mass, and launderability to an article of apparel.

Manufacturing Process

A variety of techniques may be utilized to manufacture cushioning element 200. With reference to FIG. 10, a manufacturing apparatus 300 is disclosed as including a die 310, an extractor 320, a heating plate 330, and a press plate 340. The configurations depicted in FIG. 10 and discussed below for manufacturing apparatus 300 are intended to provide an example of a manufacturing apparatus that may be utilized in the manufacture of cushioning element 200. A variety of other manufacturing apparatuses that operate in a similar manner may also be utilized.

Die 310 includes a base 311, a plurality of die elements 312, a plurality of ejection members 313, and a pair of registration pegs 314. Base 311 is formed from a durable and rigid material, such as steel or aluminum, to provide a foundation for die 310. Die elements 312 extend outward (e.g., upward) from base 311 and exhibit a general shape of pad components 230. More particularly, an interior area of each die element 312 has the general shape of an individual pad component 230. As discussed in greater detail below, edges 315 (e.g., upper edges) of die elements 312 are utilized to cut through a material that forms pad components 230, thereby shaping and forming each of pad components 230. Edges 315 may generally have a sharpened configuration that assists with cutting through the material that forms pad components 230. Ejection members 313 are located within the interior areas of each die element 312 and are spaced (e.g., spaced downward) from edges 315. As an example, ejection members 313 may be formed from a polymer foam material with lesser compressibility than a polymer foam material forming pad components 230. Additionally, registration pegs 314 extend outward (e.g., upward) from base 311.

In addition to having the general shape of pad components 230, die elements 312 are arranged or otherwise located relative to each other in the same manner as pad components 230. As noted above, pad components 230 are depicted as being spaced evenly from each other and arranged in offset rows. Similarly, die elements 312 are spaced evenly from each other and arranged in offset rows. That is, die elements 312 are arranged in a configuration that corresponds with the positions of pad components 230 in cushioning element 200. If, however, a different arrangement is desired for pad components 230, then die elements 312 may be moved or otherwise repositioned to correspond with the different arrangement.

Extractor 320 includes a base 321, a plurality of extractor elements 322, and a pair of registration apertures 323. Base 321 is formed from a durable and rigid material, such as steel or aluminum, to provide a foundation for extractor 320. Extractor elements 322 have the configurations of pins that extend outward (e.g., downward) from base 321 and have sharpened or pointed end areas. As discussed in greater detail below, assist with retaining the positions of pad components 230 upon removal from die 310. As an alternative to pins, extractor elements 322 (a) may have the configurations of needles, nails, spikes, or prongs or (b) may be a vacuum system that retains the positions of pad components 230 upon removal from die 310, for example Accordingly, extractor elements 322 are any device or system that may be used to secure pad components 230 to extractor 320 and assist with retaining the positions of pad components 230 upon removal from die 310. Additionally, registration apertures 323 form holes in base 321 that are positioned to correspond with and receive registration pegs 314.

The positions of extractor elements 322 correspond with the locations of die elements 312. Moreover, extractor elements 322 are arranged or otherwise located relative to each other in the same manner as die elements 312, and die elements 313 are arranged or otherwise located relative to each other in the same manner as pad components 230. That is, extractor elements 322 are arranged in a configuration that corresponds with the positions of pad components 230 in cushioning element 200. If, however, a different arrangement is desired for pad components 230, then extractor elements 322 and die elements 312 may be moved or otherwise repositioned to correspond with the different arrangement.

Heating plate 330 includes a base 331 and a pair of registration pegs 332. Base 331 may also be formed from a durable and rigid material, such as steel or aluminum, and incorporates heating elements. More particularly, electric coils may extend through base 331 to heat base 331 to temperatures that bond pad components 230 to material layers 210 and 220. As an alternative, base 331 may incorporate fluid channels through which a heated fluid passes, or radiant heaters, radio frequency emitters, or other devices may be utilized. Additionally, registration pegs 332 extend outward (e.g., upward) from base 331. In some configurations of heating plate 330, a surface of base 331 that contacts portions of cushioning element 200 during the manufacturing process may incorporate a rubber or silicone material.

Press plate 340 is formed from a base 341 that defines a pair of registration apertures 342. As with bases 311, 321, and 331, base 341 may be formed from a durable and rigid material, such as steel or aluminum. Registration apertures 342 form holes in base 341 that are positioned to correspond with and receive registration pegs 332.

Figure 11A:
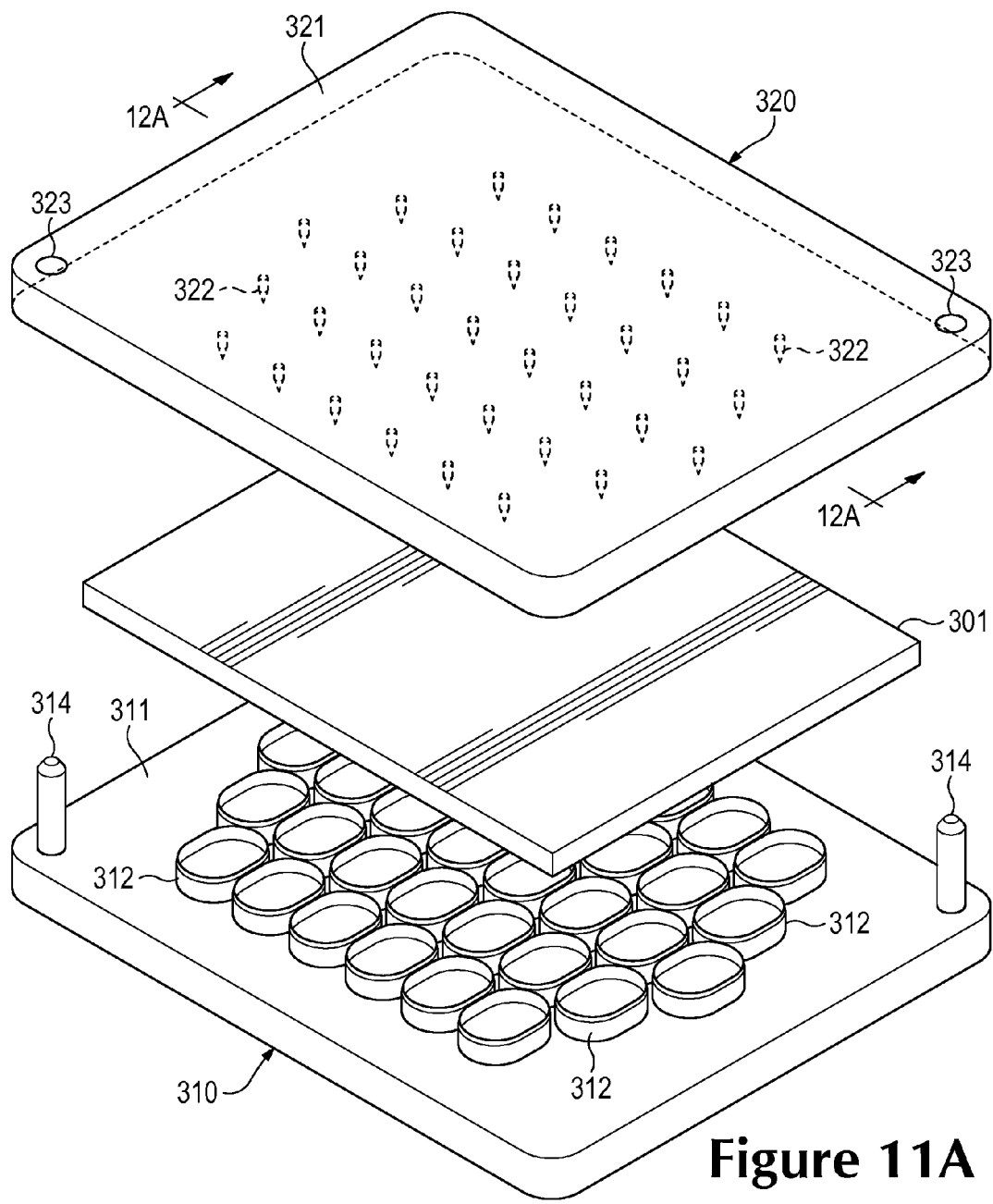
FIGS. 11A-11J are schematic perspective views of the manufacturing process.
Figure 11B:
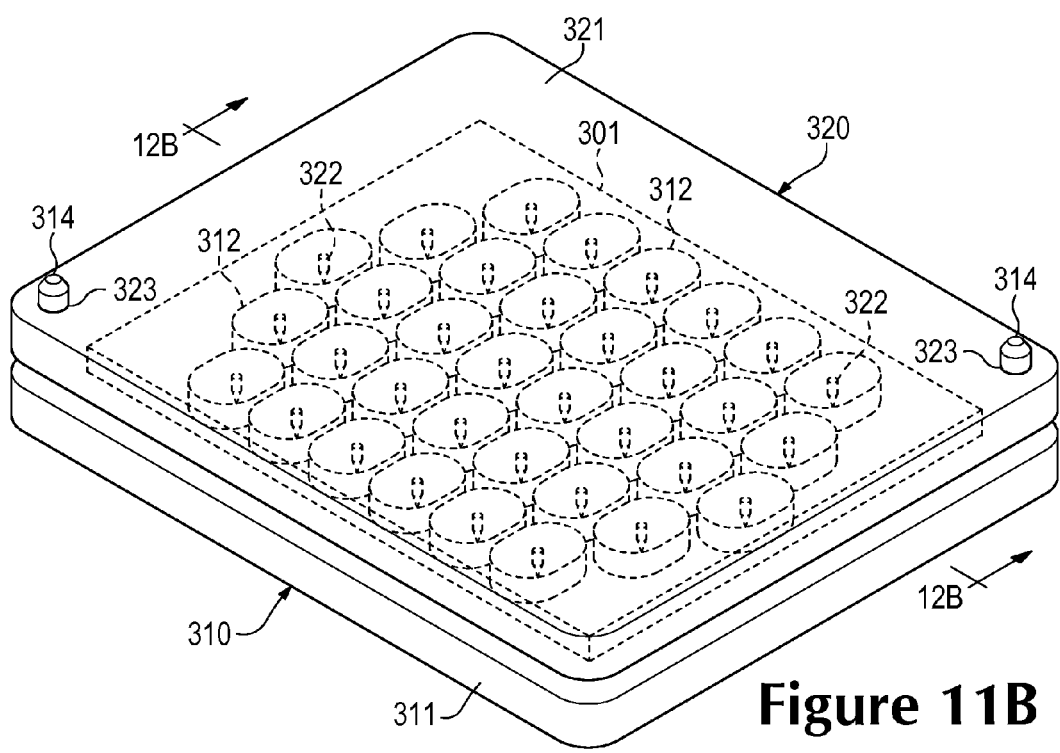
Figure 11C:
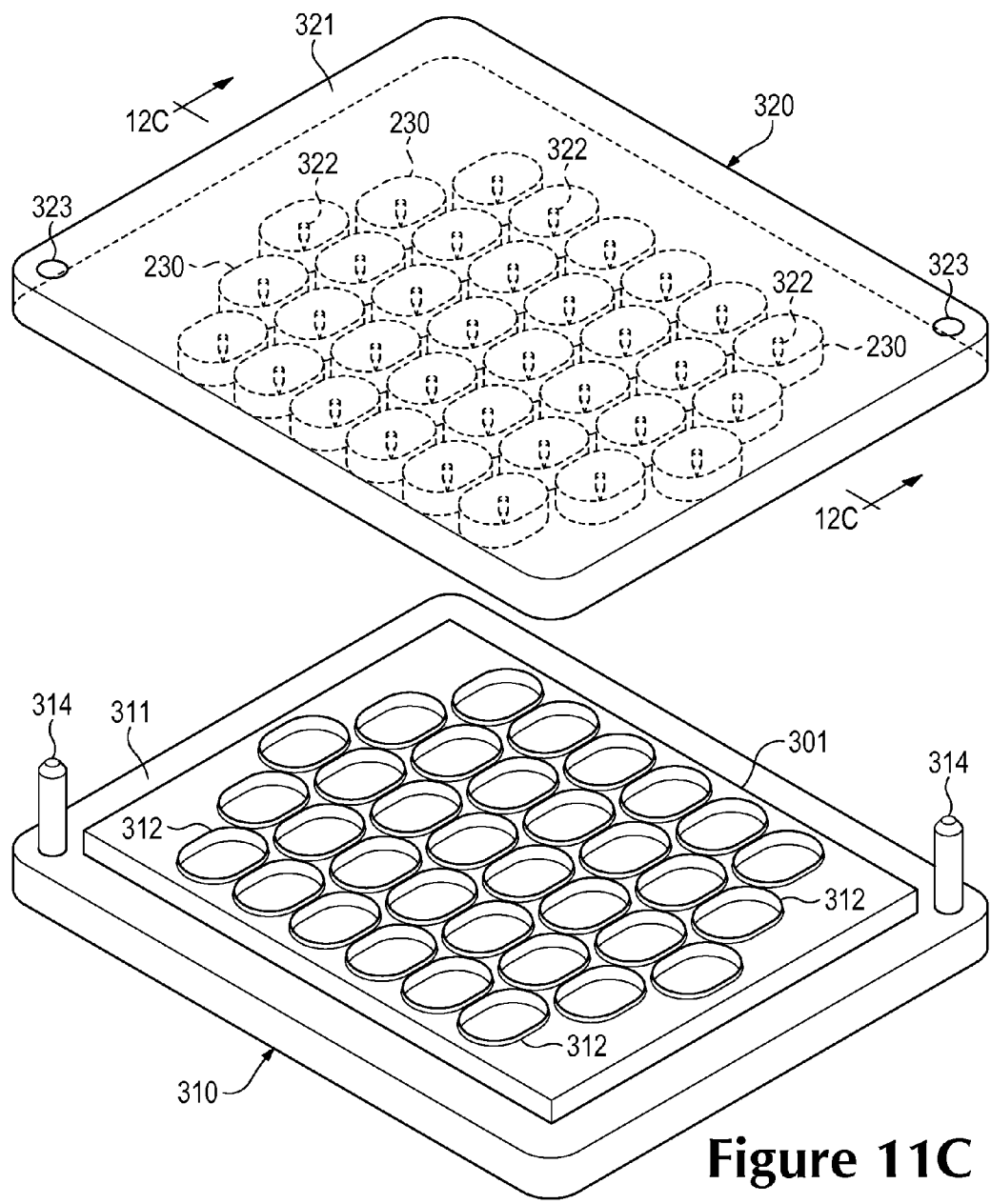

With reference to FIGS. 11A-11J and 12A-12J, an example of a suitable manufacturing process utilizing manufacturing apparatus 300 is disclosed. Initially, die elements 312 are arranged in a configuration that corresponds with the positions of pad components 230 in cushioning element 200, and extractor elements 322 are arranged in a configuration that corresponds with the positions of die elements 312 and pad components 230 in cushioning element 200. A blank 301 is then placed between die 310 and extractor 320, as depicted in FIGS. 11A and 12A. Blank 301, from which pad components 230 are cut, is formed from the same material as pad components 230 and has a thickness of pad components 230. Once blank 301 is positioned, die 310 and extractor 320 close upon, compress, and cut blank 301, as depicted in FIGS. 11B and 12B. More particularly, (a) blank 301 is compressed against die elements 312 such that edges 315 pierce and cut through blank 301 and (b) extractor elements 322 pierce and enter blank 301. Note that extractor elements 322 are positioned to correspond with each of die elements 312 and enter the interior area of each of die elements 312, which is where ejection members 313 are located. Depending upon the lengths of extractor elements 322, end areas of extractor elements 322 may pass through blank 301 and pierce ejection members 313 during this operation. In order to ensure that die elements 312 properly align with extractor elements 322, registration pegs 314 are aligned with and enter registration apertures 323.

Figure 12A:
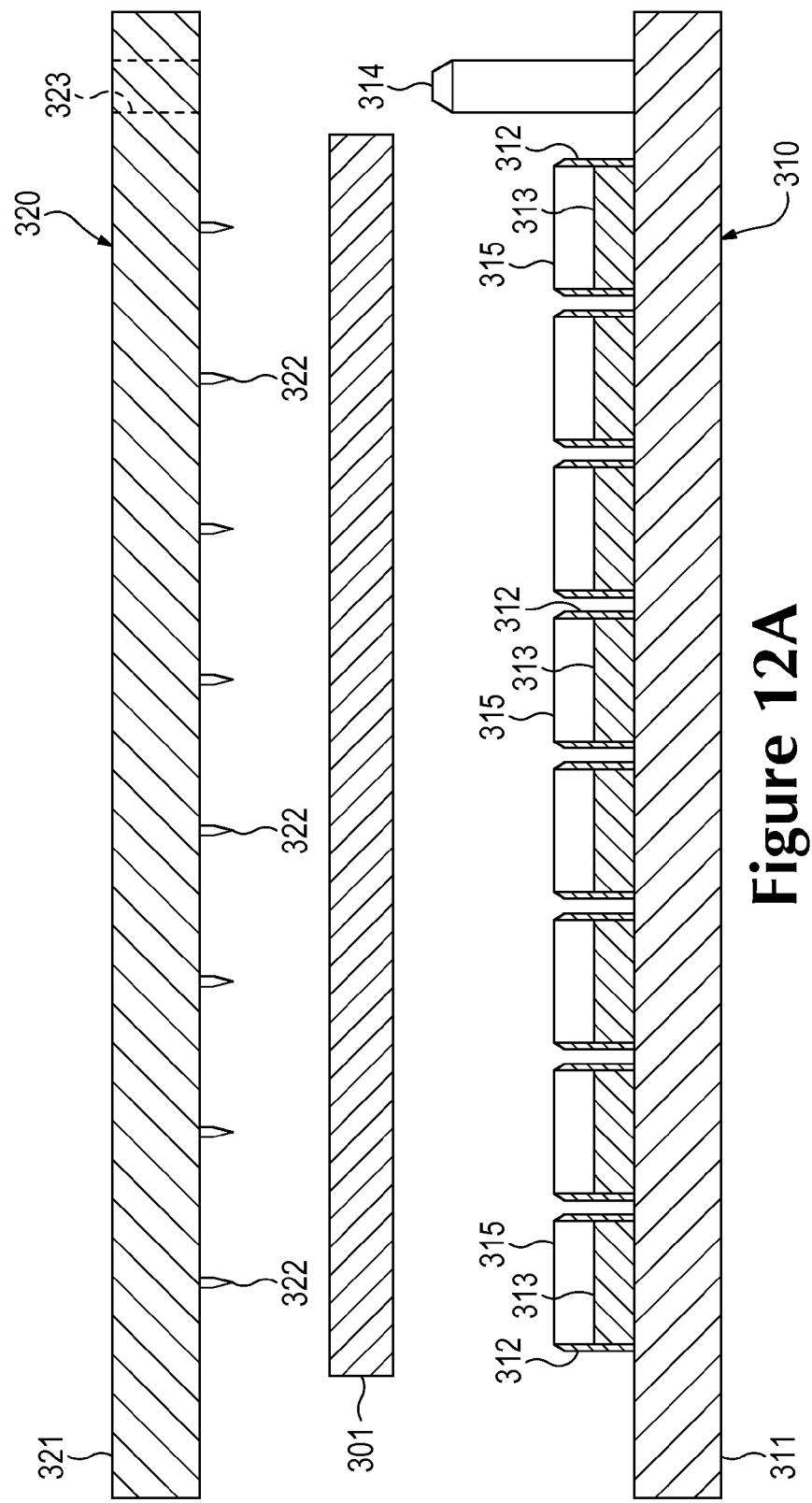
FIGS. 12A-12J are schematic cross-sectional views of the manufacturing process, as respectively defined by section lines 12A-12J in FIGS. 11A-11J.
Figure 12B:
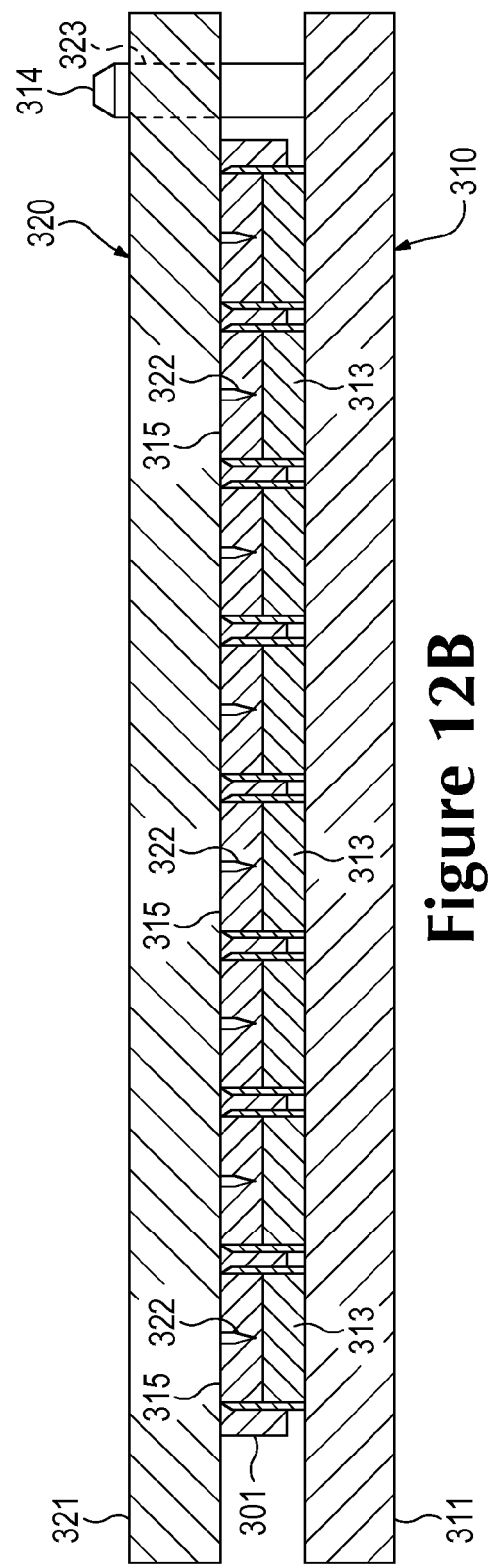
Figure 12C:
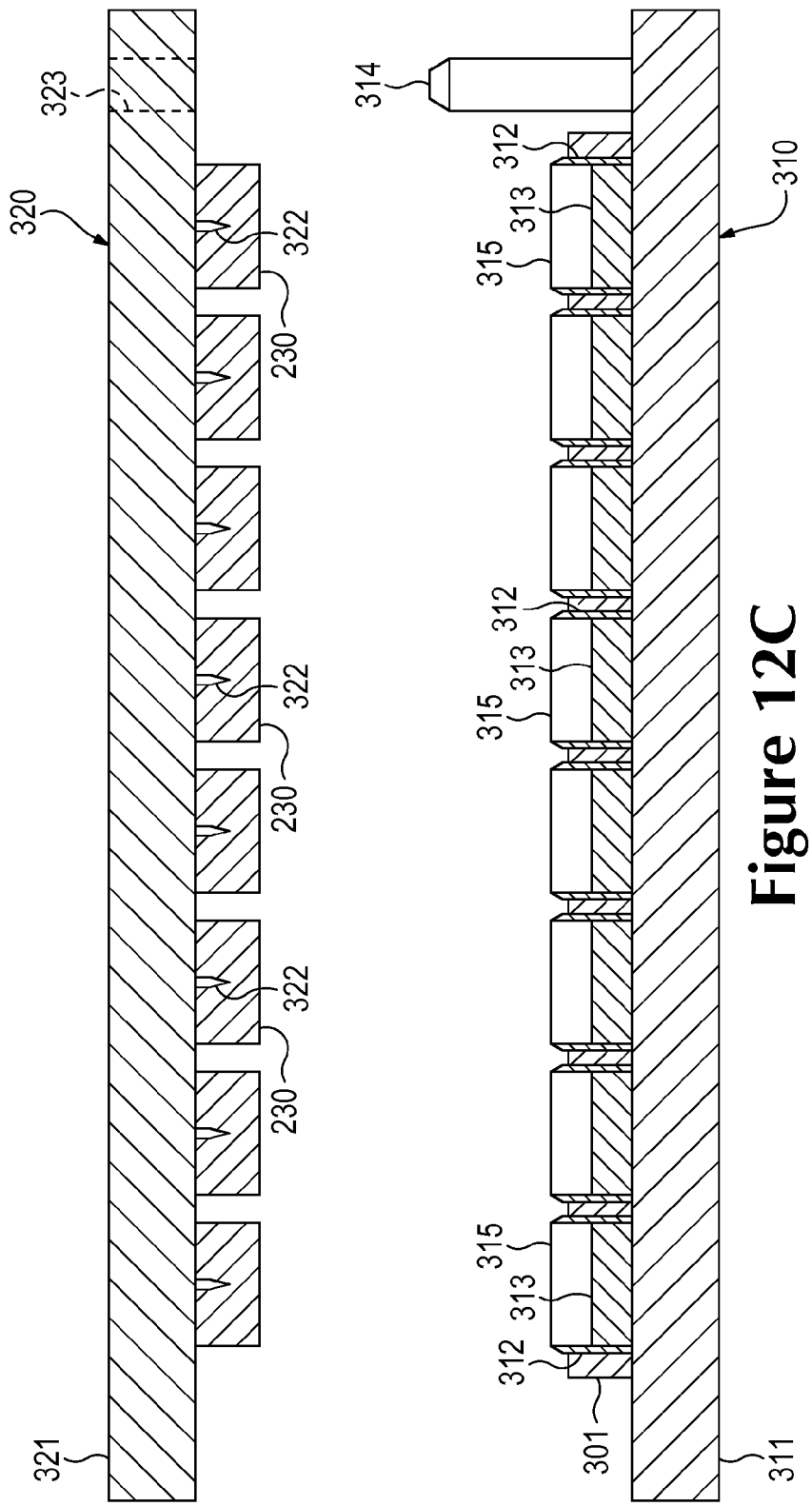

At this stage of the process, die elements 312 have effectively cut through blank 301. Referring to FIG. 12B, edges 315 of die elements 312 pass entirely through blank 301 to rest against a surface of base 321. As noted above, the interior area of each die element 312 has the general shape of an individual pad component 230. Accordingly, the individual pad components 230 are located within die elements 312 and are compressed between a surface of base 321 and ejection members 313. As depicted in FIGS. 11C and 12C, die 310 and extractor 320 then separate to remove pad components 230 from within die elements 312, and pad components 230 are secured to extractor 320 by the various extractor elements 322. Referring again to FIG. 12B, portions of blank 301 within die elements 312 (i.e., the portions forming pad components 230) are compressed more than portion of blank 301 that are exterior of die elements 312. That is, portions of blank 301 within die elements 312 are compressed against ejection members 313. When die 310 and extractor 320 separate, the compression of pad components 230 causes pad components 230 to expand outward from die elements 312 and remain properly positioned on extractor elements 322. As a result, pad components 230 remain secured to extractor elements 322 upon the separation of die 310 and extractor 320. Additionally, note that blank 301 may remain within die 310 (i.e., around the various die elements 312) at this stage, or may be separated from die 310, and also that blank 301 defines various apertures where pad components 230 were removed.

As a summary of the manufacturing process up to this point, pad components 230 have effectively been removed from blank 301. More particularly, (a) die elements 312 were utilized to cut through blank 301 to form pad components 230 and (b) pad components 230 are removed from die elements 312 and remain secured to extractor 320 due to the presence of extractor elements 322, which extend into the various pad components 230. Additionally, pad components 230 are positioned and oriented in the same manner as die elements 312 and are, therefore, positioned and oriented as within cushioning element 200. Accordingly, pad components 230 have been removed from blank 301 and are positioned and oriented to be incorporated into cushioning element 200.

Figure 11D:
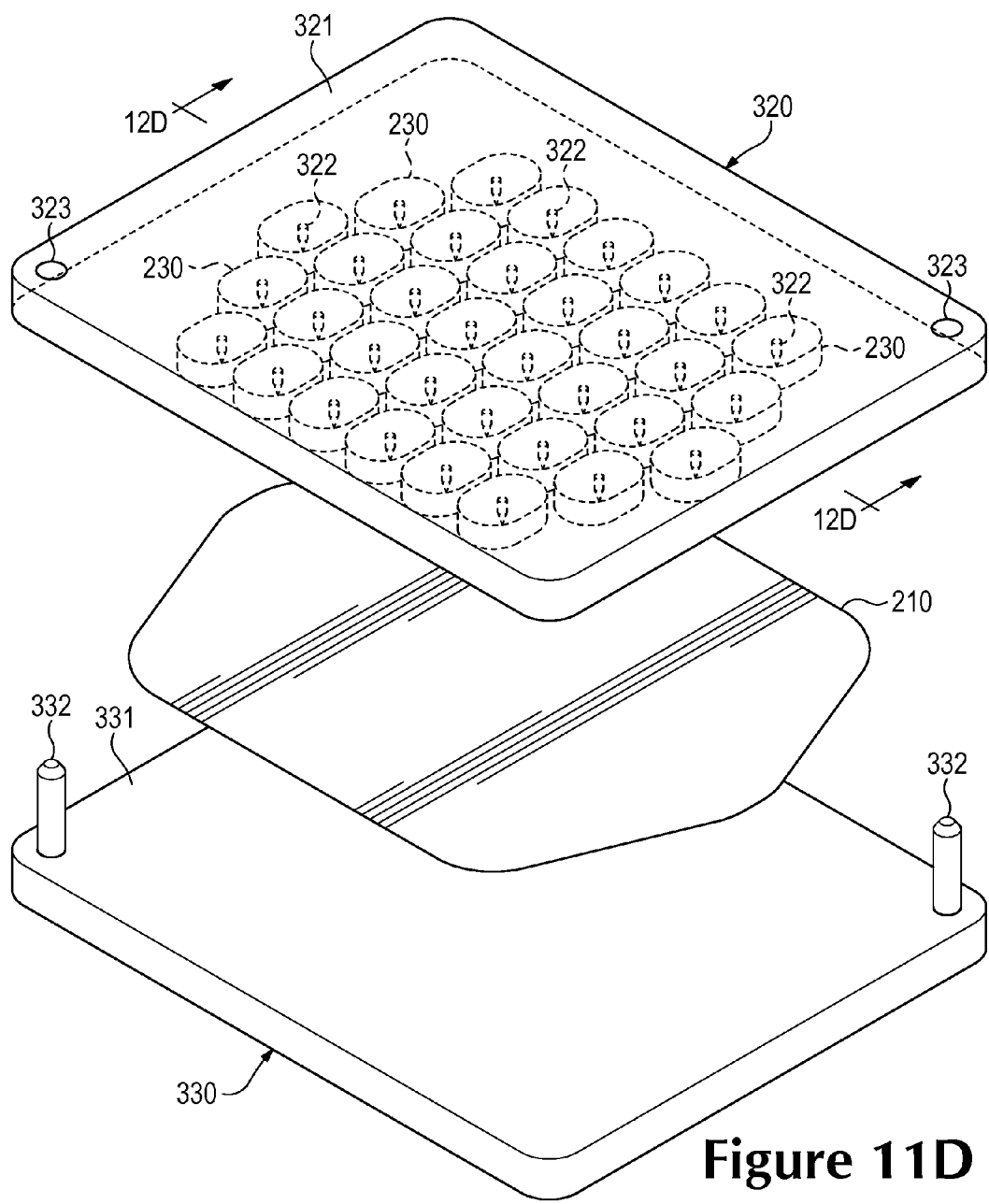
Figure 11E:
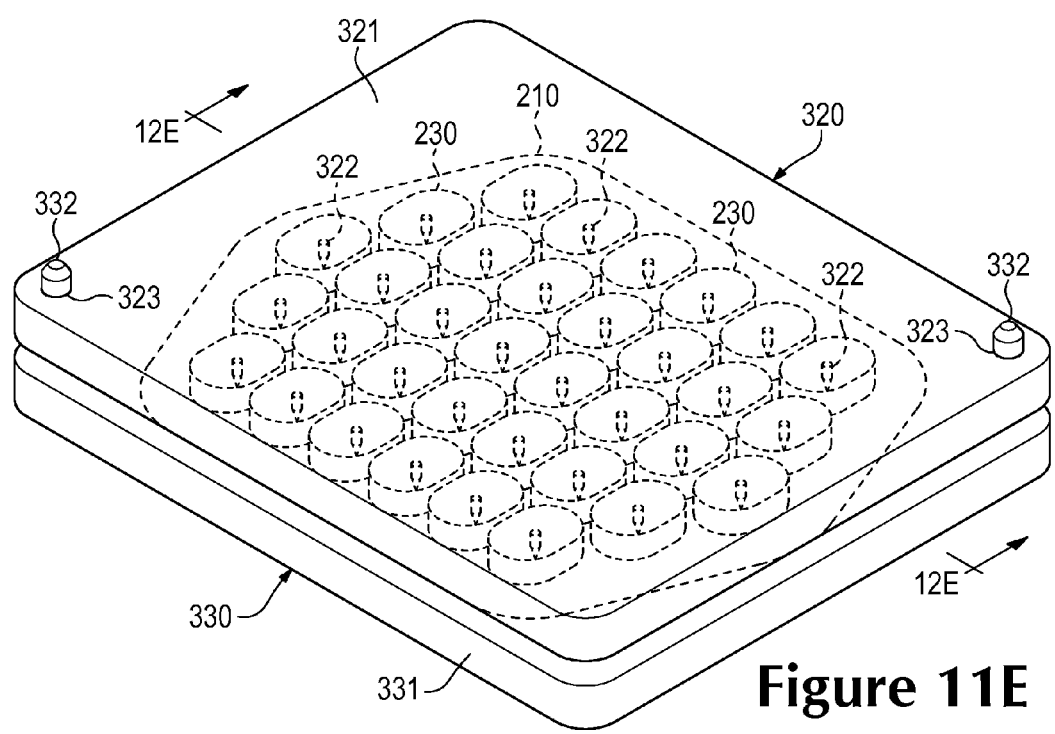
Figure 12D:
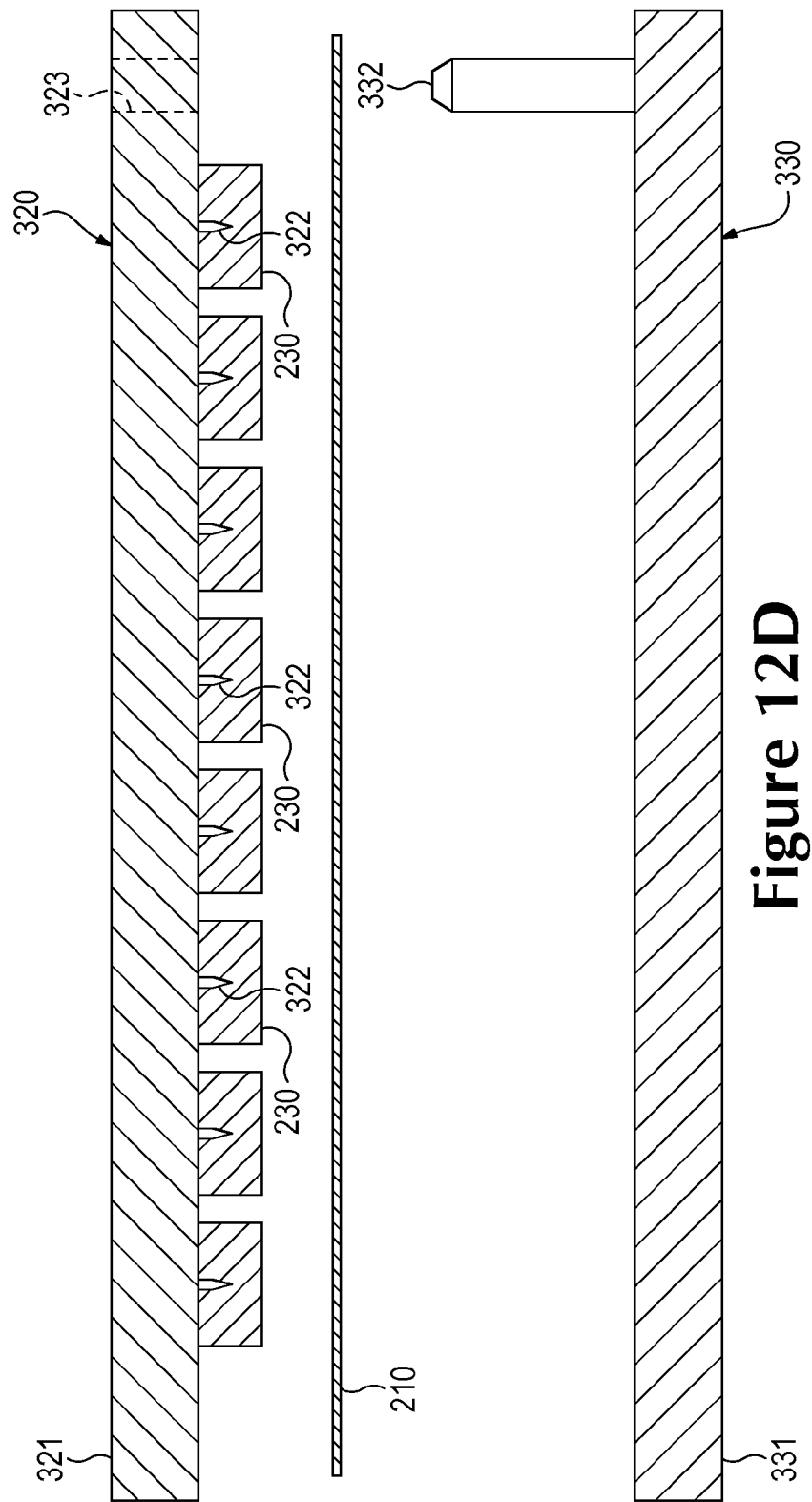
Figure 12E:
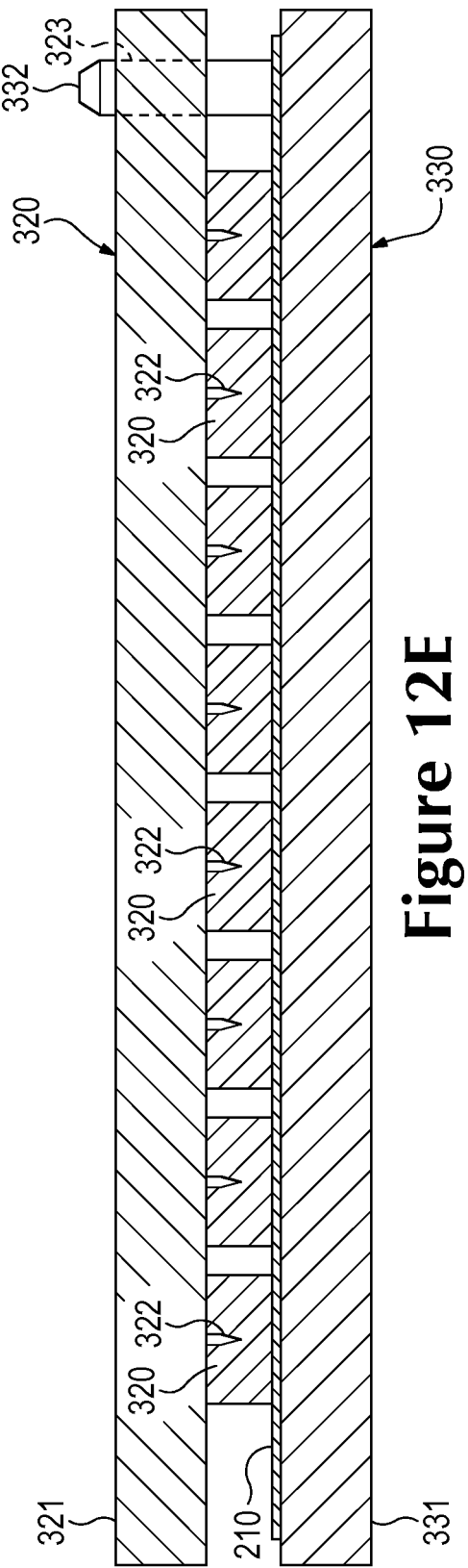

The combination of extractor 320 and pad components 230 is then positioned adjacent to heating plate 330, as depicted in FIGS. 11D and 12D. Additionally, first material layer 210 is placed between pad components 230 and heating plate 330. Extractor 320 and heating plate 330 then close upon and compress first material layer 210 and pad components 230, as depicted in FIGS. 11E and 12E. As discussed above, base 331 of heating plate 330 incorporates heating elements. As such, the temperature of base 331 may be elevated to a point where bonding occurs between first material layer 210 and pad components 230. In order to ensure that pad components 230 are properly positioned relative to first material layer 210, registration pegs 332 are aligned with and enter registration apertures 323.

When compressed between extractor 320 and heating plate 330, energy from heating plate 330 may be utilized to bond first material layer 210 and pad components 230 to each other. A thermoplastic polymer material melts when heated and returns to a solid state when cooled sufficiently. Based upon this property of thermoplastic polymer materials, thermalbonding processes may be utilized to form a thermalbond that joins first material layer 210 are pad components 230. As utilized herein, the term "thermalbonding" or variants thereof is defined as a securing technique between two elements that involves a softening or melting of a thermoplastic polymer material within at least one of the elements such that the materials of the elements are secured to each other when cooled. Similarly, the term "thermalbond" or variants thereof is defined as the bond, link, or structure that joins two elements through a process that involves a softening or melting of a thermoplastic polymer material within at least one of the elements such that the materials of the elements are secured to each other when cooled. As examples, thermalbonding may involve, for example, (a) the melting or softening of thermoplastic materials within either of first material layer 210 and pad components 230 that joins the elements together, (b) the melting or softening of a thermoplastic material within pad components 230 such that the thermoplastic polymer material extends into or infiltrates the structure of a textile utilized for first material layer 210, or (c) the melting or softening of a thermoplastic material within first material layer 210 such that the thermoplastic polymer material extends into or infiltrates the structure of pad components 230. Thermalbonding may occur when only one element includes a thermoplastic polymer material or when both elements include thermoplastic polymer materials. Additionally, thermalbonding does not generally involve the use of stitching or adhesives, but involves directly bonding elements to each other with heat. In some situations, however, stitching or adhesives may be utilized to supplement the thermalbond or the joining of elements through thermalbonding. As an alternative to thermalbonding, an adhesive, a thermally-activated adhesive, or other securing structure may be utilized to join first material layer 210 and pad components 230.

As discussed above, a surface of base 331 that contacts portions of cushioning element 200 during the manufacturing process may incorporate a rubber or silicone material. Referring to FIG. 12E, extractor elements 322 are spaced from and do not contact base 331. In situations where the compression of first material layer 210 and pad components 230 induces extractor elements 322 to contact base 331, the rubber or silicone material may be present to receive end areas of extractor elements 322. That is, the end areas of extractor elements 322 may pierce and enter the rubber or silicone material during the compression of first material layer 210 and pad components 230.

Figure 11F:
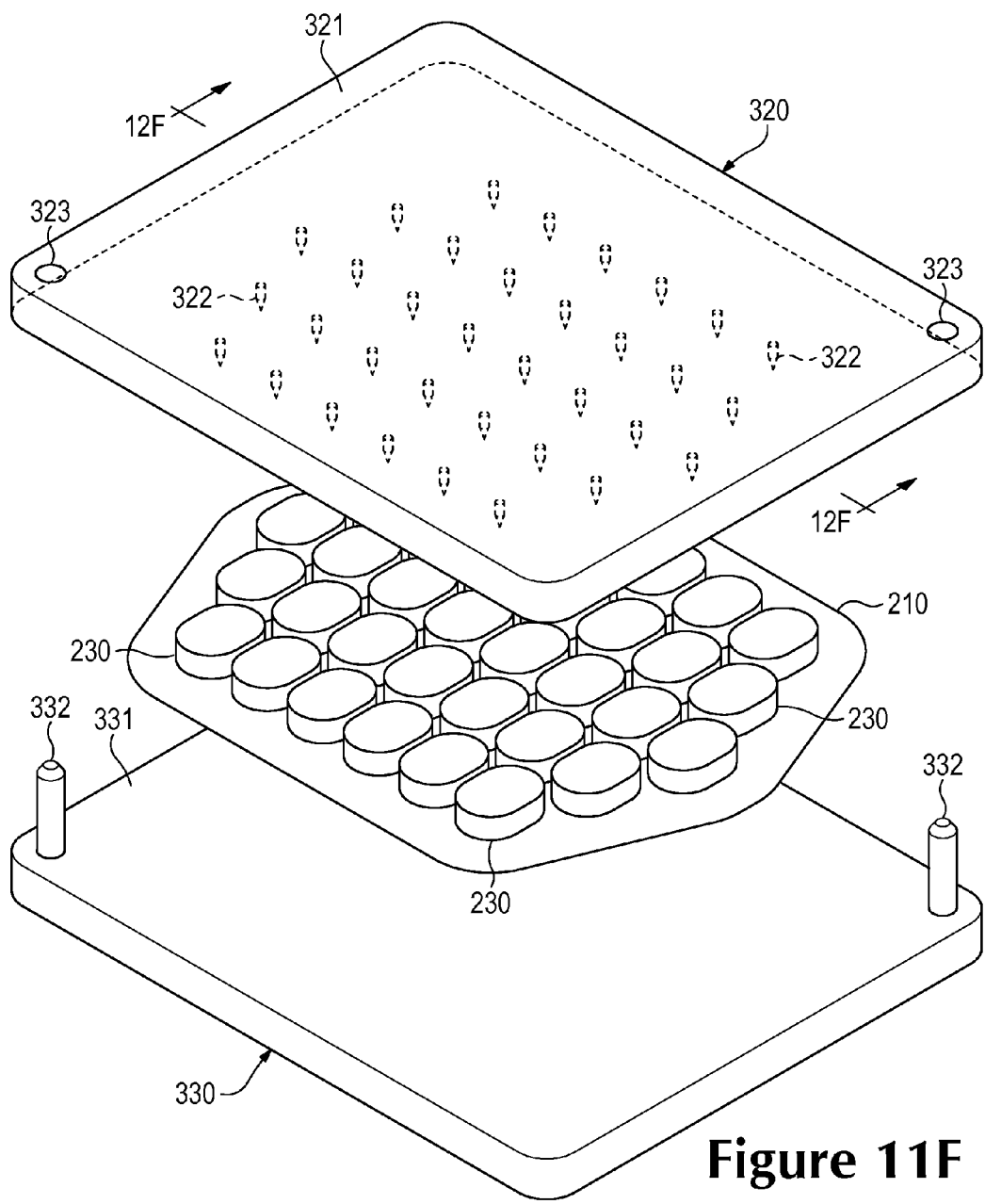
Figure 11G:
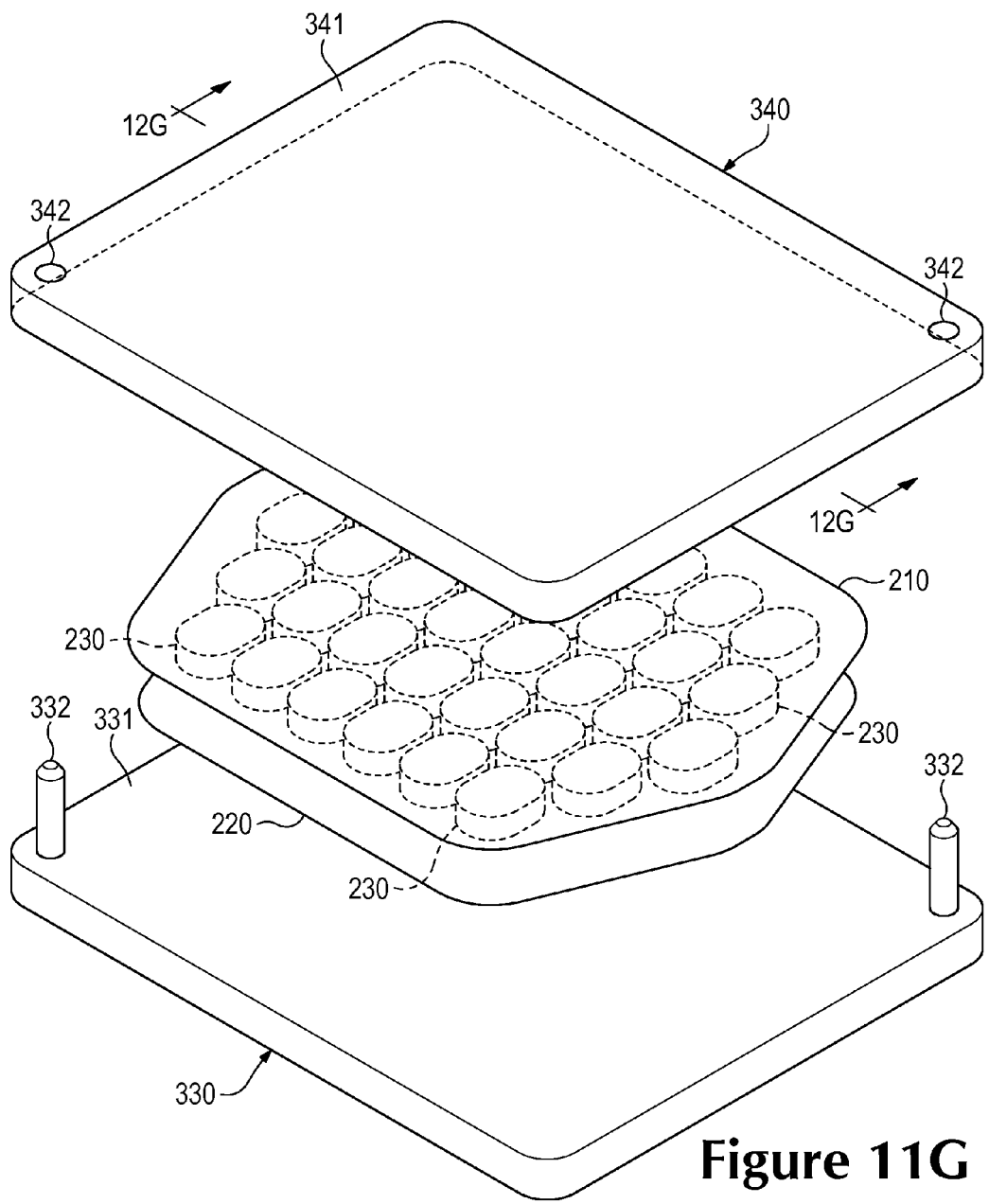
Figure 11H:
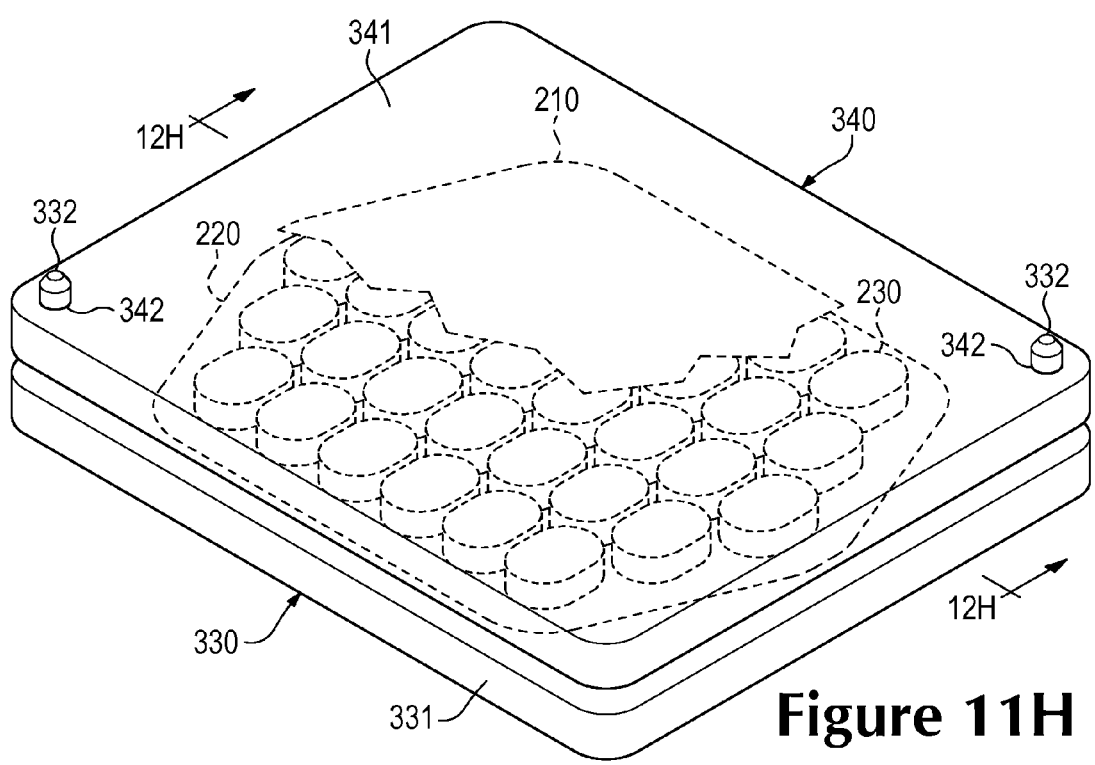
Figure 12F:
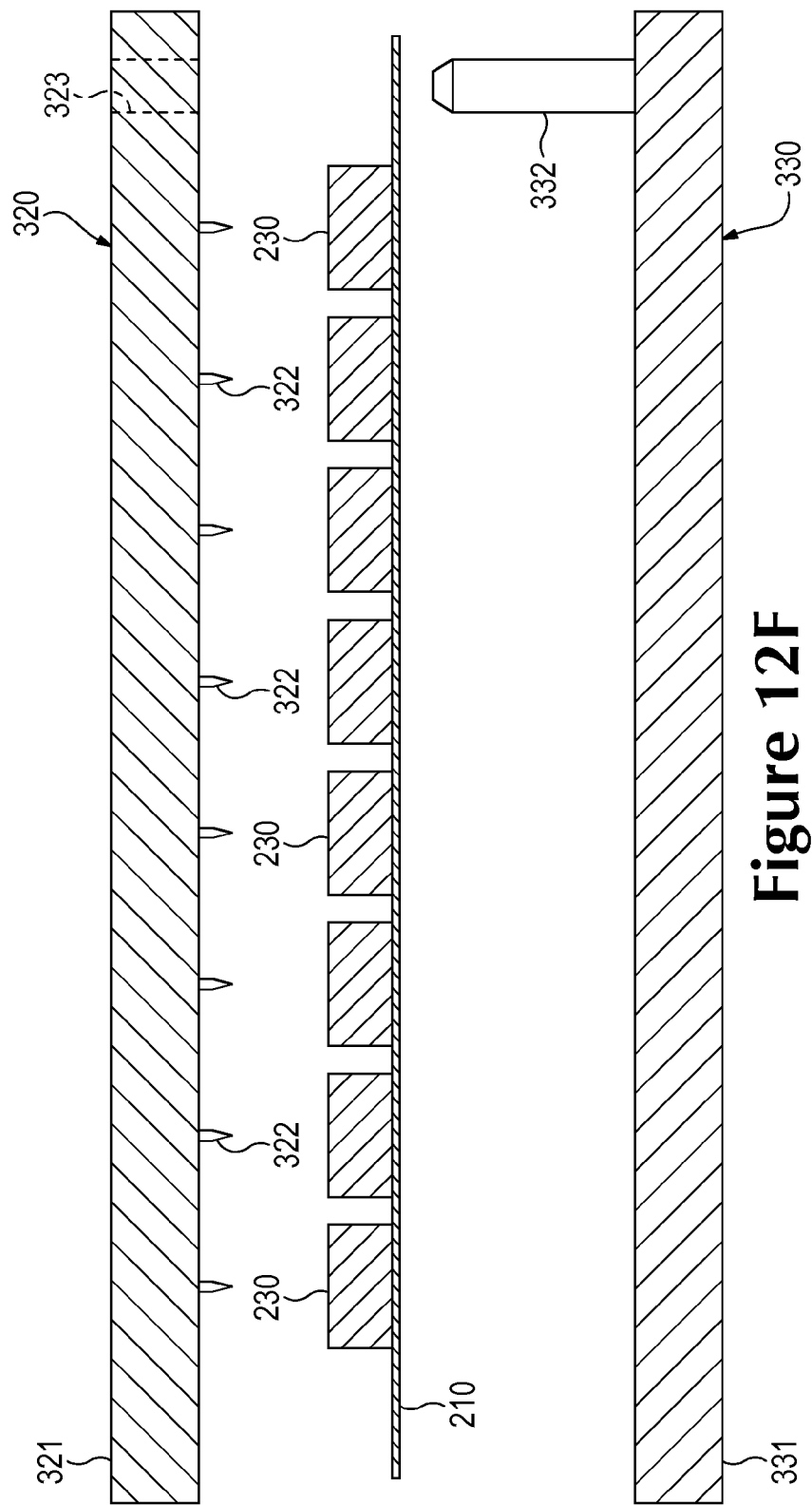
Figure 12G:
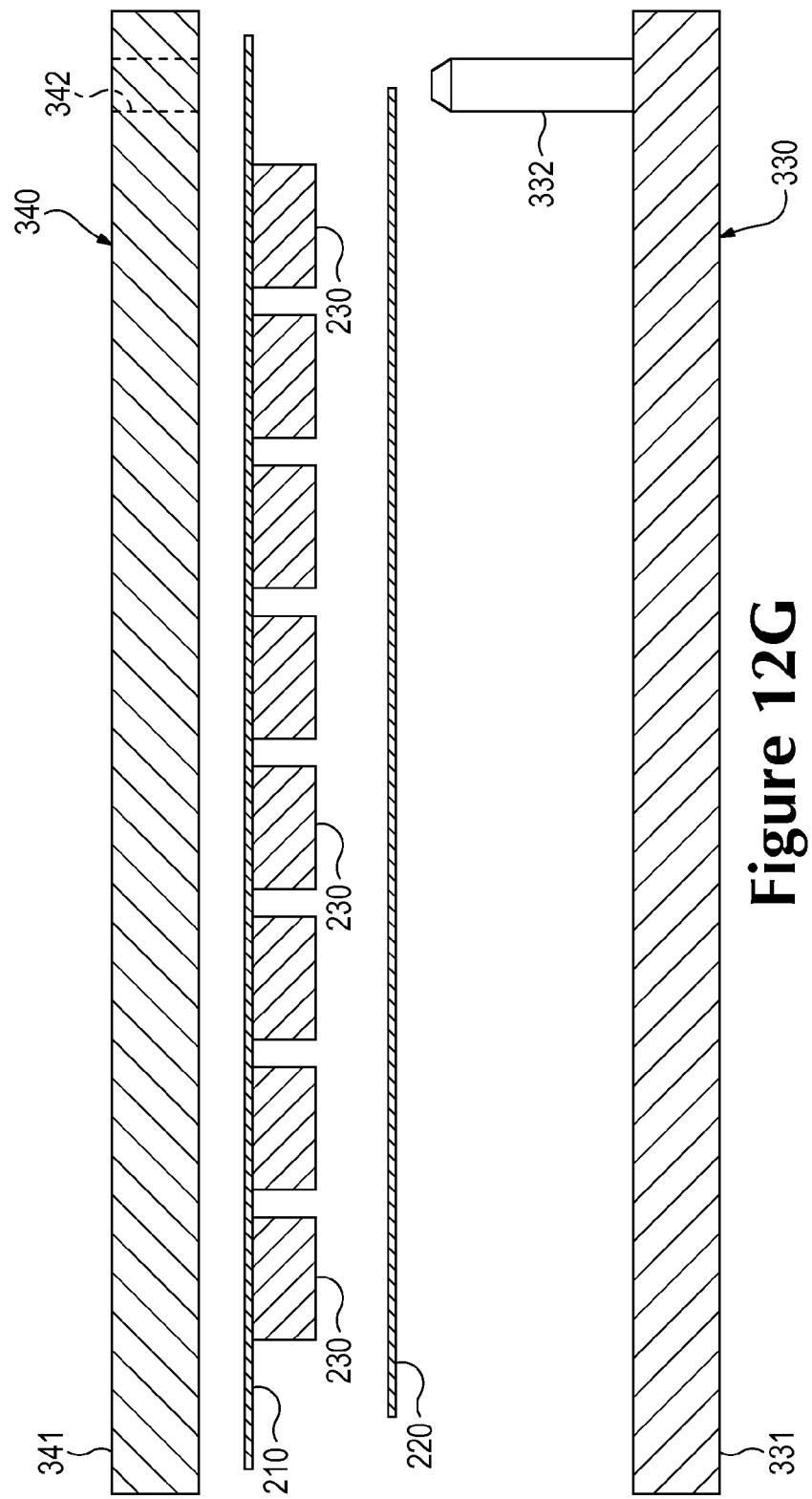
Figure 12H:
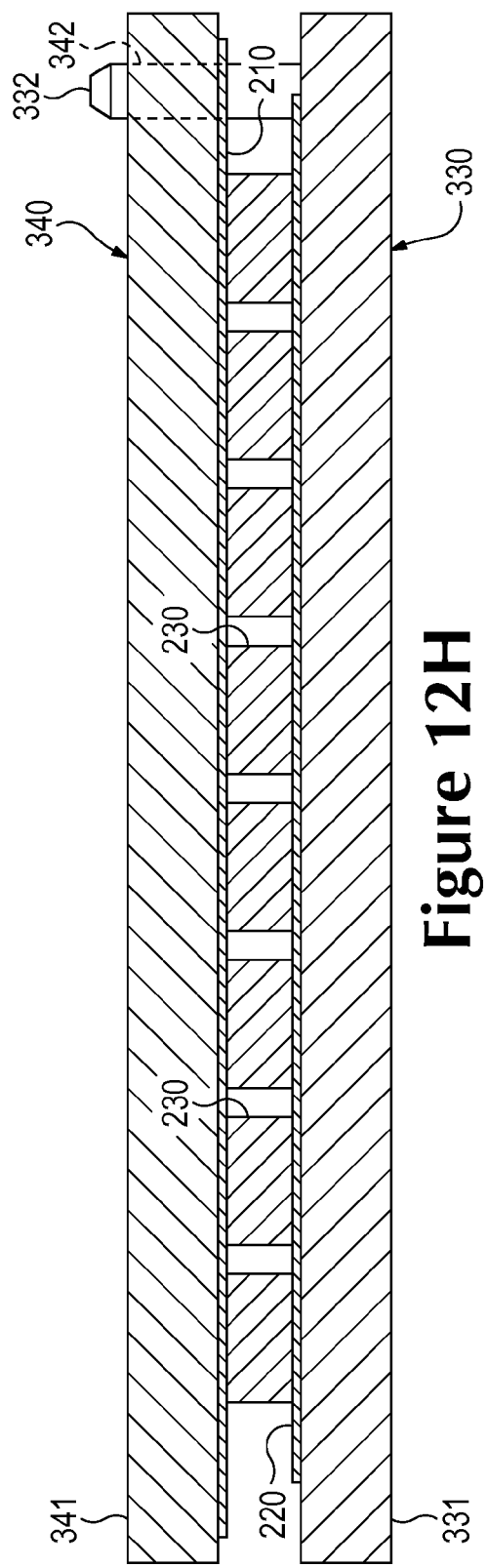

Following compression and bonding, extractor 320 and heating plate 330 separate to expose the bonded first material layer 210 pad components 230, as depicted in FIGS. 11F and 12F. Second material layer 220 is then placed adjacent to heating plate 330, the combination of first material layer 210 and pad components 230 are turned over or otherwise oriented such that pad components 230 are between material layers 210 and 220, and press plate 340 is located adjacent to first material layer 210, as depicted in FIGS. 11G and 12G. Press plate 340 and heating plate 330 then close upon and compress first material layer 210, second material layer 220, and pad components 230, as depicted in FIGS. 11H and 12H. Given the elevated temperature of base 331, bonding (e.g., thermalbonding) occurs between second material layer 220 and pad components 230. In order to ensure that pad components 230 are properly positioned relative to second material layer 220, registration pegs 332 are aligned with and enter registration apertures 342.

Figure 11I:
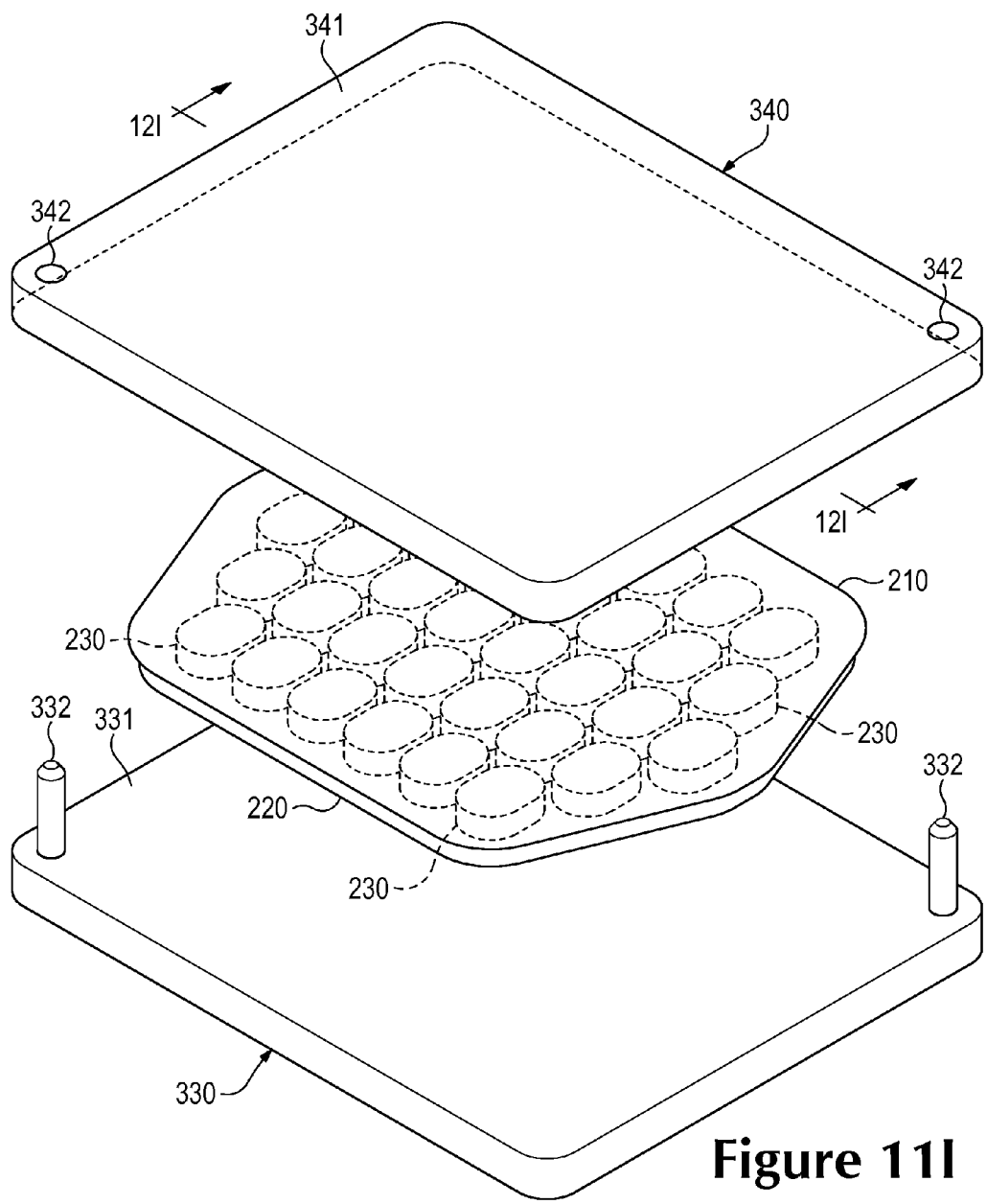
Figure 11J:
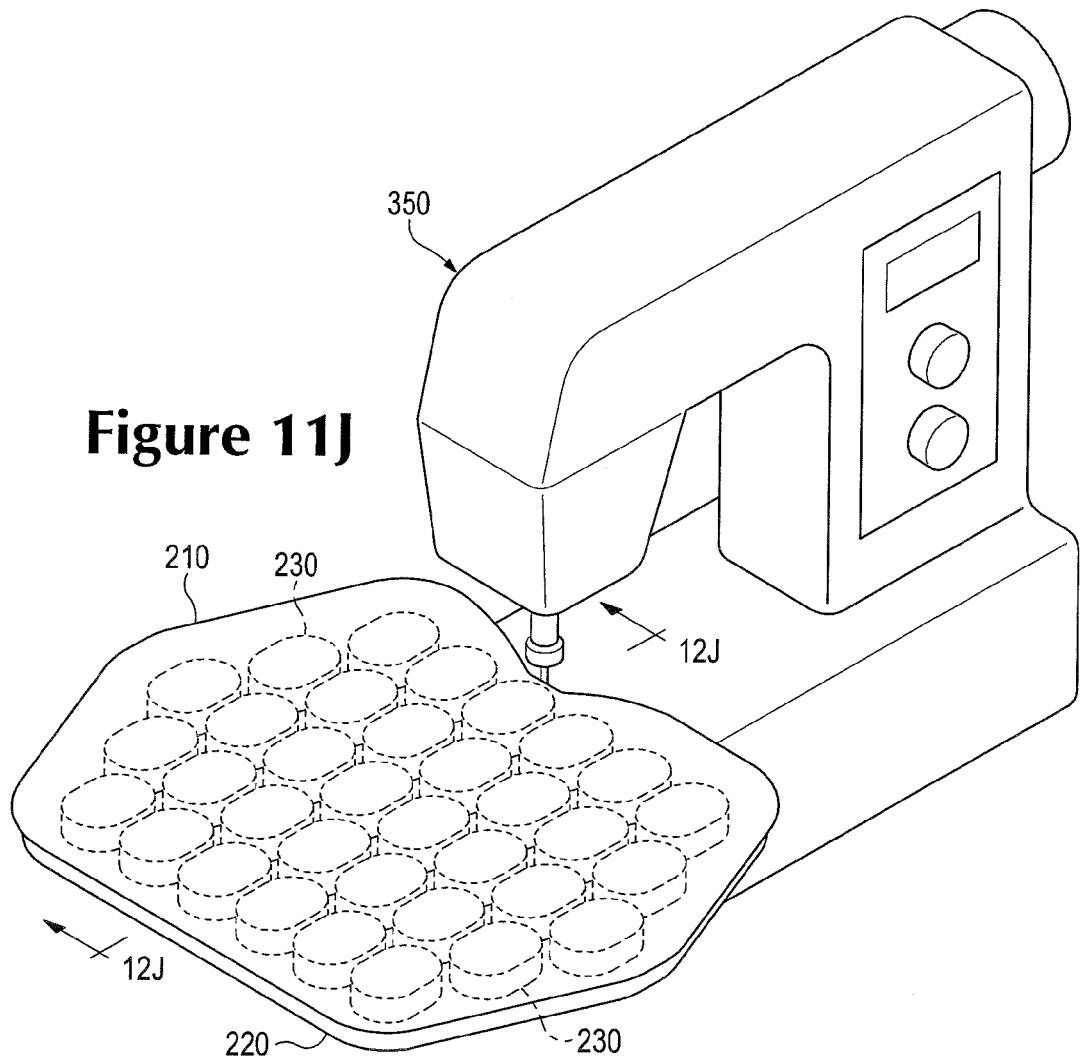
Figure 12I:
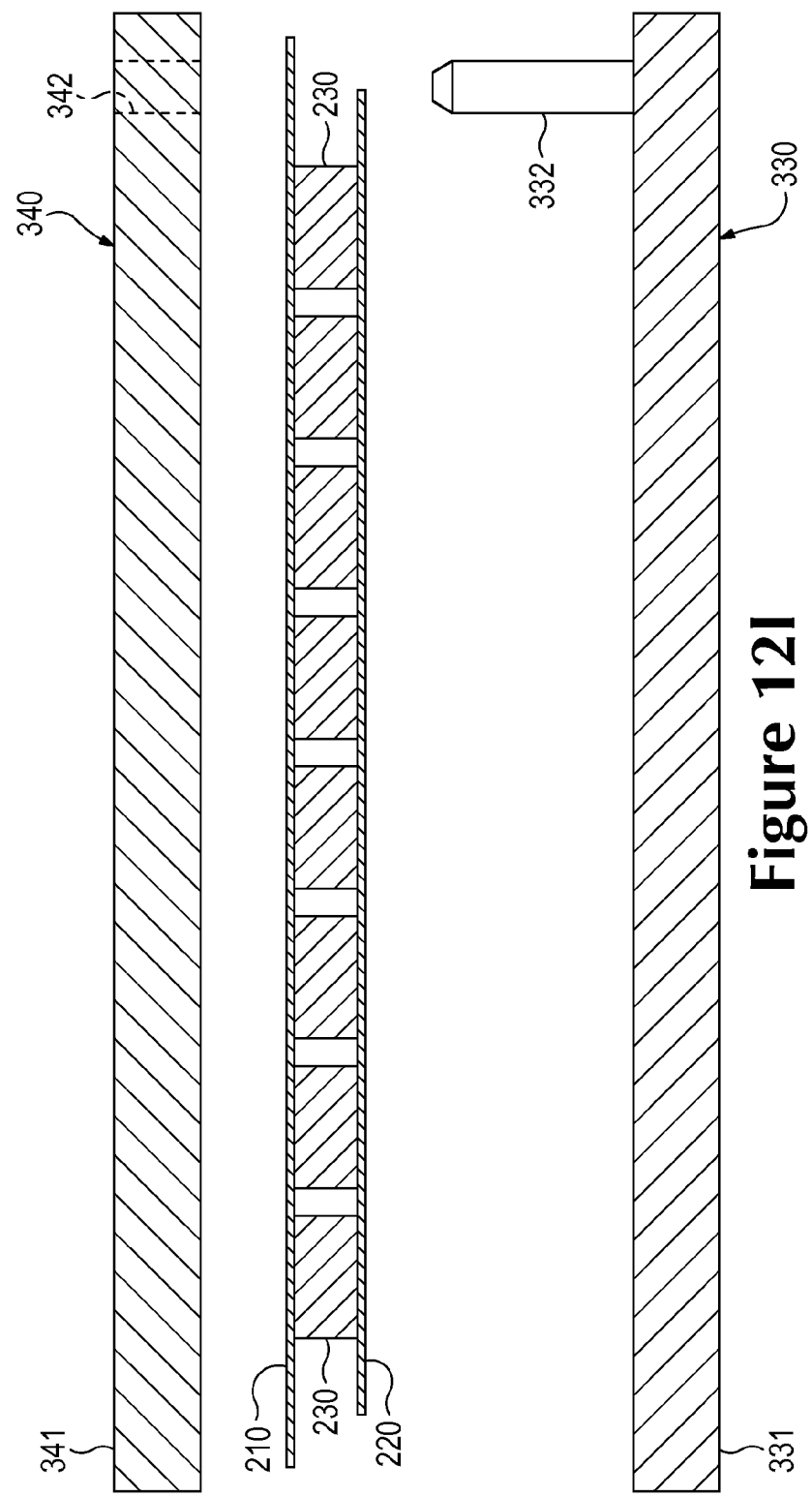
Figure 12J:
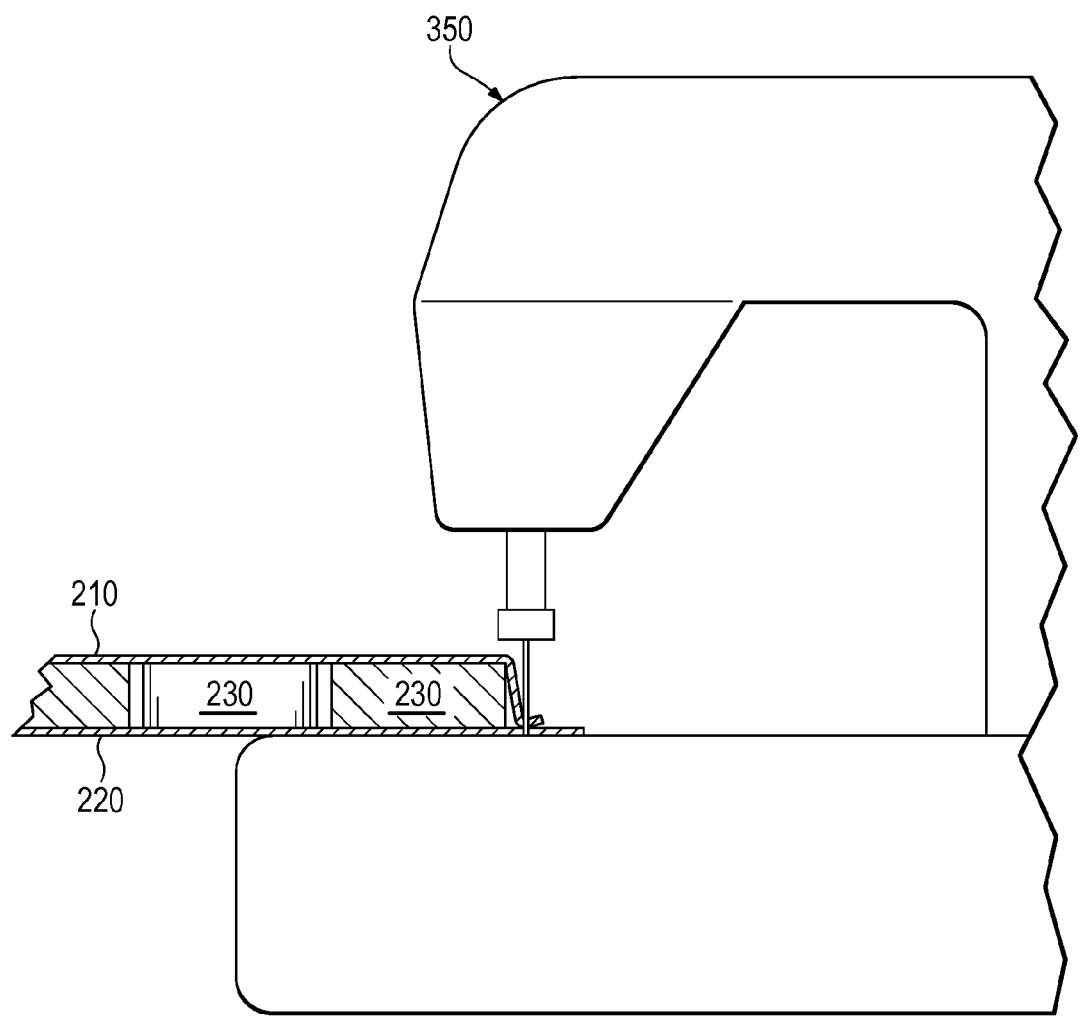

Once compression and bonding are complete, heating plate 330 and press plate 340 separate to expose the bonded first material layer 210, second material layer 220, and pad components 230, as depicted in FIGS. 11I and 12I. At this stage of the manufacturing process, first material layer 210 is unsecured to second material layer 220. Additional stitching, adhesive, or thermalbonding steps may now be utilized to join material layers 210 and 220 around the periphery of pad components 230. As an example, referring to FIGS. 11J and 12J, a sewing or stitching machine 350 may be utilized to secure material layers 210 and 220 to each other, thereby substantially completing the manufacture of cushioning element 200.

The above discussion of FIGS. 11A-11J and 12A-12J provides an example of a suitable manufacturing process for cushioning element 200. In general, an advantage of the manufacturing process is that the arrangement of die elements 312 determines the resulting arrangement of pad components 230 in cushioning element 200. That is, die 310 is initially set such that die elements 312 are positioned in a particular arrangement, and the resulting positions of pad components 230 effectively mirrors the arrangement of die elements 312. Accordingly, the positions of pad components 320 may be pre-selected through the arrangement of die elements 312.

A variety of other manufacturing processes or variations of the manufacturing process discussed above may also be utilized. For example, extractor elements 322 may retract such that extractor 320 may also be utilized as press plate 340. In other configurations, ejection material 313 may be absent or a mechanized ejector may be utilized within die elements 312. Moreover, extractor elements 322 may be removable or positioned in various locations to allow different configurations of pad components 230. Moreover, specialized machinery may be formed to automate the general manufacturing process discussed above.

A variety of techniques may be utilized to incorporate cushioning element 200 into apparel 100 or other articles of apparel. As an example, cushioning element 200 may be stitched or otherwise bonded to other materials forming apparel 100. In some configurations, cushioning element 200 may have the configuration depicted in FIG. 6, wherein (a) the second material layer 220 extends outward beyond the periphery of first material layer 210. In this configuration, second material layer 220 may be part of a larger material element that forms portions of apparel 100. That is, second material layer 220 may form interior surface 106 of apparel 100, as well as exterior surface 105 in areas where cushioning elements 200 are absent. In other configurations, cushioning element 200 may be oriented such that first material layer 210 forms a portion of interior surface 106. Accordingly, the manner in which cushioning element 200 is incorporated into apparel 100 may vary.

Further Cushioning Element Configurations

Aspects of cushioning element 200 may vary, depending upon the intended use for cushioning element 200 and the product in which cushioning element 200 is incorporated. Moreover, changes to the dimensions, shapes, and materials utilized within cushioning element 200 may vary the overall properties of cushioning element 200. That is, by changing the dimensions, shapes, and materials utilized within cushioning element 200, the compressibility, impact force attenuation, breathability, flexibility, and overall mass of cushioning element 200 may be tailored to specific purposes or products. A plurality of variations for cushioning element 200 are discussed below. Any of these variations, as well as combinations of these variations, may be utilized to tailor the properties of cushioning element 200 to an intended use or particular product. Moreover, any of these variations may be manufactured through the process or variations of the process discussed above.

Figure 13:
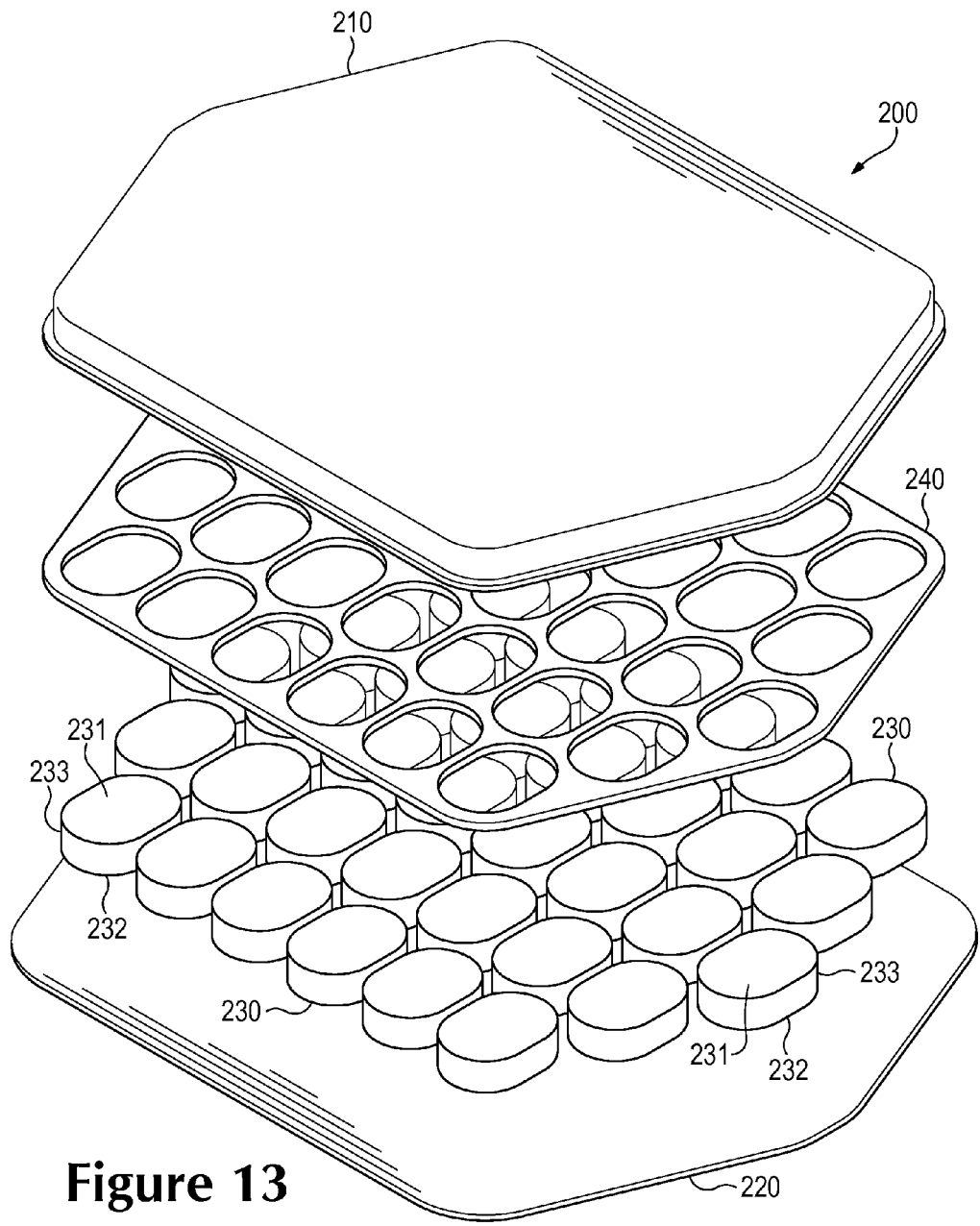
FIG. 13 is an exploded perspective views corresponding with FIG. 7 and depicting a further configuration of the cushioning element.

A further configuration of cushioning element 200 is depicted in FIG. 13, wherein a frame component 240 is positioned to extend around and between various pad components 230. Although pad components 230 are secured to material layers 210 and 220, frame component 240 may be unsecured to layers 210 and 220, and a thickness of frame component 240 may be less than the thickness of pad components 230. An advantage of frame components 240 relates to providing additional protection when objects contact cushioning element 200 and protrude between pad components 230.

Figure 14A:
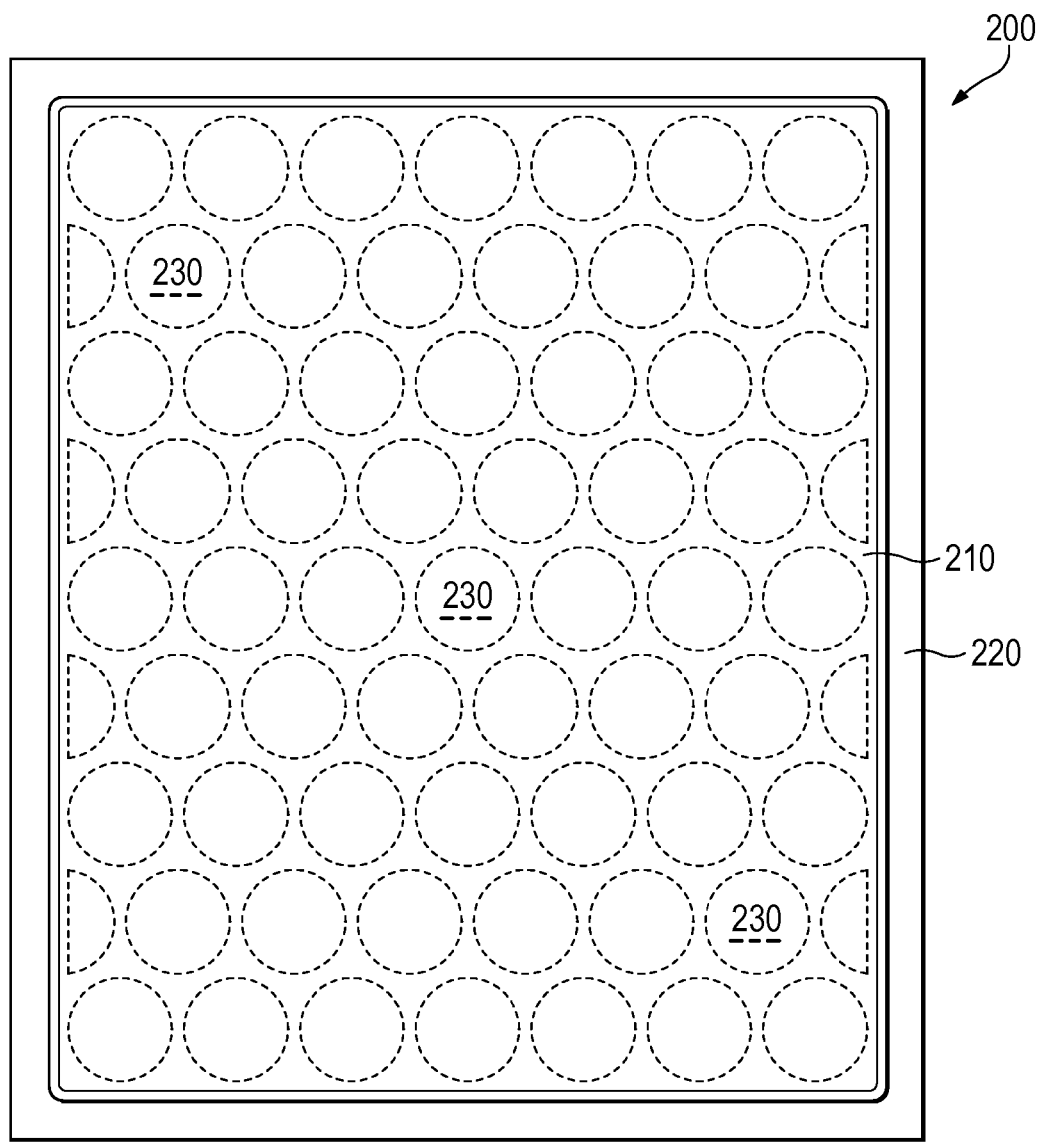
FIGS. 14A-14P are top plan views corresponding with FIG. 8 and depicting further configurations of the cushioning element.
Figure 14B:
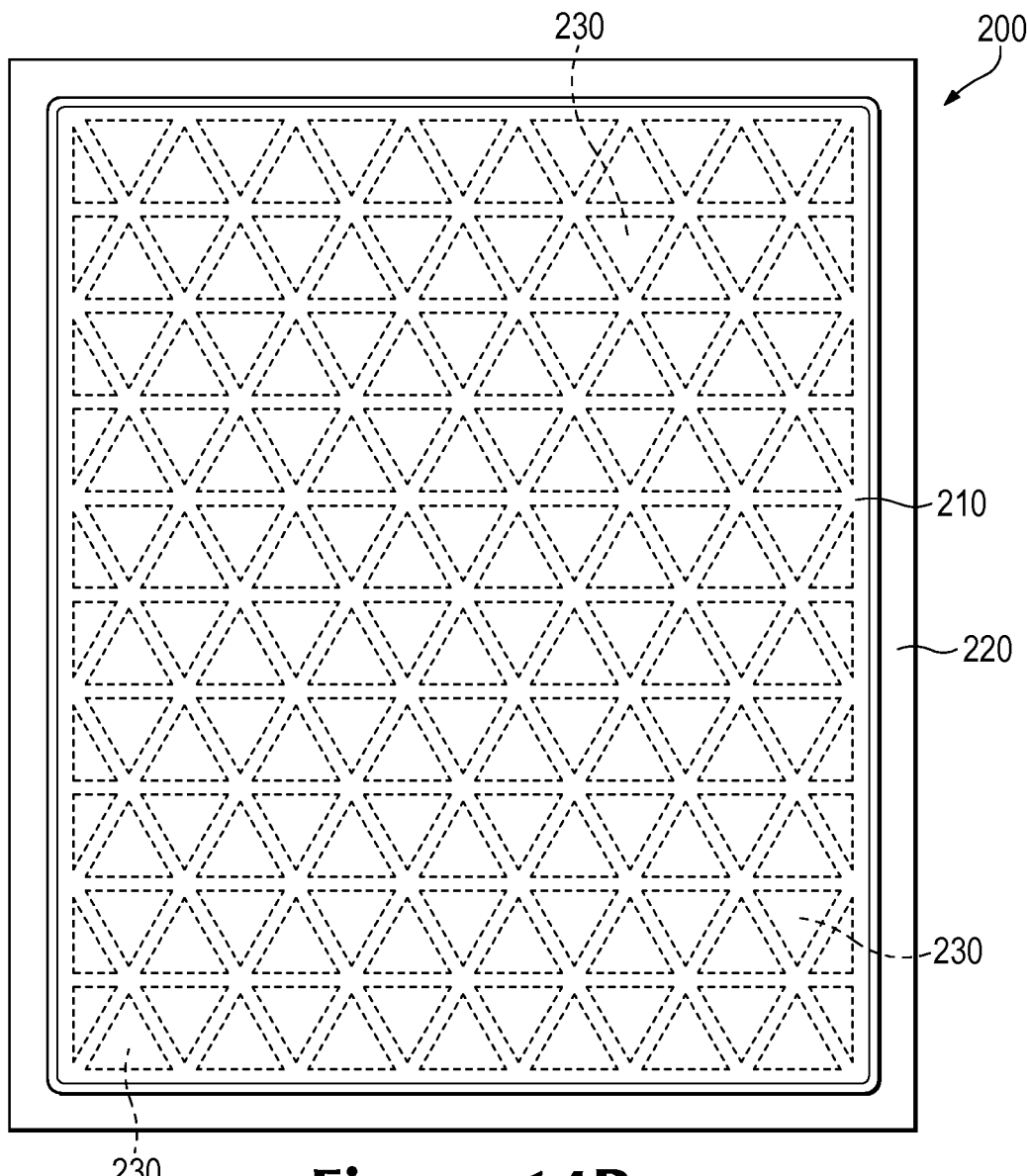
Figure 14C:
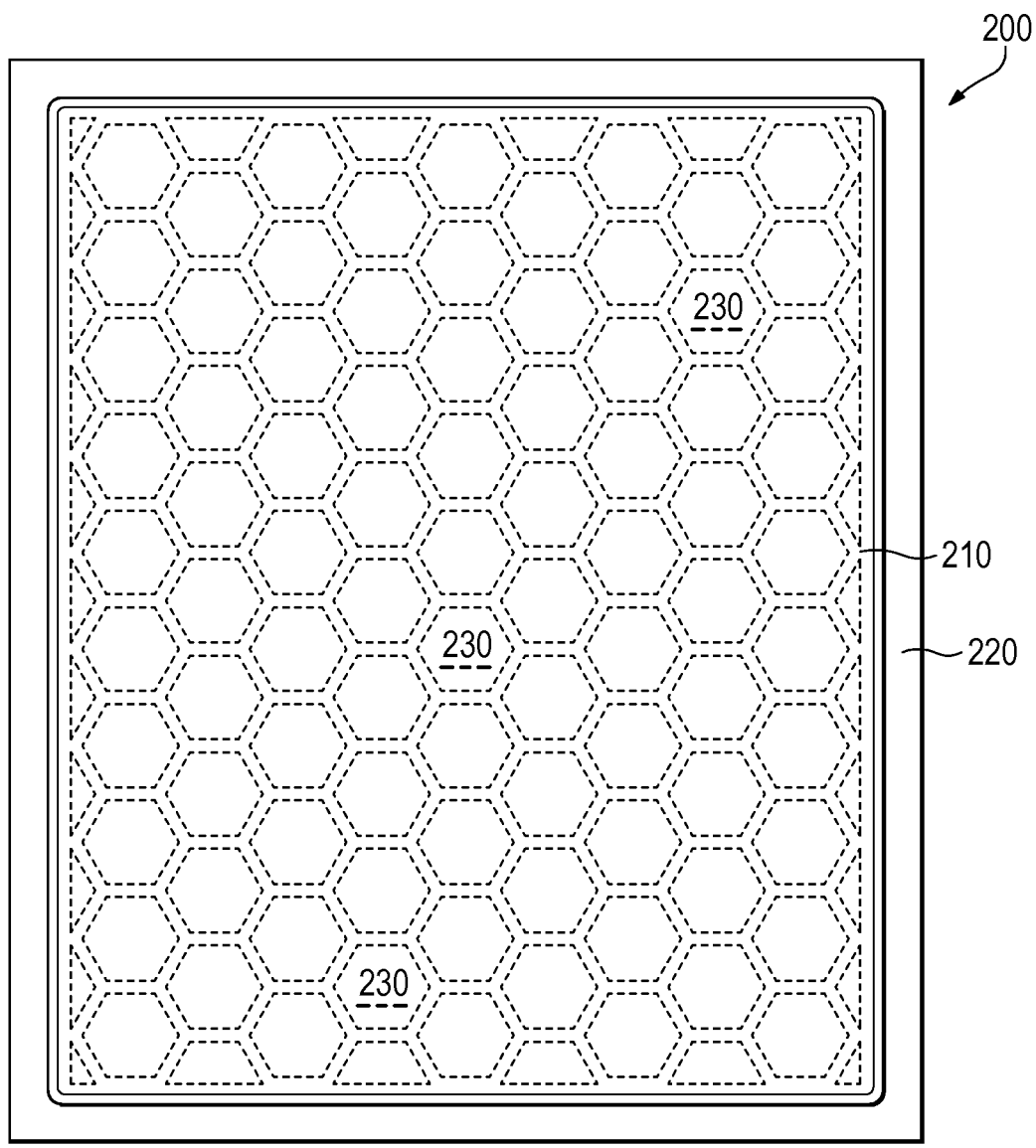
Figure 14D:
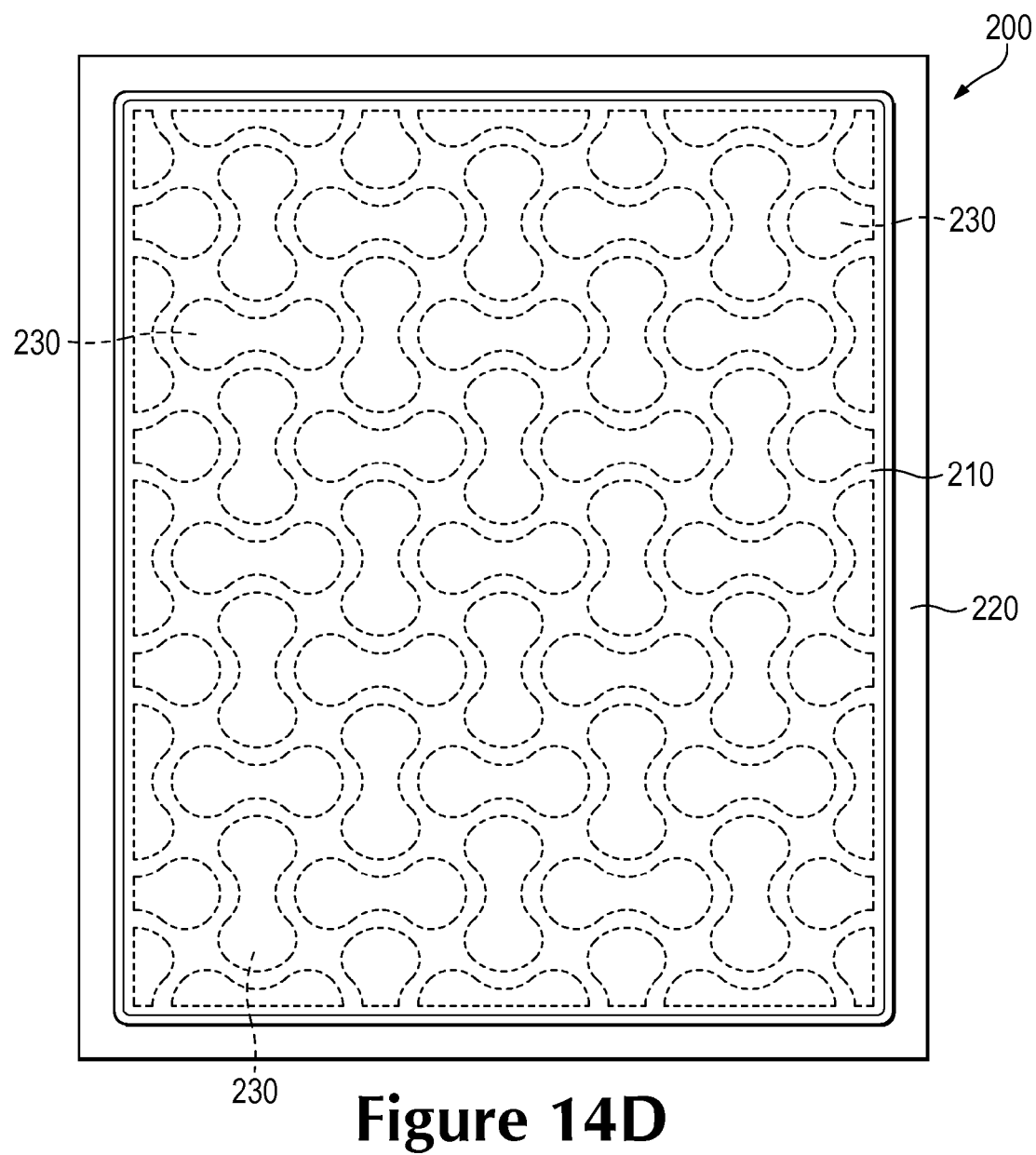
Figure 14E:
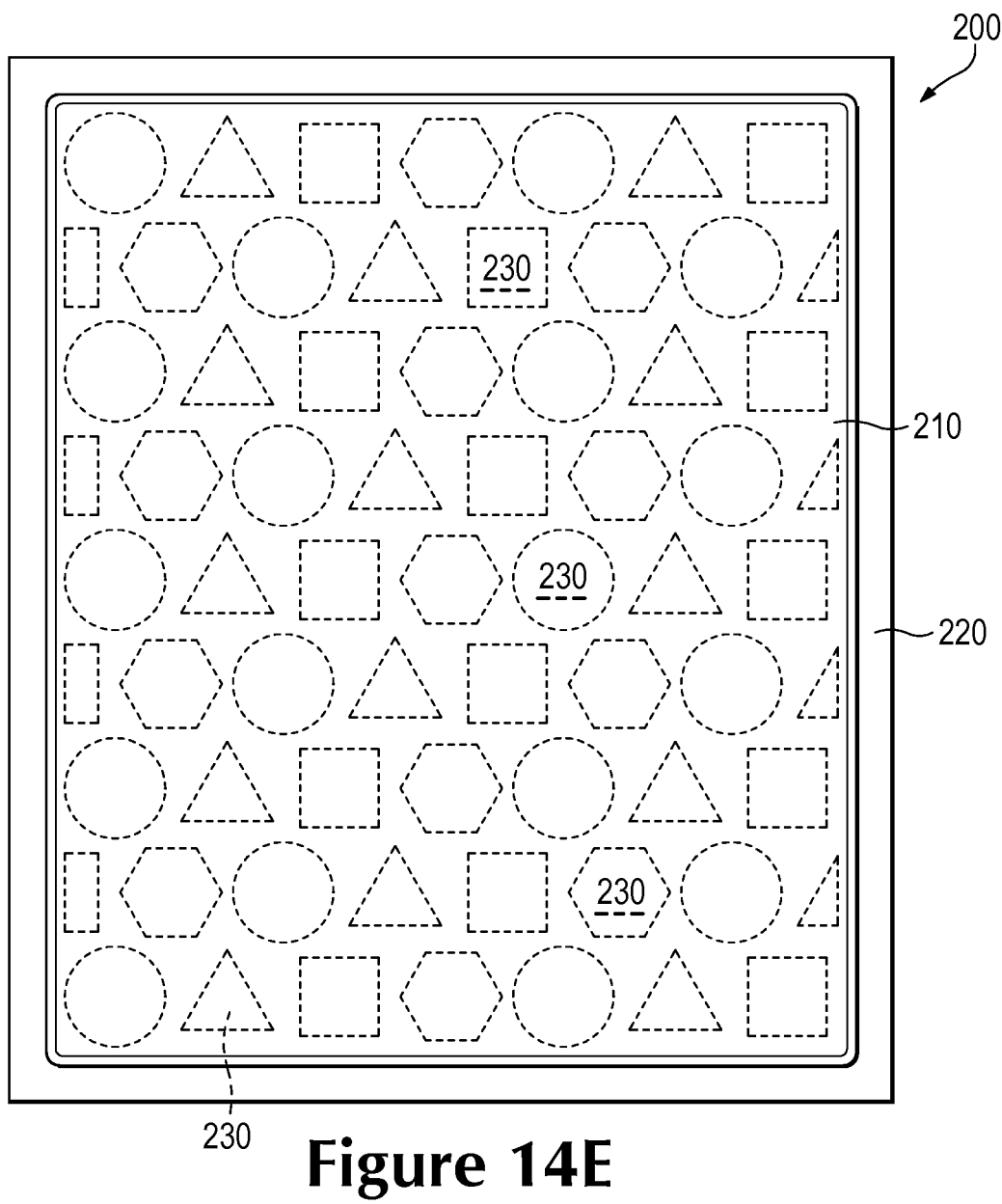
Figure 14F:
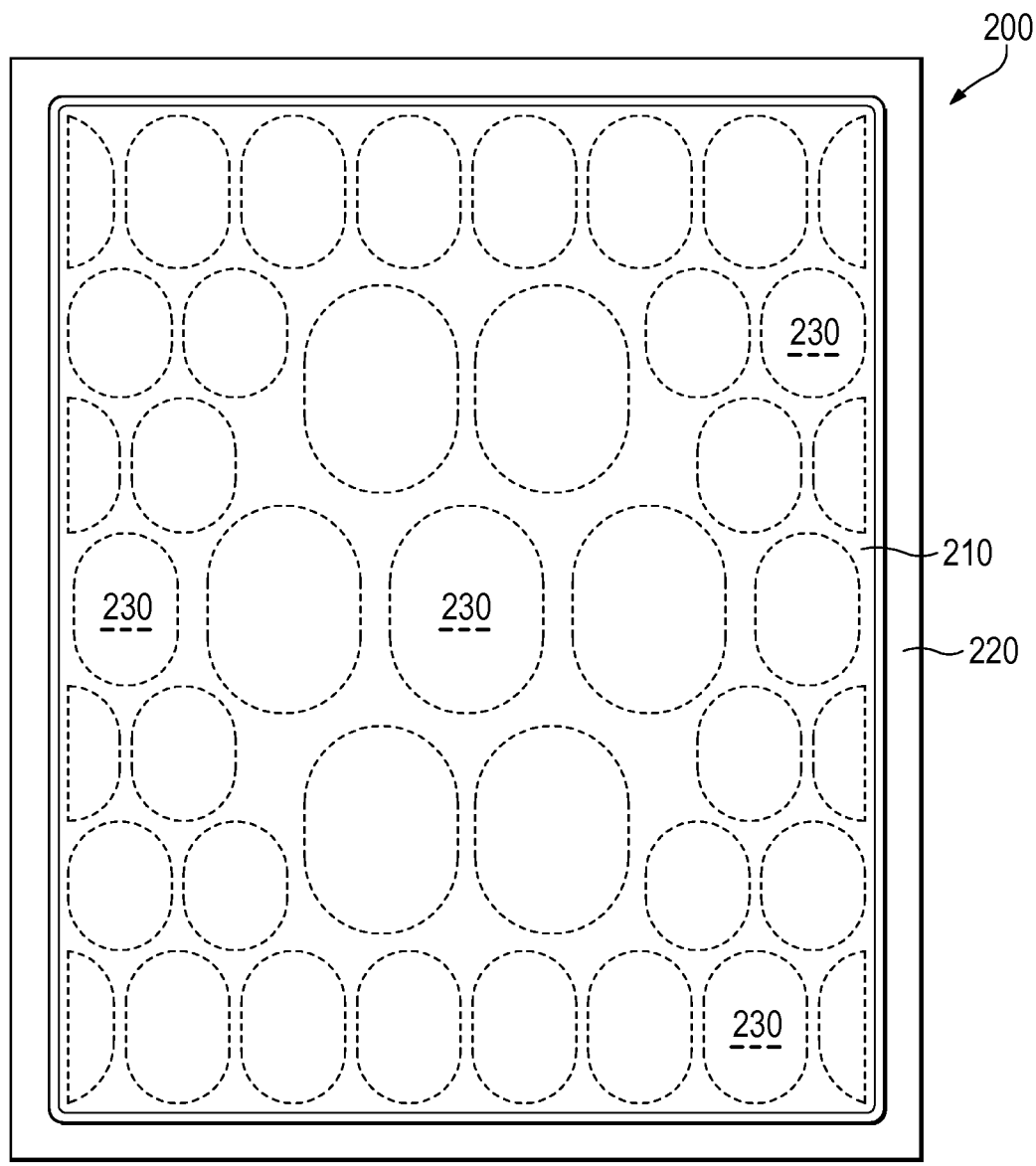

As discussed above, pad components 230 have an elliptical or generally elongate shape with rounded end areas. Pad components 230 may, however, have a variety of other shapes, including round, triangular, and hexagonal, as respectively depicted in FIGS. 14A-14C. Pad components 230 may have an irregular shape, as depicted in FIG. 14D, or may be a mixture of different shapes, as depicted in FIG. 14E. Although each of pad components 230 may have the same shape and size, pad components 230 may also have generally similar shapes with a variety of different sizes, as depicted in FIG. 14F.

Figure 14G:
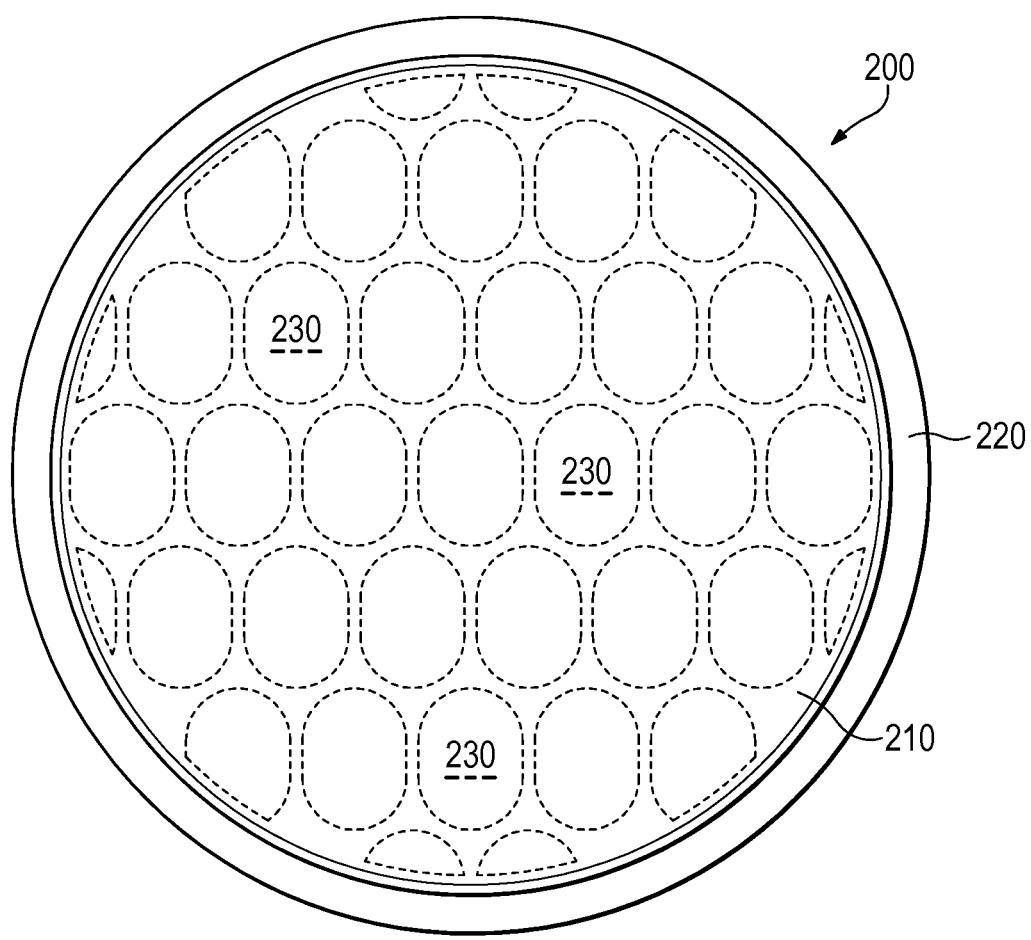
Figure 14H:
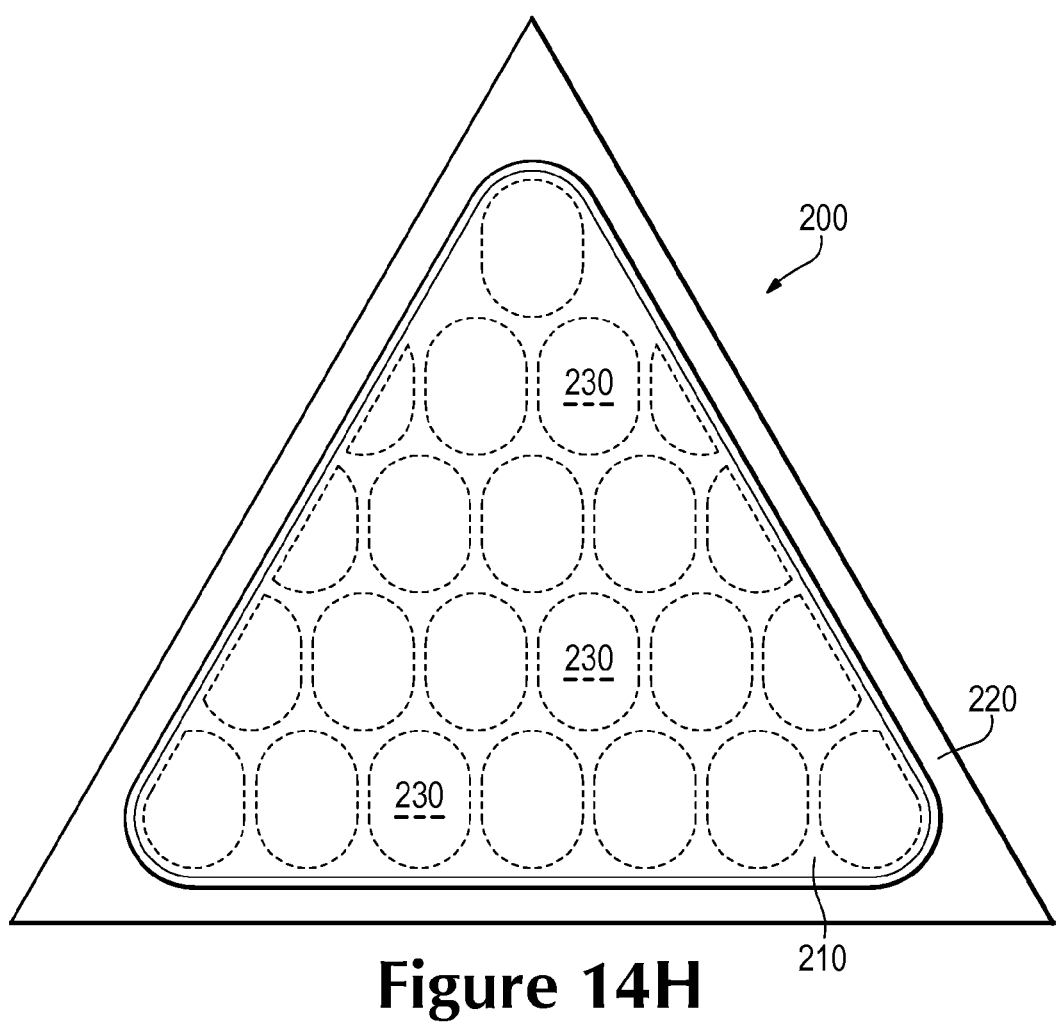
Figure 14I:
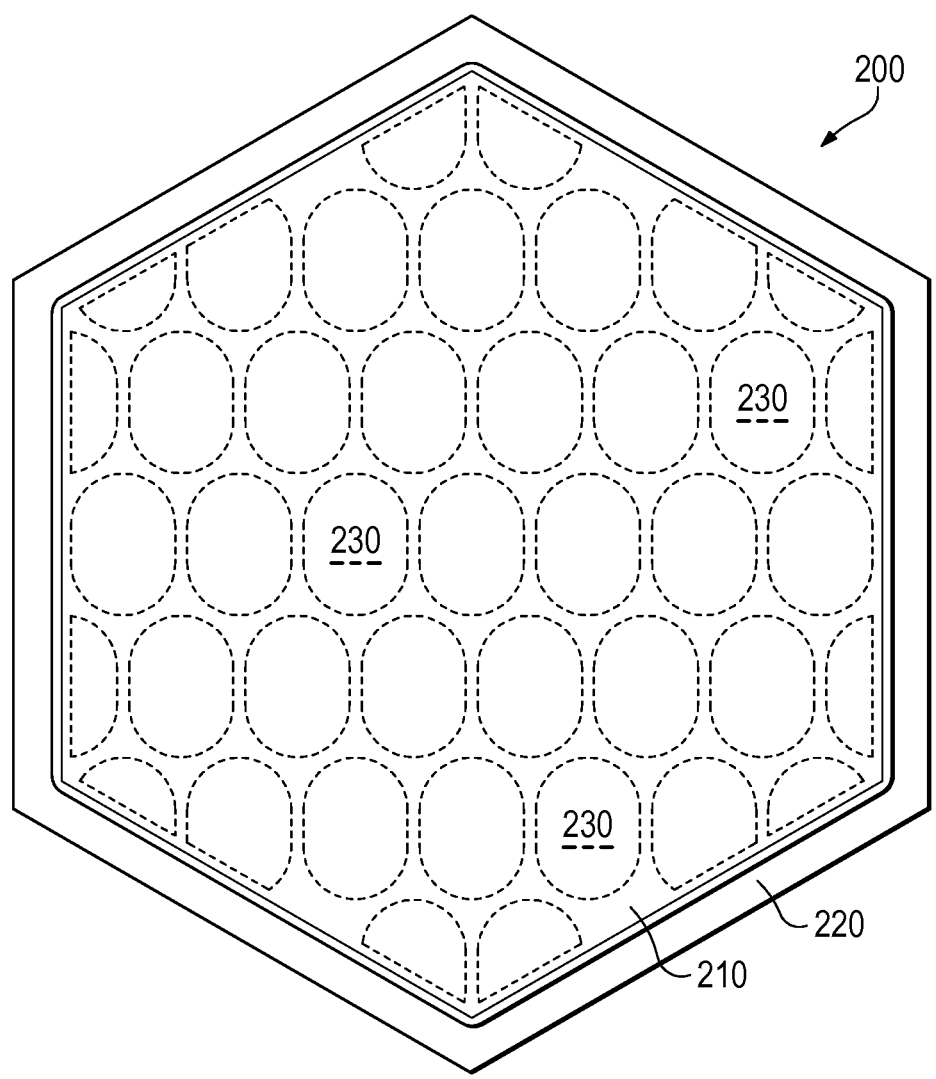
Figure 14J:
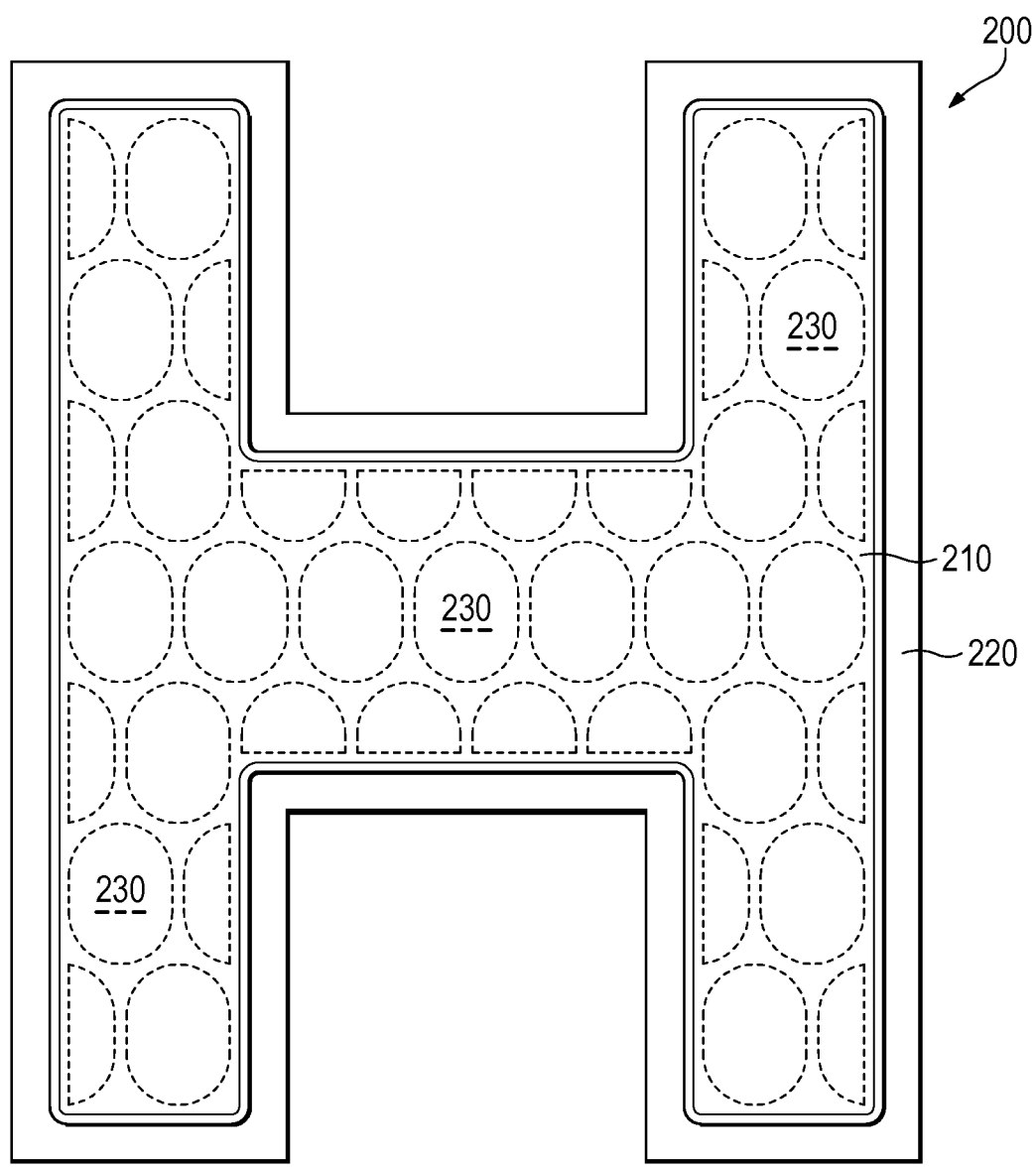
Figure 14K:
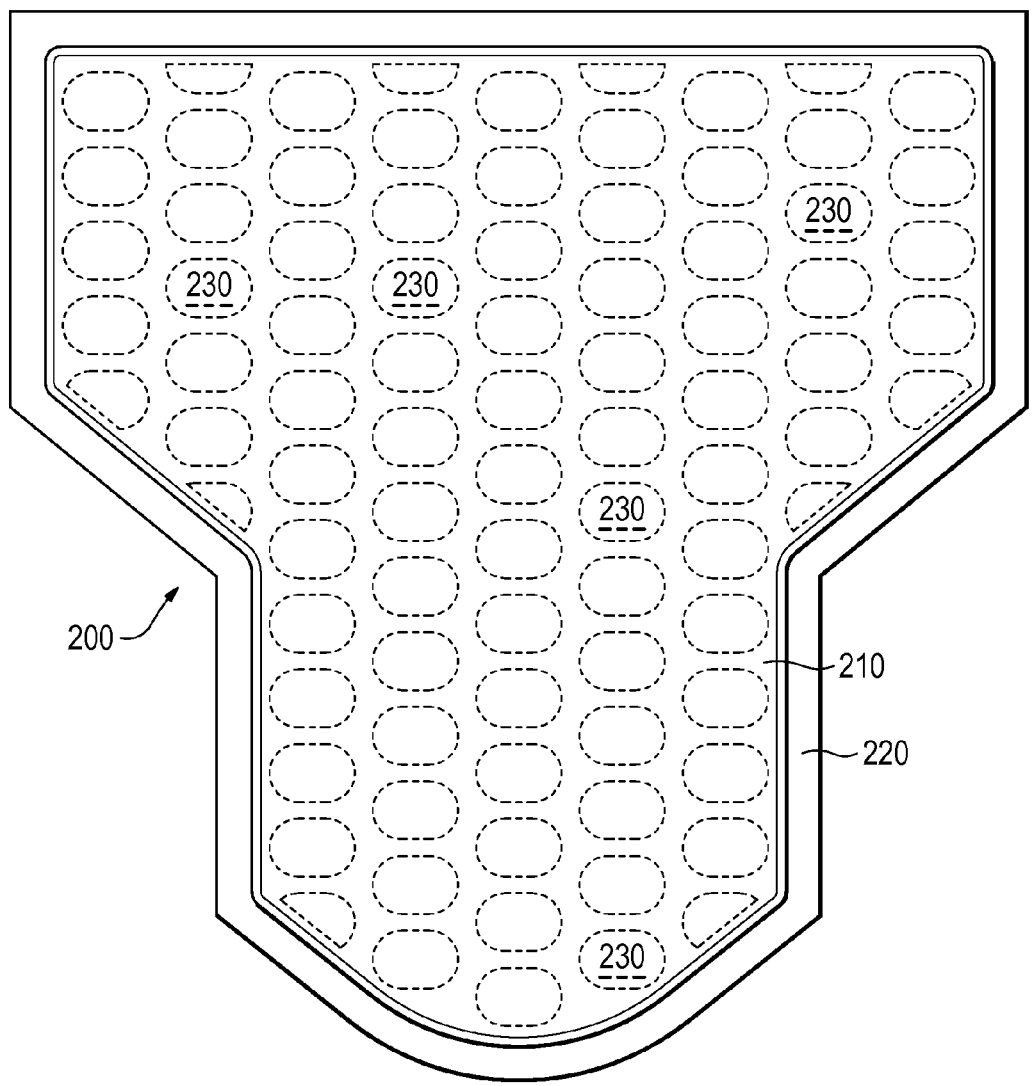
Figure 14L:
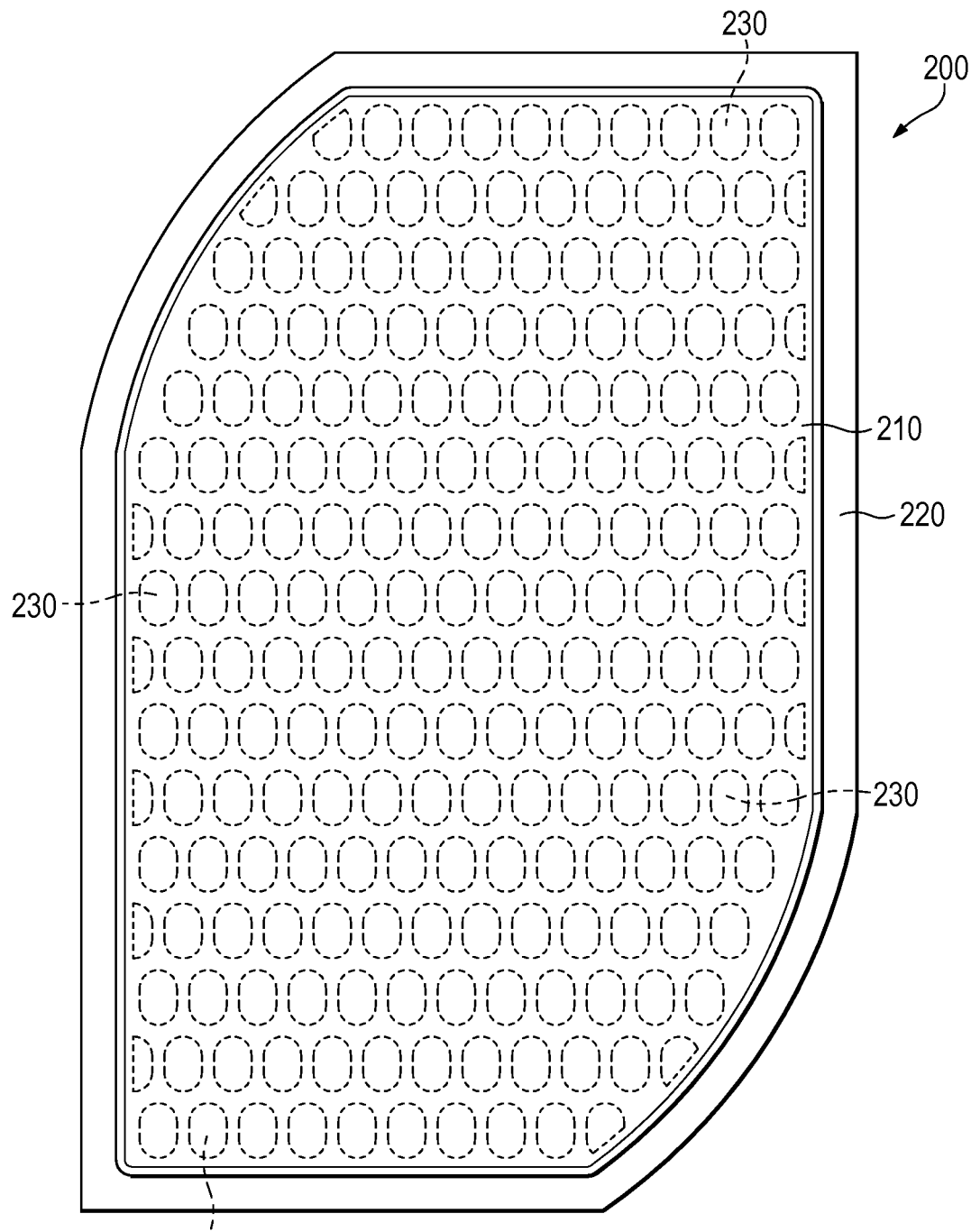
Figure 14M:
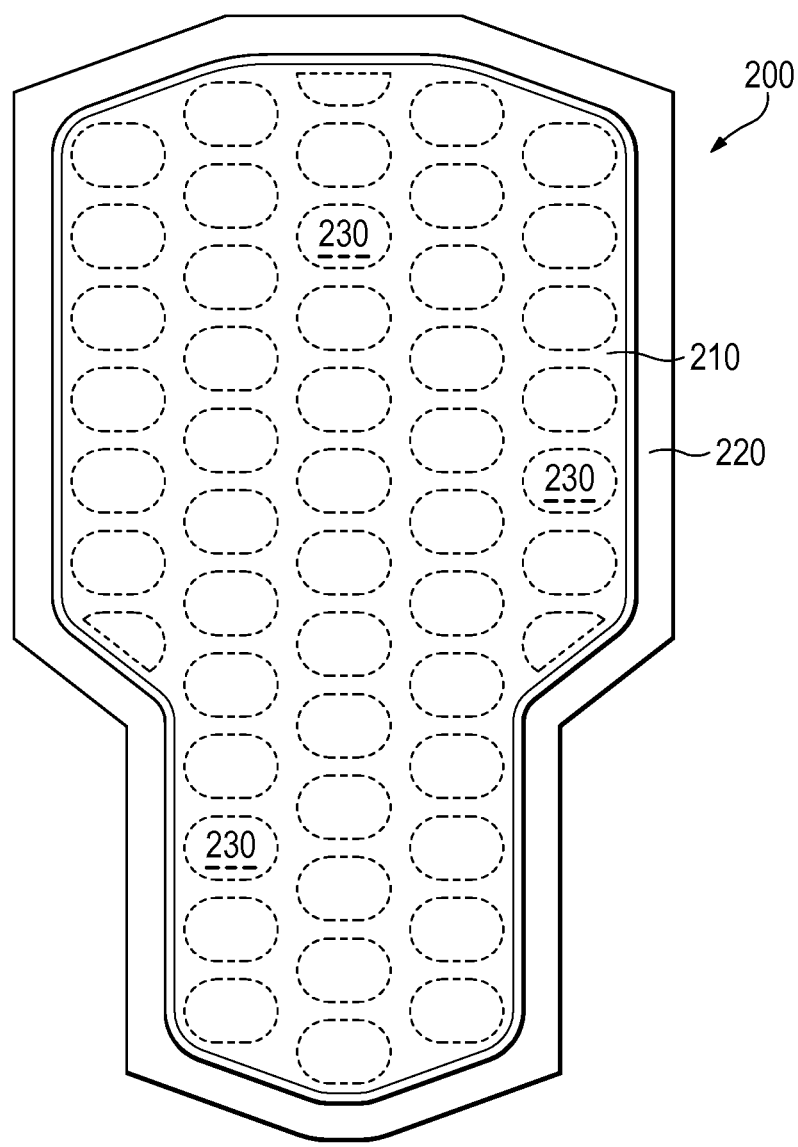
Figure 14N:
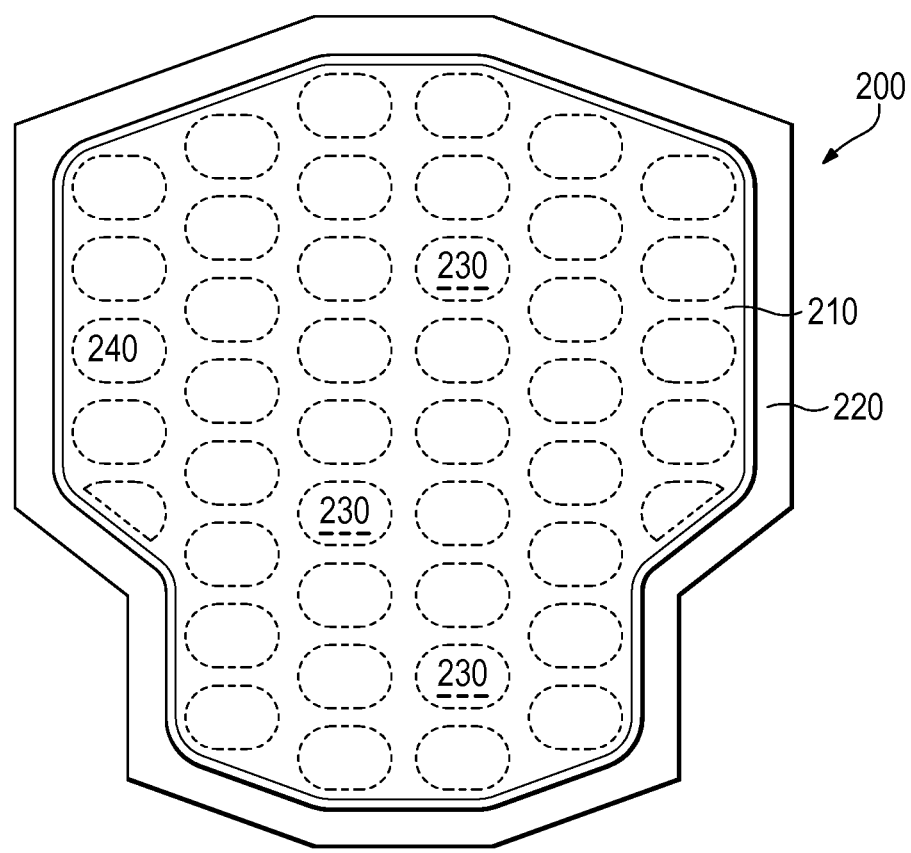

In addition to aspects of pad components 230 that may vary significantly, the overall shape of cushioning element 200 may vary. Referring to FIG. 14G, cushioning element 200 may vary. Referring to FIG. 14G, cushioning element 200 exhibits a generally round or circular shape. In further configurations, cushioning element 200 may have a triangular, hexagonal, or H-shaped structure, as respectively depicted in FIGS. 14H-14J. Various shapes for cushioning element 200 are also depicted in association with apparel 100 in FIGS. 1-5. As examples of these, one of cushioning elements 200 from apparel 100 that has a shape suitable for a hip pad is depicted in FIG. 14K, one of cushioning elements 200 from apparel 100 that has a shape suitable for a thigh pad is depicted in FIG. 14L, and one of cushioning elements 200 from apparel 100 that has a shape suitable for a tailbone pad is depicted in FIG. 14M. A configuration for cushioning element 200 that has a shape suitable for an elbow pad (e.g., for a shirt, jacket, or arm sleeve) is depicted in FIG. 14N.

Figure 14O:
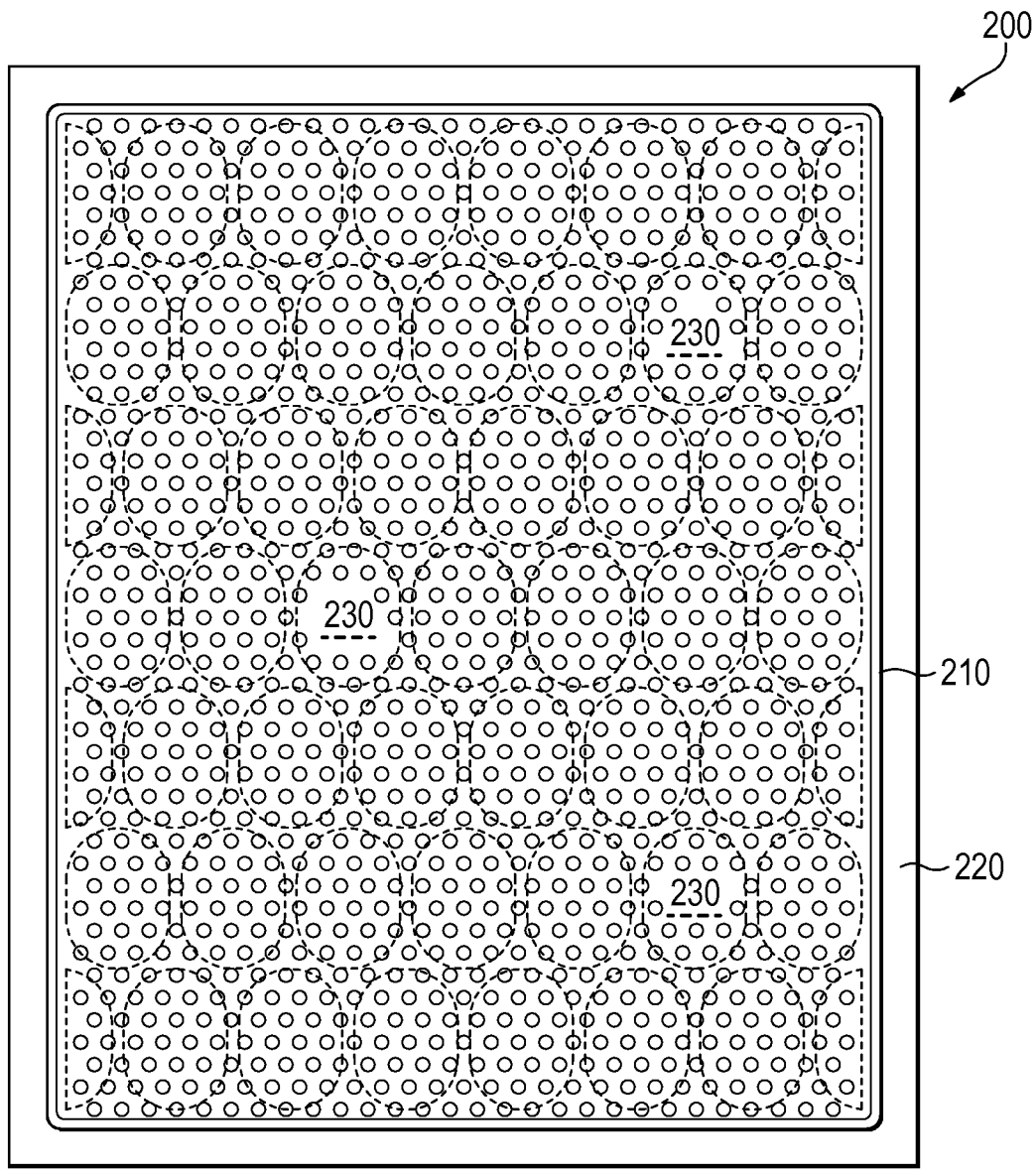
Figure 14P:
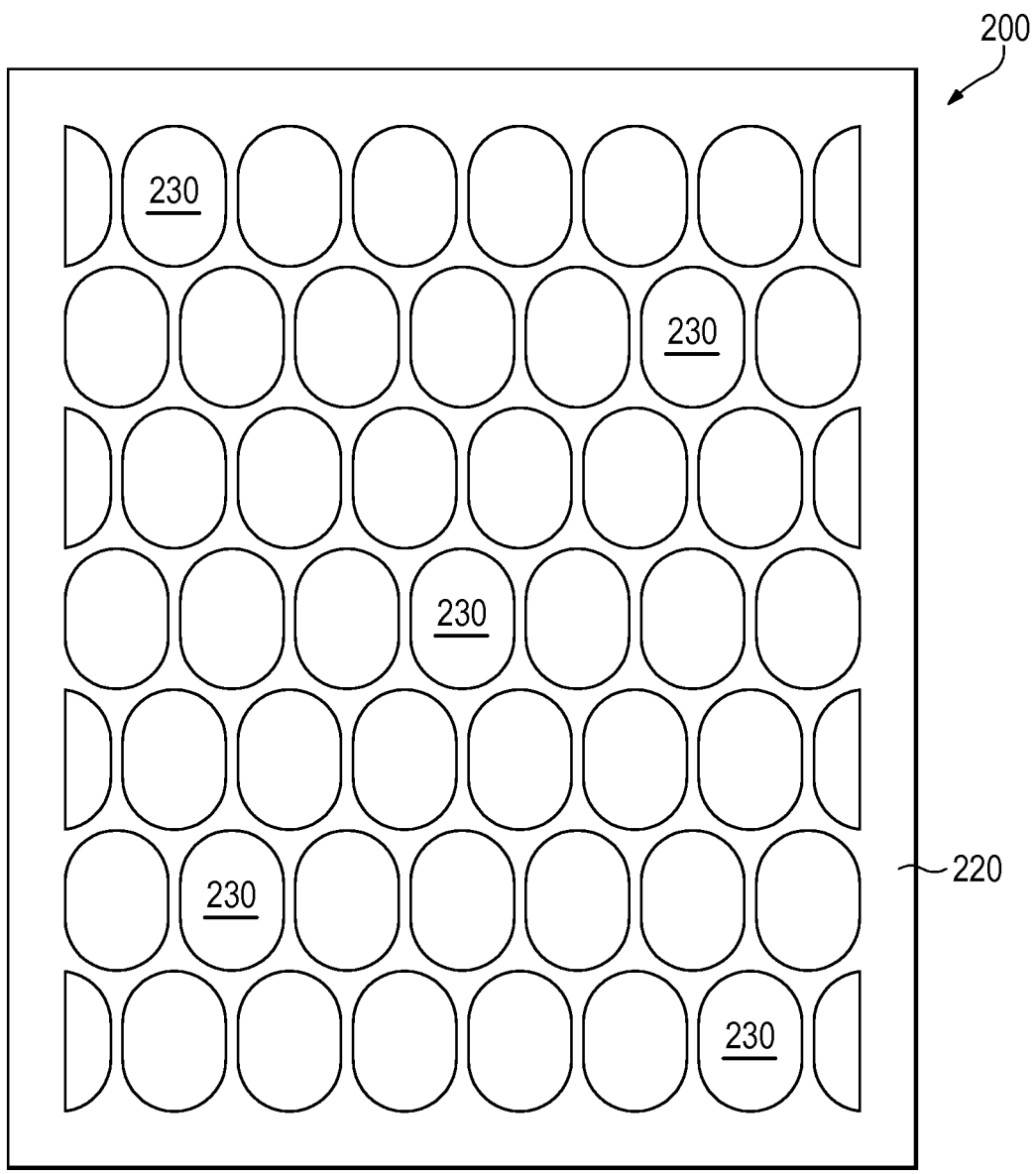

Various aspects relating to first material layer 210 and second material layer 220 may also vary significantly. As discussed above, material layers 210 and 220 may be formed from various textiles, polymer sheets, leather, synthetic leather, or combinations of materials, for example. Referring to FIG. 14O, first material layer 210 is depicted as having the configuration of a mesh material that defines a plurality of holes, through which pad components 230 and frame component 240 are visible. In addition to imparting greater breathability that allows the transfer of air and moisture, a mesh material may allow for various aesthetic properties. More particularly, pad components 230 may have different colors that are visible through first material layer 210. In addition to a mesh material, other at least semi-transparent textile or polymer sheet materials may also permit pad components 230 with different colors to be visible. In further configurations, first material layer 210 may be entirely absent from cushioning element 200, as depicted in FIG. 14P.

Figure 15A:
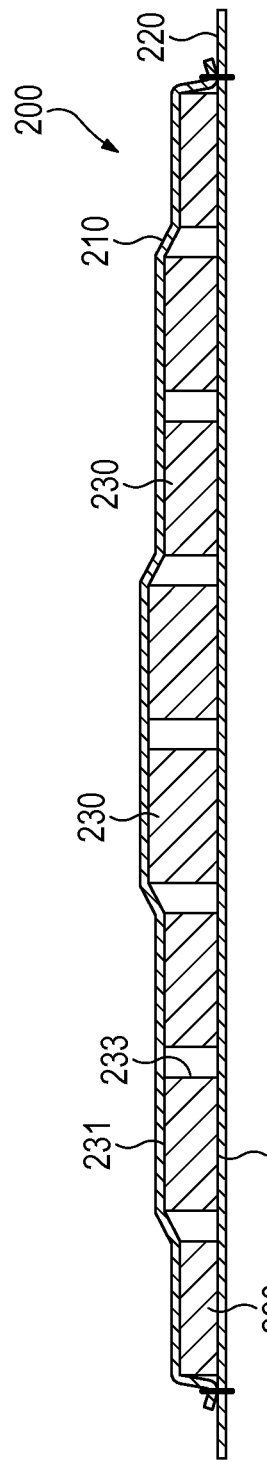
Figure 15B:
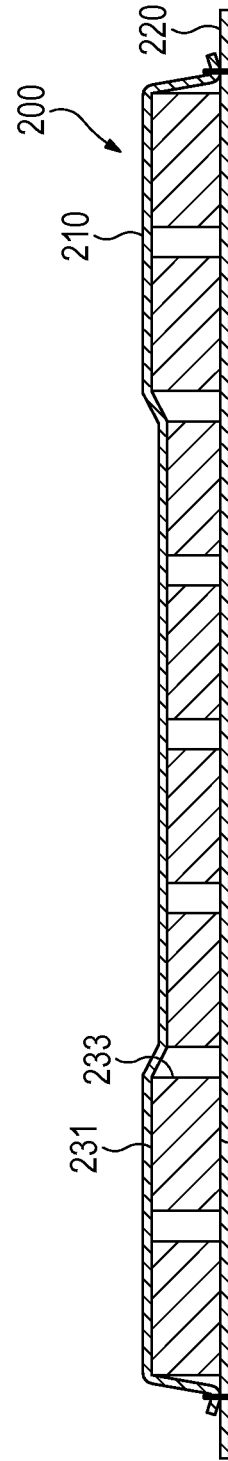

Although the thicknesses of pad components 230 (i.e., distance between surfaces bonded to material layers 210 and 220) may be constant, pad components 230 may also have varying thicknesses, as depicted in FIG. 15A. In some configurations of cushioning element 200, pad components 230 located in the central area may have lesser thickness than pad components 230 located in the peripheral area, as depicted in FIG. 15B. The thicknesses of pad components 230 may also decrease across the width of cushioning element 200, as depicted in FIG. 15C, or may taper across the width of cushioning element 200, as depicted in FIG. 15D.

Further Apparel and Product Configurations

Figure 16A:
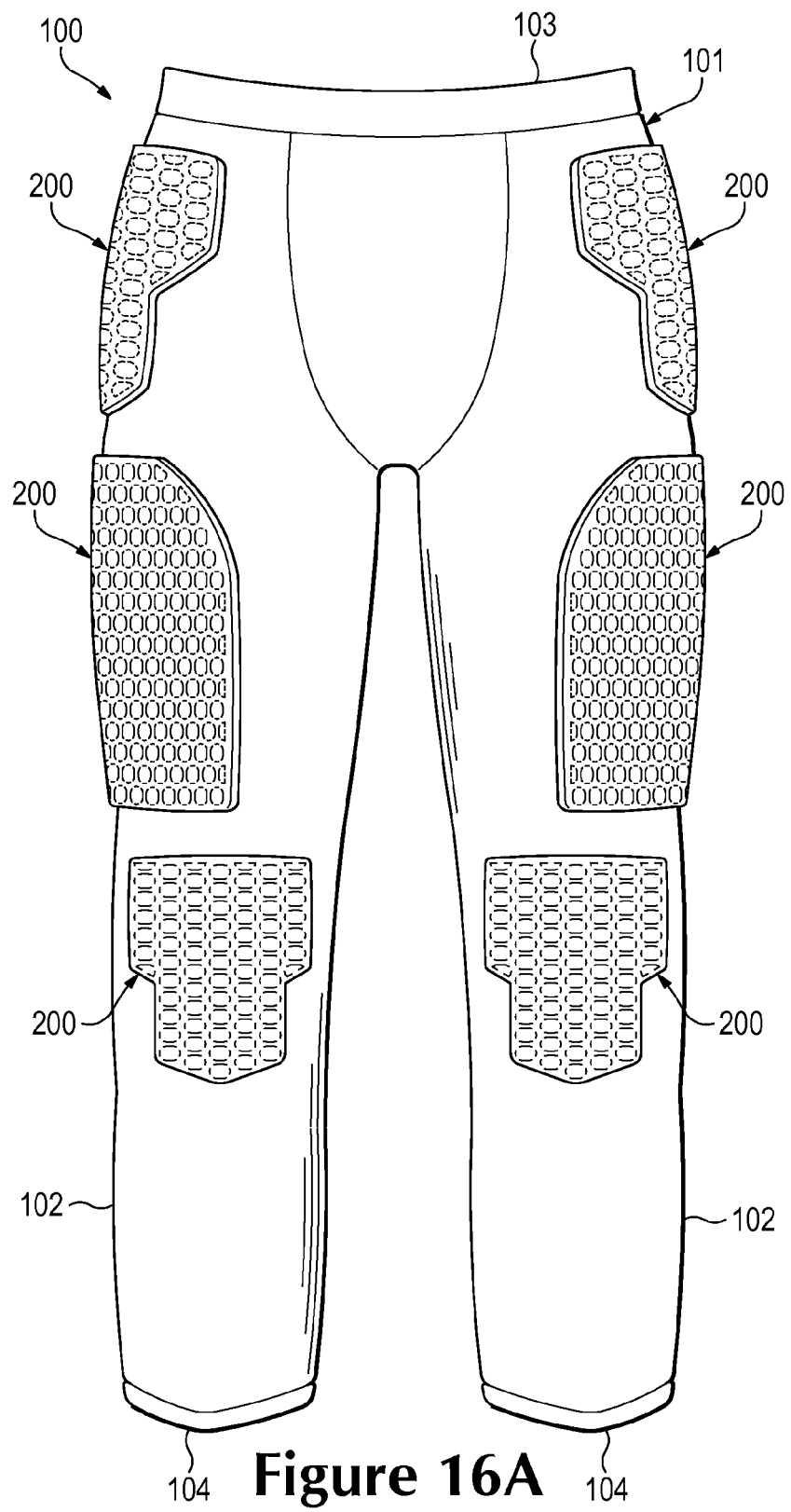
FIGS. 16A-16H are elevational views of articles of apparel incorporating the cushioning element.
Figure 16B:
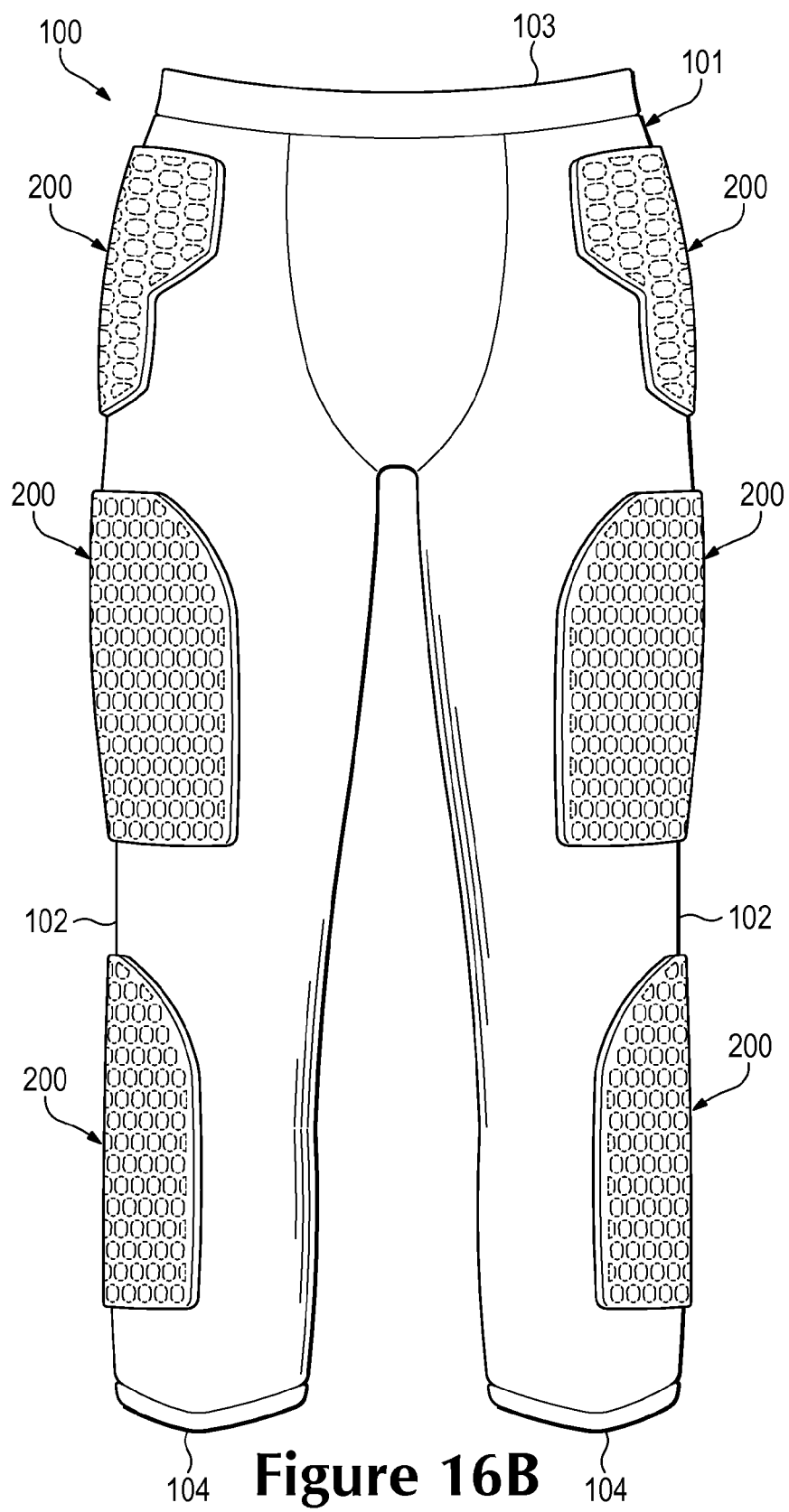

Apparel 100 is depicted in FIGS. 1-5 as having the general configuration of a shorts-type garment. Referring to FIG. 16A, leg regions 102 of apparel 100 extend downward to a greater degree, thereby imparting the configuration of a pants-type garment that includes additional cushioning elements 200 for the knees of individual 10. A similar configuration is depicted in FIG. 16B, wherein apparel 100 includes additional cushioning elements 200 for the ankles or lower legs of individual 10.

Figure 16C:
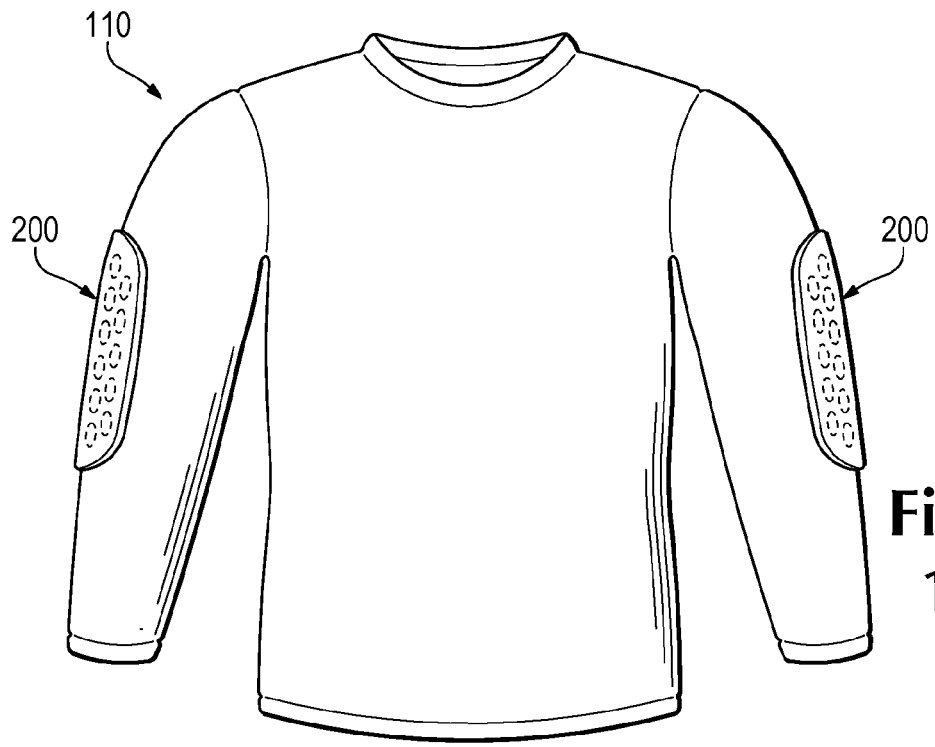
Figure 16D:
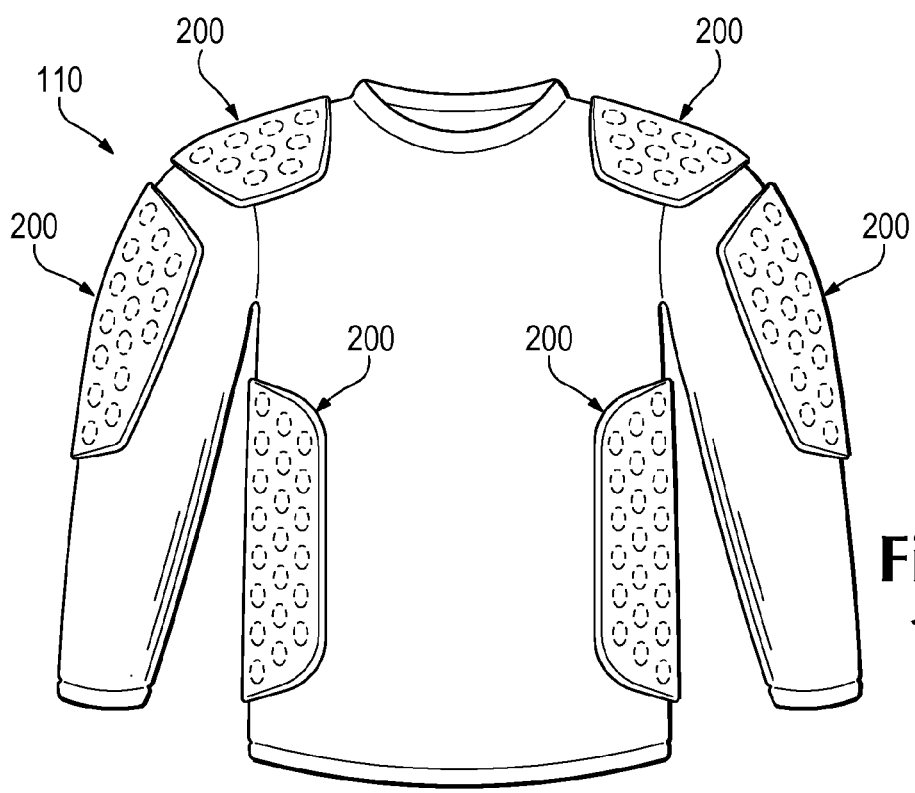

In addition to shorts-type garments and pants-type garments, a variety of other types of apparel may also incorporate cushioning elements 200 in any of the configurations discussed above. Referring to FIG. 16C, an article of apparel 110 having the configuration of a shirt-type garment is depicted as including two cushioning elements 200 in locations that correspond with elbows of a wearer. When worn, cushioning elements 200 may provide protection to the elbows. That is, cushioning elements 200 may attenuate impact forces upon the elbows. In addition to attenuating impact forces, cushioning elements 200 may also simultaneously provide one or more of breathability, flexibility, a relatively low overall mass, and launderability. Although apparel 110 is depicted as a long-sleeved shirt, apparel 110 may have the configuration of other shirt-type garments, including short-sleeved shirts, tank tops, undershirts, jackets, and coats, for example. Referring to FIG. 16D, apparel 110 is depicted as including six cushioning elements 200 in locations that correspond with elbows, shoulders, and sides of a wearer.

Figure 16E:
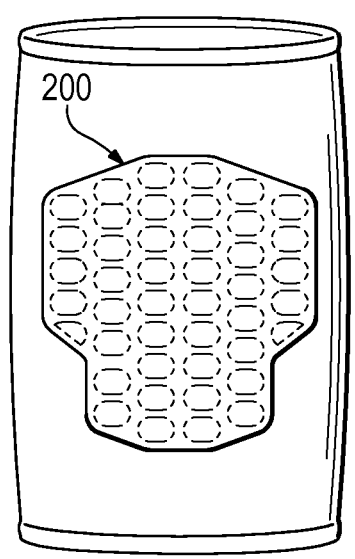
Figure 16F:
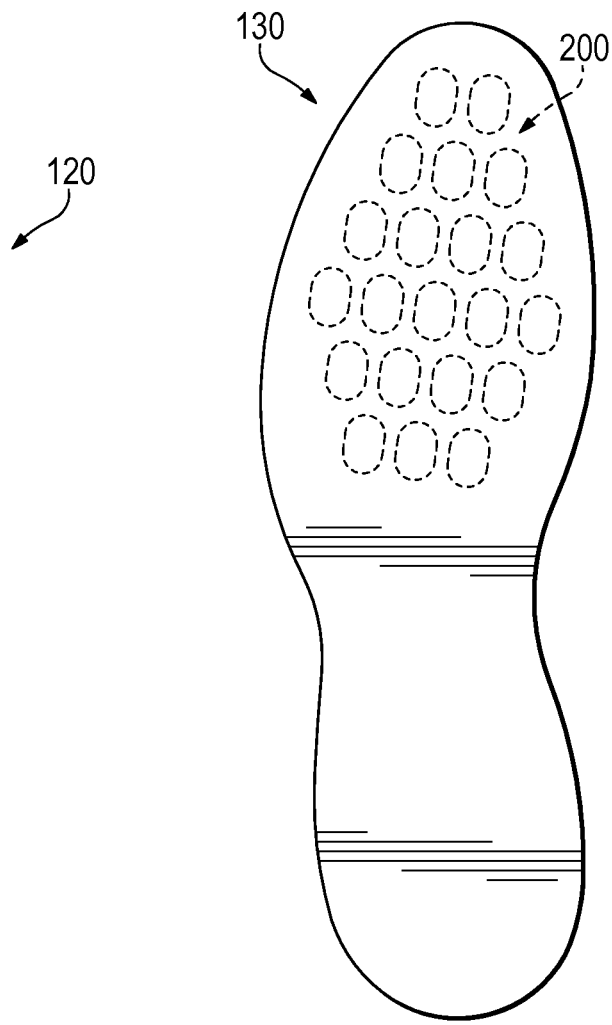
Figure 16G:
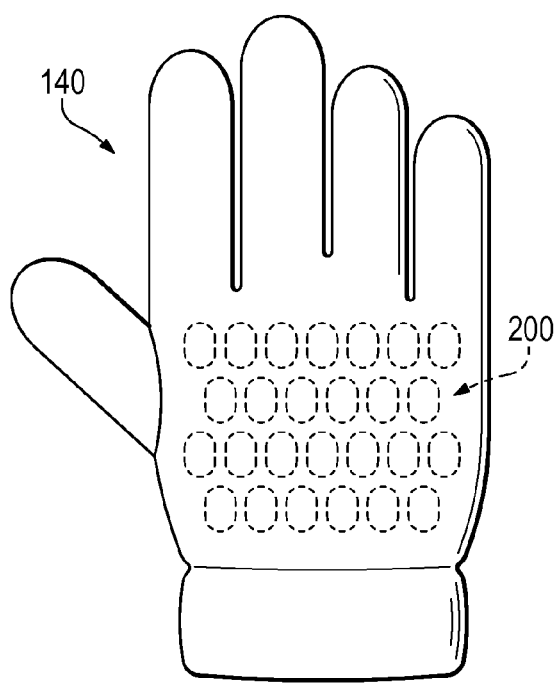
Figure 16H:
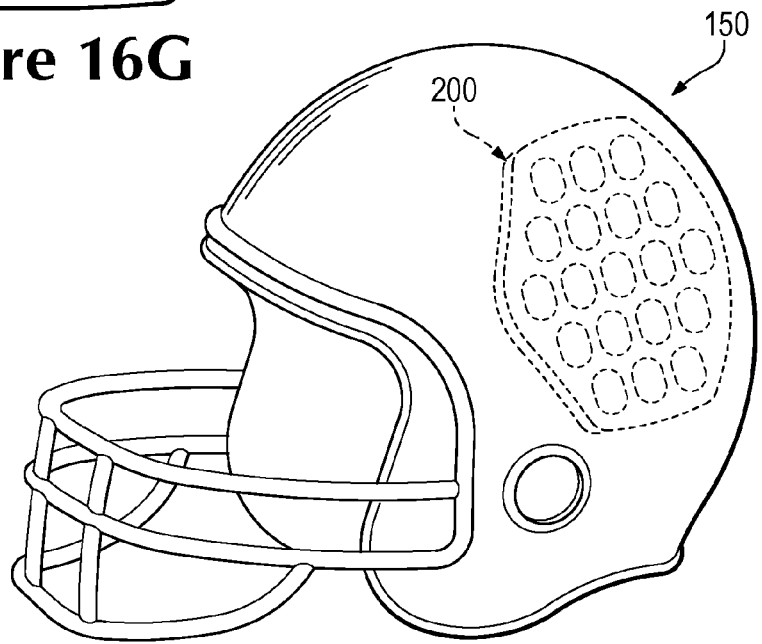

Cushioning elements 200 may also be incorporated into apparel that covers other areas of the wearer, such as hats, helmets, wraps, footwear, socks, and gloves, for example. As an example, a wrap 120 with one cushioning element 200 is depicted in FIG. 16E. Wrap 120 has a generally cylindrical configuration that may be placed upon an arm or a leg of a wearer. When, for example, the elbow is sore or injured, cushioning element 200 of wrap 120 may be located over the elbow to assist with protecting the elbow during athletic activities. As another example, a sockliner 130 that incorporates a cushioning element 200 is depicted in FIG. 16F. Sockliner 130 may be located within an article of footwear to cushion a lower (i.e., plantar) surface of the foot. Additionally, one or more cushioning elements 200 may be incorporated into a glove 140, as depicted in FIG. 16G, to impart protection to a hand of the wearer. One or more cushioning elements 200 may also be incorporated into a helmet 150, as depicted in FIG. 16H, to impart protection to a head of the wearer. In addition to attenuating impact forces, cushioning elements 200 in these configurations may also simultaneously provide one or more of breathability, flexibility, a relatively low overall mass, and launderability.

Figure 17A:
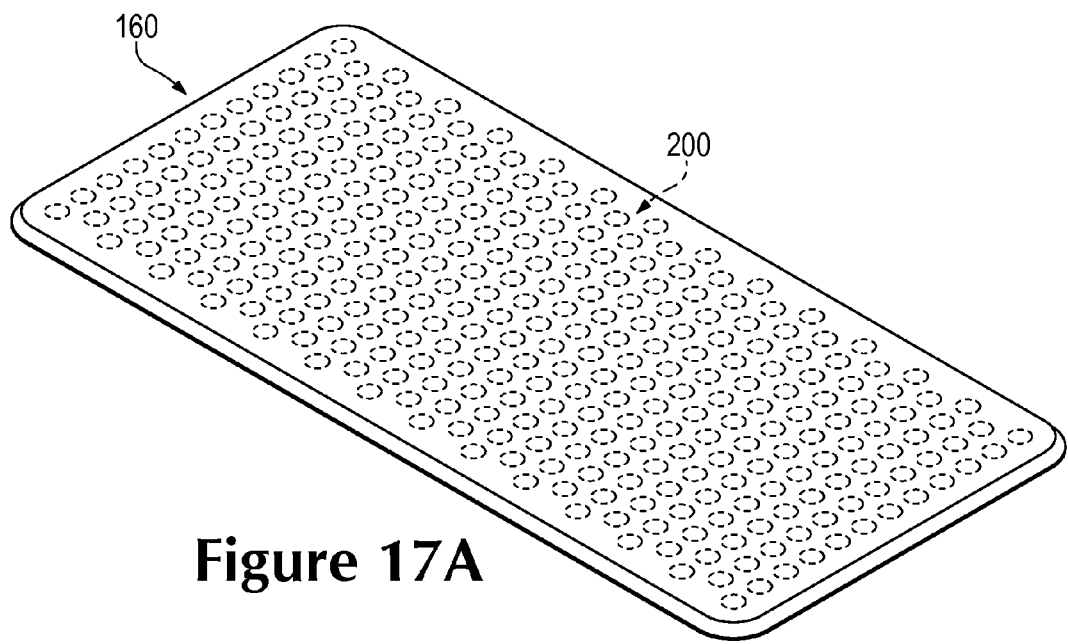
FIGS. 17A-17C are perspective views of further products incorporating the cushioning element.
Figure 17B:
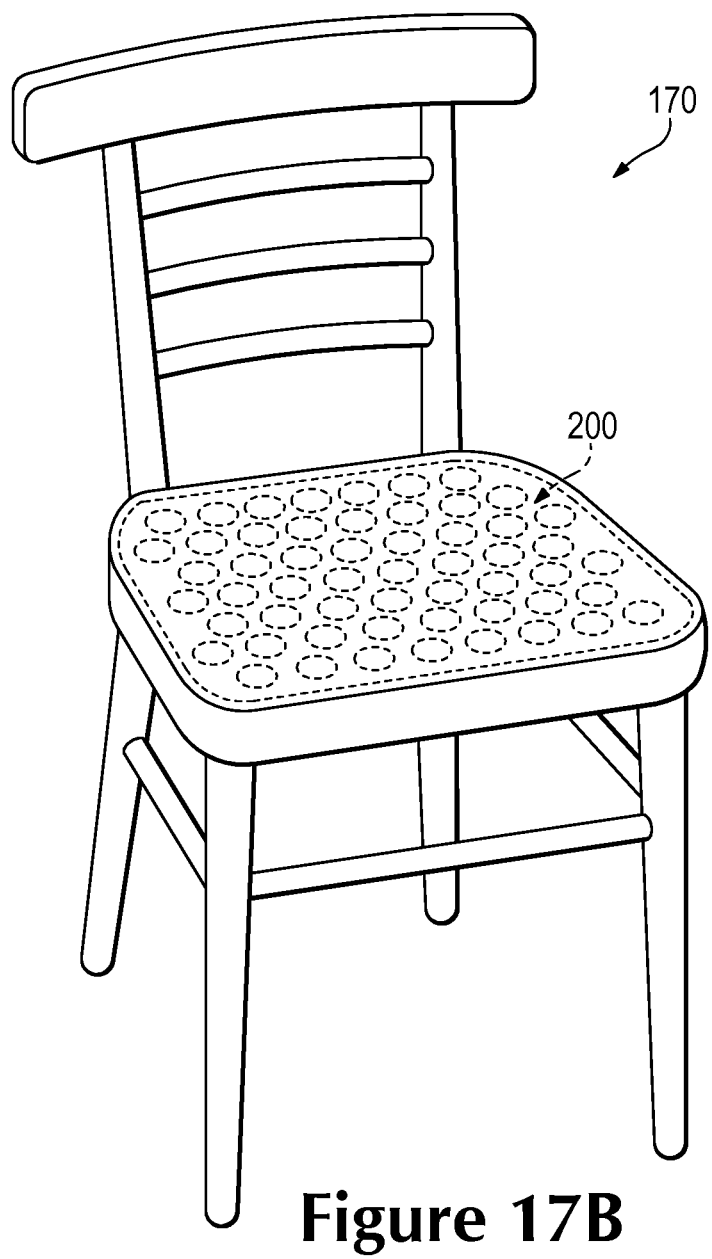
Figure 17C:
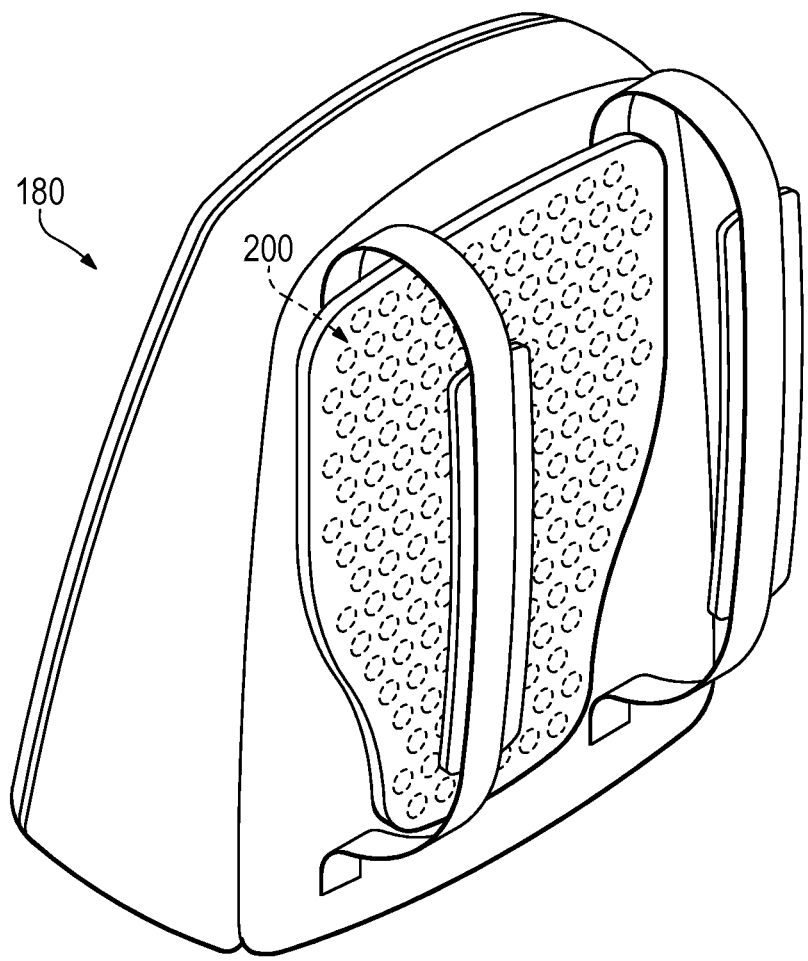

Cushioning elements 200 may also be utilized in products other than apparel. Referring to FIG. 17A, a mat 160 is depicted as being primarily formed from one cushioning element 200. Mat 160 may be utilized, for example, during yoga or as a camping pad to provide a comfortable surface for sitting or laying on the ground. A cushioning element 200 may also be incorporated into a chair 170, as depicted in FIG. 17B, to provide a comfortable place to sit. Similarly, a cushioning element 200 may be incorporated into a cushion that may be placed upon a chair or upon bleachers at a sporting event, for example. Also, a cushioning element 200 may be incorporated into a backpack 180, as depicted in FIG. 17C, to provide cushioning against the back of the wearer. Accordingly, various configurations of cushioning elements 200 may be incorporated into a plurality of products.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A method of manufacturing a cushioning element, the method comprising:
   providing a die and an extractor, the die having a plurality of the die elements positioned in an arrangement;
   locating a polymer material between the die and the extractor;
   compressing the polymer material between the die and the extractor, the die elements cutting the polymer material to form a plurality of pad components;
   separating the die and the extractor, the pad components being secured to the extractor, and the pad components having the arrangement of the die elements;
   bonding the pad components to a first material layer in the arrangement of the die elements by using the extractor to compress the pad components against the first material layer; separating the extractor from the pad components; and
   compressing the pad components against a second material layer to bond the pad components to the second material layer.

2. The method recited in claim 1, wherein the step of providing includes positioning the elements in offset rows.

3. The method recited in claim 1, wherein the step of bonding the pad components to the first material layer includes forming a thermalbond between the pad components and the first material layer.

4. The method recited in claim 1, wherein the step of providing includes locating an ejection member within each of the die elements.

5. The method recited in claim 4, wherein the step of providing further includes forming the ejection member from a polymer foam material with lesser compressibility than the polymer material of the pad components.

6. A method of manufacturing a cushioning element, the method comprising:
   providing a die and an extractor, the die having a plurality of die elements positioned in an arrangement;
   locating a polymer material between the die and the extractor;
   compressing the polymer material between the die and the extractor, the die elements cutting the polymer material to form a plurality of pad components;
   separating the die and the extractor, the pad components being secured to the extractor, and the pad components having the arrangement of the die elements;
   compressing the pad components against a first material layer with the extractor to bond the pad components to the first material layer in the arrangement of the die elements;
   compressing the pad components against a second material layer to bond the pad components to the second material layer;
   wherein the step of providing includes forming the extractor to include a plurality of outwardly-extending pins.

7. The method recited in claim 6, wherein the step of providing further includes locating the pins in the arrangement of the die elements.

8. A method of manufacturing a cushioning element, the method comprising:
   providing a die and an extractor, the having a plurality of the die elements positioned in offset rows;
   locating a polymer foam material between the die and the extractor;
   compressing the polymer foam material between the die and the extractor, the die elements cutting the polymer material to form a plurality of pad components;
   separating the die and the extractor, the pad components being secured to the extractor in offset rows;
   providing a first material layer and a second material layer; and
   bonding the pad components to (a) the first material layer with the extractor and separating the extractor from the pad components and (b) to the second material layer.

9. The method recited in claim 8, wherein the step of providing the die and the extractor includes forming the extractor to include a plurality of outwardly-extending pins.

10. The method recited in claim 9, wherein the step of providing the die and the extractor further includes positioning the pins in offset rows.

11. The method recited in claim 8, wherein the step of bonding includes forming a thermalbond between the pad components and the first material layer.

12. A method of manufacturing a cushioning element, the method comprising:

cutting a polymer foam material to simultaneously form a plurality of pad components arranged in rows;

securing the pad components to an extractor, the pad components being arranged in the rows;

bonding the pad components to a first material layer using the extractor separating the extractor from the pad components; and bonding the pad components to a second material layer.

13. The method recited in claim 12, wherein the step of cutting includes utilizing a die with a plurality of die elements arranged in rows.

14. The method recited in claim 13, wherein the step of cutting further includes compressing the polymer foam material between the extractor and the die elements.

15. The method recited in claim 12, wherein the step of cutting includes utilizing a die with a plurality of die elements arranged in offset rows.

16. The method recited in claim 12, wherein the step of bonding includes forming a thermalbond between the pad components and the material layer.

17. A method of manufacturing a cushioning element, the method comprising:

cutting a polymer foam material to simultaneously form a plurality of pad components arranged in rows;

securing the pad components to an extractor, the pad components being arranged in the rows;

bonding the pad components to at least one material layer with the extractor;

wherein the step of securing includes piercing the pad components with a plurality of pins from the extractor.

18. The method recited in claim 17, wherein the step of securing further includes arranging the pins in rows.

\* \* \* \* \*